US007997976B2

(12) United States Patent
Yoshizawa

(10) Patent No.: US 7,997,976 B2
(45) Date of Patent: Aug. 16, 2011

(54) SLOT MACHINE HAVING SPECIAL SYMBOL AND CONTROL METHOD THEREOF

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 387 days.

(21) Appl. No.: 12/405,348

(22) Filed: Mar. 17, 2009

(65) Prior Publication Data

US 2010/0069140 A1 Mar. 18, 2010

Related U.S. Application Data

(60) Provisional application No. 61/038,964, filed on Mar. 24, 2008.

(51) Int. Cl.
*A63F 9/24* (2006.01)
*G06F 17/00* (2006.01)

(52) U.S. Cl. .......... 463/21

(58) Field of Classification Search .......... 463/20, 463/21
See application file for complete search history.

(56) References Cited

U.S. PATENT DOCUMENTS 6,012,983 A 1/2000 Walker et al.
6,093,102 A 7/2000 Bennett
6,960,133 B1 11/2005 Marks et al.
7,393,280 B2 * 7/2008 Cannon .......... 463/42
7,575,515 B2 * 8/2009 Rodgers et al. .......... 463/20
2002/0065124 A1 5/2002 Ainsworth
2009/0233695 A1 * 9/2009 Yoshizawa .......... 463/21
2010/0069139 A1 * 3/2010 Yoshizawa .......... 463/20

* cited by examiner

*Primary Examiner* — William D Coleman
(74) *Attorney, Agent, or Firm* — NDQ&M Watchstone LLP

(57) ABSTRACT

According to a slot machine of the present invention, synthetic symbol images each including a first symbol image and a second symbol image are rearranged to a display. The first symbol image is associated with a predetermined prize. In a case where the first symbol images included in the rearranged synthetic symbols or a combination thereof constitute the predetermined prize, special first symbol images are displayed in place of the synthetic symbols including the first symbol images constituting the predetermined prize. The special first symbol images correspond to the first images constituting the predetermined prize.

11 Claims, 40 Drawing Sheets

Fig. 2

| | Name of symbols | Description | Example |
|---|---|---|---|
| <I> | Synthetic symbol | Normal payout symbol (small) + Bonus payout symbol (small) | 100A, 100B, 100C (Fig. 1A) |
| <II> | Normal payout symbol (small) | Payout of coins upon rearrangement of five normal payout symbols (small) along a line | 101A, 101B, 101C (Fig. 1A) |
| <III> | Bonus payout symbol (small) | Inclusive term of jackpot trigger symbol (small), free game trigger symbol (small) and bonus game trigger symbol (small) | 102A, 102B, 102C (Fig. 1A) |
| <IV> | Jackpot trigger symbol (small) | Progressive jackpot upon rearrangement of five jackpot trigger symbols (small) along a line | 102A (Fig. 1A) |
| <V> | Free game trigger symbol (small) | Generation of free game upon rearrangement of five free game trigger symbols (small) along a line | 102B (Fig. 1B) |
| <VI> | Bonus game trigger symbol (small) | Generation of bonus game upon rearrangement of five bonus game trigger symbols (small) along a line | 102C (Fig. 1C) |
| <VII> | Normal payout symbol (large) | Displayed upon rearrangement of five normal payout symbols (small) along a line | 111 (Fig. 1I) |
| <VIII> | Jackpot trigger symbol (large) | Displayed upon rearrangement of four jackpot trigger symbols (small) along a line | — |
| <IX> | Free game trigger symbol (large) | Displayed upon rearrangement of four free game trigger symbols (small) along a line | — |
| <X> | Bonus game trigger symbol (large) | Displayed upon rearrangement of four bonus game trigger symbols (small) along a line | 112 (Fig. 1E) |
| <XI> | Jackpot trigger establishment symbol | Displayed upon establishment of jackpot trigger | — |
| <XII> | Free game trigger establishment symbol | Displayed upon establishment of free game trigger | — |
| <XIII> | Bonus game trigger establishment symbol | Displayed upon establishment of bonus game trigger | 113 (Fig. 1F) |
| <XIV> | Double payout symbol | Displayed upon simultaneous establishment of prize associated with normal payout and jackpot trigger | 114 (Fig. 1H) |
| <XV> | Special bonus game trigger establishment symbol | Displayed upon simultaneous establishment of free game trigger and bonus game trigger | 115 (Fig. 1H) |

Fig. 7

| Winning combination | Odds (※) | |
|---|---|---|
| | Normal game | Bonus game |
| AIR PLANE ×5 | 20 | 50 |
| SUN ×5 | 10 | 20 |
| MOON ×5 | 8 | 15 |
| STAR ×5 | 5 | 10 |
| HEART ×5 | 2 | 5 |

※ Number of coin-outs per coin

SLOT MACHINE HAVING SPECIAL SYMBOL AND CONTROL METHOD THEREOF

CROSS-REFERENCE TO RELATED APPLICATIONS

This application claims benefit of priority based on U.S. Provisional Patent Application No. 61/038,964 filed on Mar. 24, 2008. The contents of this application are incorporated herein by reference in their entirety.

BACKGROUND OF THE INVENTION

1. Field of the Invention

The present invention relates to a slot machine having special symbols and a control method thereof.

2. Discussion of the Background

In conventional slot machines, when a player inserts game media such as medals, coins or bills into an insertion slot of the slot machine and presses a spin button, then a plurality of symbols are scroll-displayed to a display portion provided on the front surface of a casing and, thereafter, the respective symbols are automatically stopped, as disclosed in U.S. Pat. Nos. 6,960,133, 6,012,983 and 6,093,102. In this case, when scroll-display of respective symbols starts by an input from the spin button, symbols are selected using random numbers, and the selected symbols are stop-displayed to the display portion. Then, when a combination of the stop-displayed symbols along a winning line is a predetermined winning combination (prize), a payout is conducted.

Further, among conventional slot machines, there are some slot machines which conduct two types of payouts which are a payout determined according to the combinations of symbols rearranged along winning lines and a payout determined according to the number of displayed scatter symbols, as disclosed in U.S. Pat. No. 6,604,999 and US 2002-0065124-A1. In such a slot machine which conducts a payouts based on such scatter symbols, there is no relationship between payouts and positions at which the scatter symbols are displayed.

In such conventional slot machines, symbols to be stop-displayed (rearranged) typically have a predetermined picture (e.g. watermelon, cherry, number "7", etc.). However, since only similar symbols are used in a large number of slot machines, there have been cases where a player is unlikely to feel freshness. This has caused a problem of making the player soon bored of a game.

In light of the aforementioned problem, the present invention has been devised, and an object of the present invention is to provide a slot machine having special symbols that have a player feel freshness.

The contents of U.S. Pat. No. 6,960,133, U.S. Pat. No. 6,012,983, U.S. Pat. No. 6,093,102, U.S. Pat. No. 6,604,999 and U.S. 2002-0065124-A1 are incorporated herein by reference in their entirety.

SUMMARY OF THE INVENTION

The present invention provides a slot machine comprising the following configuration.

Namely, the aforementioned slot machine comprises a display capable of rearranging synthetic symbol images each including a first symbol image associated with a predetermined prize and a second symbol image different from the first symbol images; a memory capable of storing first symbol image data indicating the first symbol image, second symbol image data indicating the second symbol image, and special first symbol image data indicating a special first symbol image corresponding to the first symbol image; and a controller programmed so as to execute the processing of: (A) rearranging the synthetic symbol images to the display based upon the first symbol image data and the second symbol image data stored in the memory, and (B) displaying the special first symbol images corresponding to first symbol images which are included in the synthetic symbol images rearranged in the processing (A) and constitute the predetermined prize, to the display based upon the special first symbol image data stored in the memory in place of the synthetic symbol images including the first symbol images out of the synthetic symbol images rearranged in the processing (A) in a case where the first symbol images included in the synthetic symbol images rearranged in the processing (A) or a combination thereof constitute the predetermined prize.

According to the aforementioned slot machine, the synthetic symbol images each including the first symbol image and the second symbol image are rearranged to the display. Such symbol images formed by synthesizing the two kinds of symbol images are not usually displayed in slot machines, and a player is unfamiliar with such symbol images. Therefore, by showing the player such symbol images, it is possible to have the player feel freshness. This can result in provision of a game in which the player is unlikely to become bored.

Further, according to the aforementioned slot machine, the first symbol image is associated with the predetermined prize. When the first symbol images included in the rearranged synthetic symbol images or a combination thereof constitute the predetermined prize (e.g. when a predetermined winning combination is established along a winning line), the special first symbol images are displayed to the display in place of the synthetic symbol images (the synthetic symbol images rearranged along the winning line) including the first symbol images that constitute the predetermined prize. The special first symbol images correspond to the first symbol images that constitute the predetermined prize.

Thereby, when the first symbol images included in the rearranged synthetic symbol images constitute the predetermined prize, the first symbol images can be displayed to the display with substantially the same sizes as those of the synthetic symbol images. It is therefore possible to give the player an impression as if the first symbol images constituting the predetermined prize have expanded to the special first symbol images as triggered by establishment of the prize. Hence it becomes possible to have the player feel interested in a view being as if the first symbol images expand to the special first symbol images, so as to make the player absorbed in the game.

Moreover, since the special first symbol images corresponding to the predetermined prize are displayed with sizes larger than those of the first symbol images and the second symbol images in the case of establishment of the predetermined prize, it is possible to make the player immediately aware of which prize has been established. This enables provision of a game very easy to understand for the player.

Further the slot machine of the present invention preferably has the following configuration.

Namely, the special first symbol image is an image having a substantially same picture as a picture of the corresponding first symbol image.

According to the aforementioned slot machine, the picture of the first symbol image is the substantially same as the picture of the special first symbol image corresponding to the first symbol image. It is thereby possible to further strengthen the impression received by the player as if the first symbol images constituting the predetermined prize have expanded to the special first symbol images as triggered by establishment of the prize. Hence it becomes possible to have the player feel increasingly interested in the view being as if the first symbol images expand to the special first symbol images, so as to make the player further absorbed in the game.

Further the slot machine of the present invention preferably has the following configuration.

Namely, the second symbol image is associated with a special prize different from the predetermined prize. Further, the memory is capable of storing special second symbol image data indicating a special second symbol image corresponding to the second symbol image. Furthermore, the controller is further programmed so as to execute processing of (C) displaying the special second symbol images corresponding to second symbol images which are included in the synthetic symbol images rearranged in the processing (A) and constitute the special prize, to the display based upon the special second symbol image data stored in the memory in place of the synthetic symbol images including the second symbol images out of the synthetic symbol images rearranged in the processing (A) in a case where the second symbol images included in the synthetic symbol images rearranged in the processing (A) or a combination thereof constitute the special prize.

According to the aforementioned slot machine, the second symbol image is associated with the special prize different from the aforementioned predetermined prize. Namely, the two kinds of symbol images constituting the synthetic symbol image are both associated with prizes. For example, the first symbol image is associated with a normal prize, and the second symbol image is associated with a bonus. It is thereby possible to make the player pay attention to both the first symbol images and the second symbol images. Consequently, it is possible to make the player further absorbed in the game.

Moreover, according to the aforementioned slot machine, when the second symbol images included in the rearranged synthetic symbol images or a combination thereof constitute the special prize (e.g. when a predetermined winning combination is established along the winning line), the special second symbol images are displayed to the display in place of the synthetic symbol images (the synthetic symbol images rearranged along the winning line) including the second symbol images that constitute the special prize. The special second symbol images correspond to the second symbol images that constitute the special prize.

Namely, it is possible to display to the display the special first symbol images with substantially the same sizes as those of the synthetic symbol images in the case of establishment of the predetermined prize by the first symbol images, while displaying to the display the special second symbol images with substantially the same sizes as those of the synthetic symbol images in the case of establishment of the special prize by the second symbol images. It is therefore possible to give the player an impression as if the first symbol images constituting the predetermined prize have expanded to the special first symbol images in the case of establishment of the predetermined prize by the first symbol images, while giving the player an impression as if the second symbol images constituting the special prize have expanded to the special second symbol images in the case of establishment of the special prize.

As thus described, it is possible to show the player a view being as if the first symbol images expand to the special first symbol images or a view being as if the second symbol images expand to the special second symbol images, depending upon whether the predetermined prize is established or the special prize is established. It is thus possible to have the player feel increasingly interested in such unfamiliar views.

The present invention provides a slot machine having the following configuration.

Namely, the aforementioned slot machine comprises a symbol display capable of variably displaying synthetic symbols each including a first symbol associated with a predetermined prize and a second symbol different from the first symbols; a display which is capable of displaying special first symbol images corresponding to the first symbols and arranged at a front face of the symbol display, a memory capable of storing special first symbol image data indicating the special first symbol image; and a controller programmed so as to execute the processing of: (A) variably displaying and then stop-displaying a plurality of the synthetic symbols to the symbol display, and (B) displaying the special first symbol images corresponding to first symbols which are included in the synthetic symbols stop-displayed in the processing (A) and constitute the predetermined prize, to the display based upon the special first symbol image data stored in the memory in such a manner as to cover the synthetic symbols including the first symbols in a case where the first symbols or a combination thereof constitute the predetermined prize.

According to the aforementioned slot machine, the synthetic symbols each including the first symbol and the second symbol are stop-displayed to the symbol display. Such symbols formed by synthesizing the two kinds of symbols are not usually displayed in slot machines, and a player is unfamiliar with such symbols. Therefore, by showing the player such symbols, it is possible to have the player feel freshness. This can result in provision of a game in which the player is unlikely to become bored.

Further, according to the aforementioned slot machine, the first symbol is associated with the predetermined prize. When the first symbols included in the stop-displayed synthetic symbols or a combination thereof constitute the predetermined prize (e.g. when a predetermined winning combination is established along a winning line), the special first symbol images are displayed to the display in place of the synthetic symbols (the synthetic symbols stop-displayed along the winning line) including the first symbols that constitute the predetermined prize. The special first symbol images correspond to the first symbols that constitute the predetermined prize.

Thereby, when seen from the player, the synthetic symbols each including the first symbol that constitutes the predetermined prize are hidden by the special first symbol images. It is therefore possible to give the player an impression as if the first symbols constituting the predetermined prize have expanded to the special first symbol images as triggered by establishment of the prize. Hence it becomes possible to have the player feel interested in a view being as if the first symbols expand to the special first symbol images, so as to make the player absorbed in the game.

Moreover, since the special first symbol images corresponding to the predetermined prize are displayed with sizes larger than those of the first symbols and the second symbols in the case of establishment of the predetermined prize, it is possible to make the player immediately aware of which prize has been established. This enables provision of a game very easy to understand for the player.

Further the slot machine of the present invention preferably has the following configuration.

Namely, the second symbol is associated with a special prize different from the predetermined prize. The memory is capable of storing special second symbol image data indicating special second symbol image corresponding to the second symbol image. The controller is further programmed so as to execute processing of (C) displaying the special second symbol images correspond to second symbols which are included in the synthetic symbol images stop-displayed in the processing (A) and constitute the special prize, to the display based upon the special second symbol image data stored in the memory in such a manner as to cover the synthetic symbols including the second symbols in a case where the second symbols or a combination thereof constitute the special prize.

According to the aforementioned slot machine, the second symbol is associated the special prize different from the aforementioned predetermined prize. Namely, the two kinds of symbols constituting the synthetic symbol are both associated with prizes. For example, the first symbol is associated with a normal prize, and the second symbol is associated with a bonus. It is thereby possible to make the player pay attention to both the first symbols and the second symbols. Consequently, it is possible to make the player further absorbed in the game.

Moreover, according to the aforementioned slot machine, when the second symbols included in the stop-displayed synthetic symbols or a combination thereof constitute the special prize (e.g. when a predetermined winning combination is established along the winning line), the special second symbols are displayed to the display in such a manner as to cover the synthetic symbols (the synthetic symbols rearranged along the winning line) including the second symbols that constitute the special prize. The special second symbols correspond to the second symbols that constitute the special prize.

Namely, it is possible to display to the display the special first symbols in such a manner as to cover the synthetic symbols in the case of establishment of the predetermined prize by the first symbols, while displaying to the display the special second symbol images in such a manner as to cover the synthetic symbols in the case of establishment of the special prize by the second symbols. It is therefore possible to give the player an impression as if the first symbols constituting the predetermined prize have expanded to the special first symbol images in the case of establishment of the predetermined prize by the first symbol images, while giving the player an impression as if the second symbols constituting the special prize have expanded to the special second symbol images in the case of establishment of the special prize.

As thus described, it is possible to show the player a view being as if the first symbols expand to the special first symbol images or a view being as if the second symbols expand to the special second symbol images, depending upon whether the predetermined prize is established or the special prize is established. It is thus possible to have the player feel increasingly interested in such unfamiliar views.

The present invention provides a slot machine having the following configuration.

Namely, the aforementioned slot machine comprises a symbol display capable of variably displaying a plurality of second symbols; a display which is arranged at a front face of the symbol display and capable of rearranging first symbol images each associated with a predetermined prize and displayed in such a manner as to partially cover the second symbol; a memory capable of storing first symbol image data indicating the first symbol image and special first symbol image data indicating special first symbol images corresponding to the first symbol image; and a controller programmed so as to execute the processing of: (A) variably displaying and then stop-displaying the plurality of second symbols to the symbol display, (B) rearranging to the display the first symbol images each displayed in such a manner as to partially cover the second symbol stop-displayed in the processing (A) based upon the first symbol image data stored in the memory, and (C) displaying the special first symbol images corresponding to the first symbol images which are rearranged in the processing (B) and constitute the predetermined prize, to the display based upon the special first symbol image data stored in the memory in such a manner as to cover substantially the whole of second symbols partially covered by the first symbol images out of the second symbols stop-displayed in the processing (A) in a case where the first symbol images or a combination thereof constitute the predetermined prize.

According to the aforementioned slot machine, the second symbols are stop-displayed to the symbol display. Further, the first symbol images associated with the predetermined prize are rearranged to the display in such a manner as to partially cover the second symbols stop-displayed to the symbol display. Therefore, it appears to the player that the synthetic symbols each including the first symbol image and the partially covered second symbol image are displayed. Such symbols formed by synthesizing the two kinds of symbols are not usually displayed in slot machines, and a player is unfamiliar with such views. Therefore, by showing the player such symbols, it is possible to have the player feel freshness. This can result in provision of a game in which the player is unlikely to become bored.

Further, according to the aforementioned slot machine, the first symbol image is associated with the predetermined prize. When the rearranged first symbol images or a combination thereof constitute the predetermined prize (e.g. when a predetermined winning combination is established along the winning line), the special first symbol images are displayed to the display in such a manner as to cover substantially the whole of the second symbols partially covered by the first symbol images constituting the predetermined prize. The special first symbol images correspond to the first symbol images that constitute the predetermined prize.

Thereby, when seen from the player, the whole of the second symbols partially covered by the first symbol images that constitute the predetermined prize are hidden by the special first symbol images. It is therefore possible to give the player an impression as if the first symbol images constituting the predetermined prize have expanded to the special first symbol images as triggered by establishment of the prize. Hence it becomes possible to have the player feel interested in a view being as if the first symbol images expand to the special first symbol images, so as to make the player absorbed in the game.

Moreover, since the special first symbol images corresponding to the predetermined prize are displayed with sizes larger than those of the first symbol images in the case of establishment of the predetermined prize, it is possible to make the player immediately aware of which prize has been established. This enables provision of a game very easy to understand for the player.

The present invention provides a slot machine having the following configuration.

Namely, the aforementioned slot machine comprises a symbol display capable of variably displaying a plurality of first symbols associated with a predetermined prize; a display which is arranged at a front face of the symbol display and capable of rearranging second symbol images in such a manner as to partially cover the respective first symbols; a memory capable of storing second symbol image data indicating the second symbol image and special first symbol image data indicating special first symbol image corresponding to the first symbol images; and a controller programmed so as to execute the processing of: (A) variably displaying and then stop-displaying the plurality of first symbols by the symbol display, (B) rearranging to the display the second symbol images each displayed in such a manner as to partially cover the first symbol stop-displayed in the processing (A) based upon the second symbol image data stored in the memory, and (C) displaying the special first symbol images corresponding to first symbol images which are stop-displayed in the processing (A) and constitute the predetermined prize, to the display based upon the special first symbol image data stored in the memory in such a manner as to cover substantially the whole of the first symbols in place of second symbol images displayed in such a manner as to partially cover the first symbols in a case where the first symbols or a combination thereof constitute the predetermined prize.

According to the aforementioned slot machine, the first symbols associated with the predetermined prize are stop-displayed to the symbol display. Further, the second symbol images are rearranged to the display in such a manner as to partially cover the first symbols stop-displayed to the symbol display. Therefore, it appears to the player that the synthetic symbols each including the partially covered first symbol image and the second symbol image are displayed. Such symbols formed by synthesizing the two kinds of symbols are not usually displayed in slot machines, and a player is unfamiliar with such symbols. Therefore, by showing the player such symbols, it is possible to have the player feel freshness. This can result in provision of a game in which the player is unlikely to become bored.

Further, according to the aforementioned slot machine, the first symbol is associated with the predetermined prize. When the stop-displayed first symbols or a combination thereof constitute the predetermined prize (e.g. when a predetermined winning combination is established along the winning line), the special first symbols are displayed to the display in such a manner as to cover substantially the whole of the second symbols partially covered by the first symbol images constituting the predetermined prize in place of the second symbol images displayed in such a manner as to cover substantially the whole of the first symbols constituting the predetermined prize in place of the second symbol images displayed in such a manner as to partially cover the first symbols.

Thereby, it is possible to give the player an impression as if the first symbols constituting the predetermined prize have expanded to the special first symbol images as triggered by establishment of the prize. Hence it becomes possible to have the player feel interested in a view being as if the first symbols expand to the special first symbol images, so as to make the player absorbed in the game.

Moreover, since the special first symbols corresponding to the predetermined prize are displayed with sizes larger than those of the first symbols in the case of establishment of the predetermined prize, it is possible to make the player immediately aware of which prize has been established. This enables provision of a game very easy to understand for the player.

The present invention provides a control method of a slot machine having the following configuration.

Namely, the aforementioned control method of a slot machine comprises steps of: (A) rearranging synthetic symbol images each including a first symbol image associated with a predetermined prize and a second symbol image different from the first symbol image to a display based upon the first symbol image data indicating the first symbol image and the second symbol image data indicating the second symbol image, and (B) displaying the special first symbol images corresponding to first symbol images which are included in the synthetic symbol images rearranged in the step (A) and constitute the predetermined prize, to the display based upon the special first symbol image data indicating a special first symbol image in place of the synthetic symbol images including the first symbol images out of the synthetic symbol images rearranged in the step (A) in a case where the first symbol images included in the synthetic symbol images rearranged in the step (A) or a combination thereof constitute the predetermined prize.

According to the aforementioned control method of a slot machine, the synthetic symbol images including the first symbol images and the second symbol images are rearranged to the display. Such symbol images formed by synthesizing the two kinds of symbol images are not usually displayed in slot machines, and a player is unfamiliar with such symbol images. Therefore, by showing the player such symbol images, it is possible to have the player feel freshness. This can result in provision of a game in which the player is unlikely to become bored.

Further, according to the aforementioned control method of a slot machine, the first symbol image is associated with the predetermined prize. When the first symbol images included in the rearranged synthetic symbol images or a combination thereof constitute the predetermined prize (e.g. when a predetermined winning combination is established along a winning line), the special first symbol images are displayed to the display in place of the synthetic symbol images (the synthetic symbol images rearranged along the winning line) including the first symbol images that constitute the predetermined prize. The special first symbol images correspond to the first symbol images that constitute the predetermined prize.

Thereby, when the first symbol images included in the rearranged synthetic symbol images constitute the predetermined prize, the first symbol images can be displayed to the display with substantially the same sizes as those of the synthetic symbol images. It is therefore possible to give the player an impression as if the first symbol images constituting the predetermined prize have expanded to the special first symbol images as triggered by establishment of the prize. Hence it becomes possible to have the player feel interested in a view being as if the first symbol images expand to the special first symbol images, so as to make the player absorbed in the game.

Moreover, since the special first symbol images corresponding to the predetermined prize are displayed with sizes larger than those of the first symbol images and the second symbol images in the case of establishment of the predetermined prize, it is possible to make the player immediately aware of which prize has been established. This enables provision of a game very easy to understand for the player.

The present invention provides a control method of a slot machine having the following configuration.

Namely, the aforementioned control method of a slot machine comprises steps of: (A) variably displaying and then stop-displaying a plurality of synthetic symbols each including a first symbol image associated with a predetermined prize and a second symbol image different from the first symbol images by a symbol display, and (B) displaying special first symbol images corresponding to first symbols which are stop-displayed in the step (A) and constitute the predetermined prize, to a display based upon special first symbol image data indicating special first symbol image corresponding to the first symbol images in such a manner as to cover the synthetic symbols including the first symbols in a case where the first symbols or a combination thereof constitute the predetermined prize.

According to the aforementioned control method of a slot machine, the synthetic symbols each including the first symbol and the second symbol are stop-displayed to the symbol display. Such symbols formed by synthesizing the two kinds of symbols are not usually displayed in slot machines, and a player is unfamiliar with such symbols. Therefore, by showing the player such symbols, it is possible to have the player feel freshness. This can result in provision of a game in which the player is unlikely to become bored.

Further, according to the aforementioned control method of a slot machine, the first symbol is associated with the predetermined prize. When the first symbols included in the stop-displayed synthetic symbols or a combination thereof constitute the predetermined prize (e.g. when a predetermined winning combination is established along a winning line), the special first symbol images are displayed to the display in place of the synthetic symbols (the synthetic symbols stop-displayed along the winning line) including the first symbols that constitute the predetermined prize. The special first symbol images correspond to the first symbols that constitute the predetermined prize.

Thereby, when seen from the player, the synthetic symbols each including the first symbol that constitutes the predetermined prize are hidden by the special first symbol images. It is therefore possible to give the player an impression as if the first symbols constituting the predetermined prize have expanded to the special first symbol images as triggered by establishment of the prize. Hence it becomes possible to have the player feel interested in a view being as if the first symbols expand to the special first symbol images, so as to make the player absorbed in the game.

Moreover, since the special first symbol images corresponding to the predetermined prize are displayed with sizes larger than those of the first symbols and the second symbols in the case of establishment of the predetermined prize, it is possible to make the player immediately aware of which prize has been established. This enables provision of a game very easy to understand for the player.

The present invention provides the control method of a slot machine having the following configuration.

Namely, the aforementioned control method of a slot machine comprises steps of: (A) variably displaying and then stop-displaying a plurality of second symbols by a symbol display, (B) rearranging to a display first symbol images each displayed in such a manner as to partially cover the second symbol stop-displayed in the step (A) based upon first symbol image data indicating the first symbol associated with a predetermined prize, and (C) displaying the special first symbol images corresponding to first symbol images which are stop-displayed in the step (A) and constitute the predetermined prize, to the display based upon the special first symbol image data indicating the special first symbol images corresponding to the first symbol images in such a manner as to cover substantially the whole of second symbols partially covered by the first symbol images in a case where the first symbols or a combination thereof constitute the predetermined prize.

According to the aforementioned control method of a slot machine, the second symbols are stop-displayed to the symbol display. Further, the first symbol images associated with the predetermined prize are rearranged to the display in such a manner as to partially cover the second symbols stop-displayed to the symbol display. Therefore, it appears to the player that the synthetic symbols each including the first symbol image and the partially covered second symbol image are displayed. Such symbols formed by synthesizing the two kinds of symbols are not usually displayed in slot machines, and a player is unfamiliar with such views. Therefore, by showing the player such symbols, it is possible to have the player feel freshness. This can result in provision of a game in which the player is unlikely to become bored.

Further, according to the aforementioned control method of a slot machine, the first symbol image is associated with the predetermined prize. When the rearranged first symbol images or a combination thereof constitute the predetermined prize (e.g. when a predetermined winning combination is established along the winning line), the special first symbol images are displayed to the display in such a manner as to cover substantially the whole of the second symbols partially covered by the first symbol images constituting the predetermined prize. The special first symbol images correspond to the first symbol images that constitute the predetermined prize.

Thereby, when seen from the player, the second symbols partially covered by the first symbol images that constitute the predetermined prize are hidden by the special first symbol images. It is therefore possible to give the player an impression as if the first symbol images constituting the predetermined prize have expanded to the special first symbol images as triggered by establishment of the prize. Hence it becomes possible to have the player feel interested in a view being as if the first symbol images expand to the special first symbol images, so as to make the player absorbed in the game.

Moreover, since the special first symbol images corresponding to the predetermined prize are displayed with sizes larger than those of the first symbol images in the case of establishment of the predetermined prize, it is possible to make the player immediately aware of which prize has been established. This enables provision of a game very easy to understand for the player.

The present invention provides the control method of a slot machine having the following configuration.

Namely, the aforementioned control method of a slot machine comprises steps of: (A) variably displaying and then stop-displaying a plurality of first symbols associated with a predetermined prize to a symbol display, (B) rearranging second symbol images to a display based upon second symbol image data indicating second symbol images in such a manner as to partially cover the first symbols stop-displayed in the step (A), and (C) displaying special first symbol images corresponding to first symbol images which are stop-displayed in the step (A) and constitute the predetermined prize, to the display based upon special first symbol image data indicating the special first symbol images corresponding to the first symbol images in such a manner as to cover substantially the whole of the first symbols in place of second symbol images displayed in such a manner as to partially cover the first symbols in a case where the first symbols or a combination thereof constitute the predetermined prize.

According to the aforementioned control method of a slot machine, the first symbols associated with the predetermined prize are stop-displayed to the symbol display. Further, the second symbol images associated with the predetermined prize are rearranged to the display in such a manner as to partially cover the first symbols stop-displayed to the symbol display. Therefore, it appears to the player that the synthetic symbols each including the partially covered first symbol image and the second symbol image are displayed. Such symbols formed by synthesizing the two kinds of symbols are not usually displayed in slot machines, and a player is unfamiliar with such views. Therefore, by showing the player such symbols, it is possible to have the player feel freshness. This can result in provision of a game in which the player is unlikely to become bored.

Further, according to the aforementioned control method of a slot machine, the first symbol is associated with the predetermined prize. When the stop-displayed first symbols or a combination thereof constitute the predetermined prize (e.g. when a predetermined winning combination is established along the winning line), the special first symbol images are displayed to the display in such a manner as to cover substantially the whole of the first symbols constituting the predetermined prize in place of the second symbol images displayed in such a manner as to partially cover the first symbols.

It is therefore possible to give the player an impression as if the first symbol images constituting the predetermined prize have expanded to the special first symbol images as triggered by establishment of the prize. Hence it becomes possible to have the player feel interested in a view being as if the first symbols expand to the special first symbol images, so as to make the player absorbed in the game.

Moreover, since the special first symbol images corresponding to the predetermined prize are displayed with sizes larger than those of the first symbols in the case of establishment of the predetermined prize, it is possible to make the player immediately aware of which prize has been established. This enables provision of a game very easy to understand for the player.

BRIEF DESCRIPTION OF THE DRAWINGS

FIG. 2 is a view describing symbol images displayed in the symbol matrix.

FIG. 7 is a view illustrating a corresponding relationship between a winning combination and a payout amount.

DESCRIPTION OF THE EMBODIMENTS

First Embodiment

A general description of a first embodiment will be given by using FIG. 1A to 1H, FIG. 2.

Figure 1A:
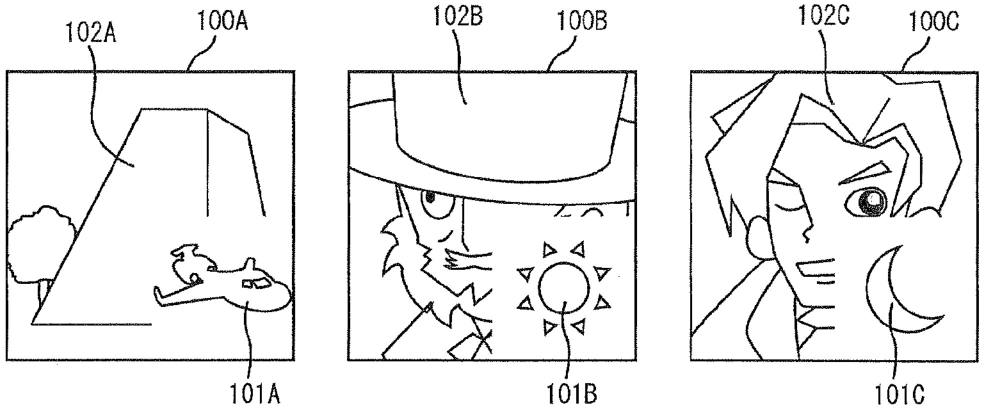
FIG. 1A is a view for explaining synthetic symbols.

FIG. 1A is a view for explaining synthetic symbols.

Figure 1B:
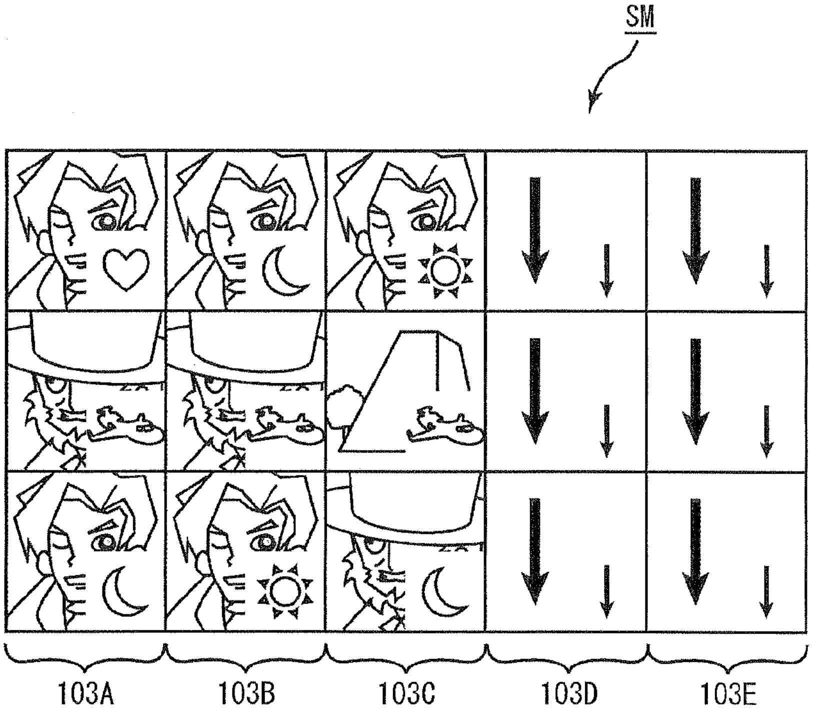
FIG. 1B is a view illustrating an exemplary symbol matrix.

FIG. 1B is a view illustrating an exemplary symbol matrix.

Figure 1C:
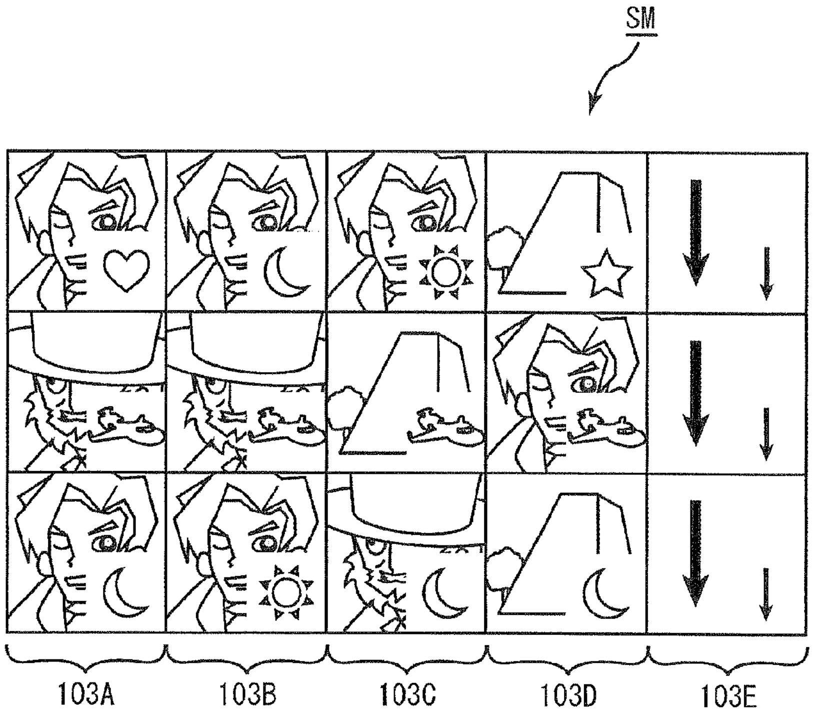
FIG. 1C is a view illustrating an exemplary symbol matrix.

FIG. 1C is another view illustrating an exemplary symbol matrix.

Figure 1D:
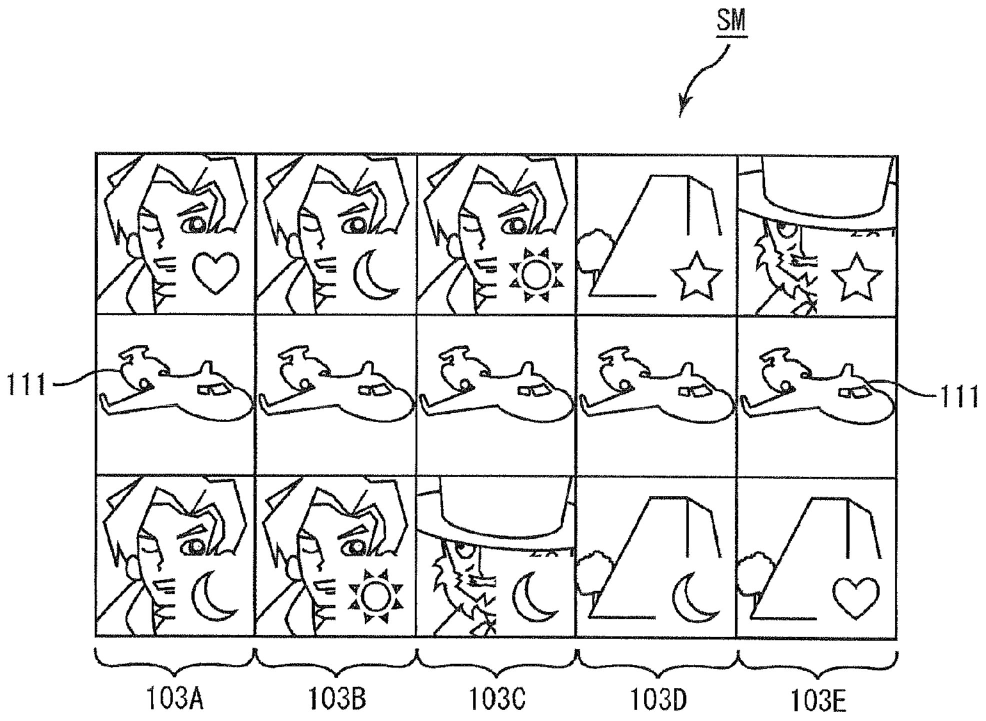
FIG. 1D is a view illustrating an exemplary symbol matrix.

FIG. 1D is a view illustrating an exemplary symbol matrix.

Figure 1E:
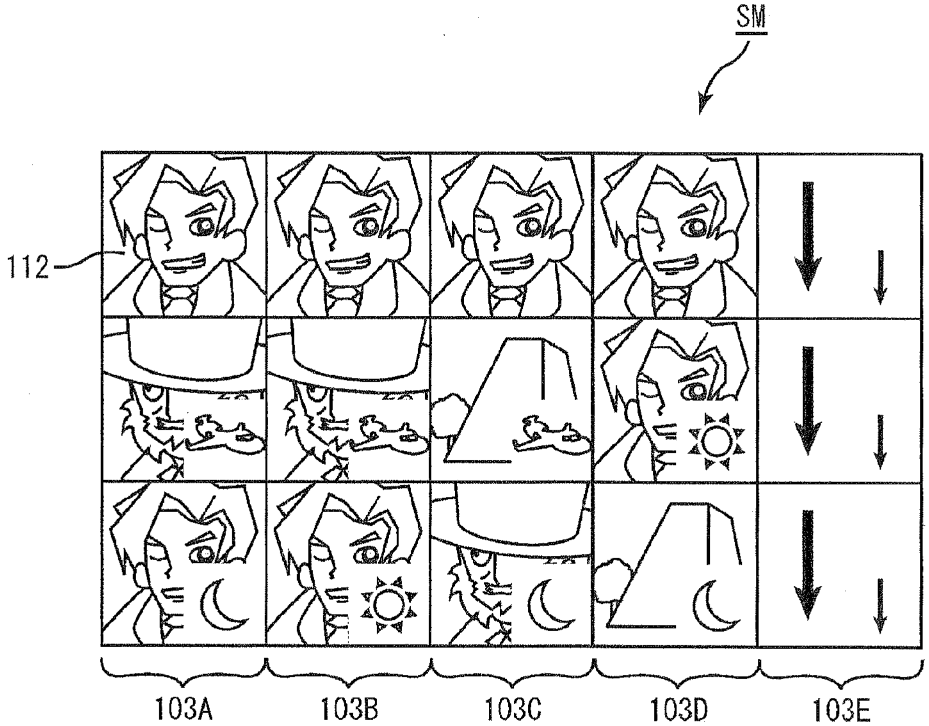
FIG. 1E is a view illustrating an exemplary symbol matrix.

FIG. 1E is a view illustrating an exemplary symbol matrix.

Figure 1F:
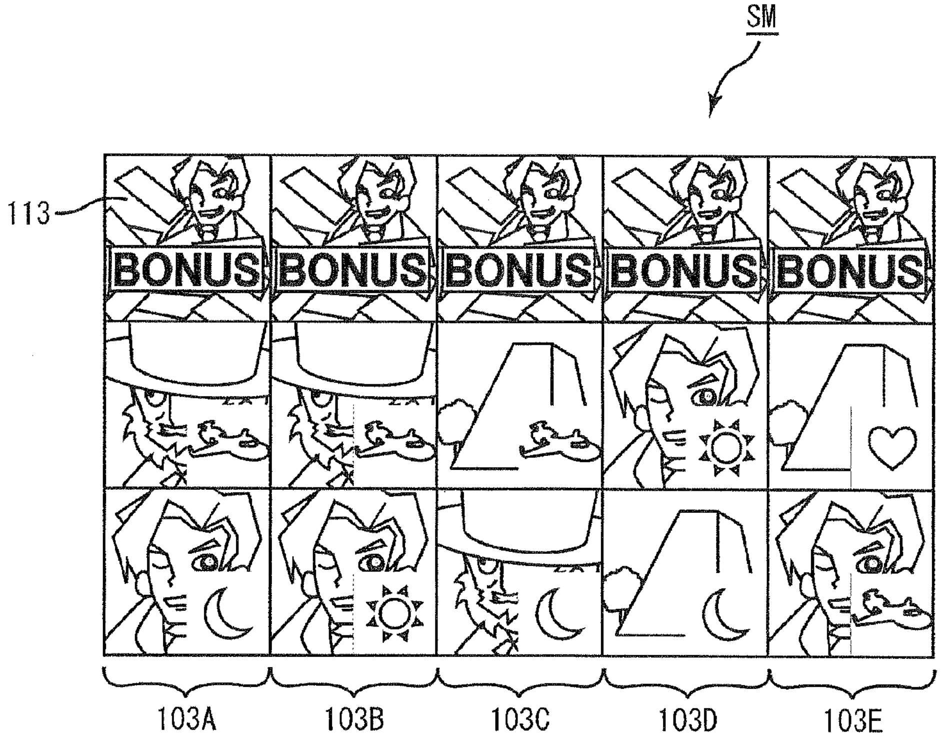
FIG. 1F is a view illustrating an exemplary symbol matrix.

FIG. 1F is a view illustrating an exemplary symbol matrix.

Figure 1G:
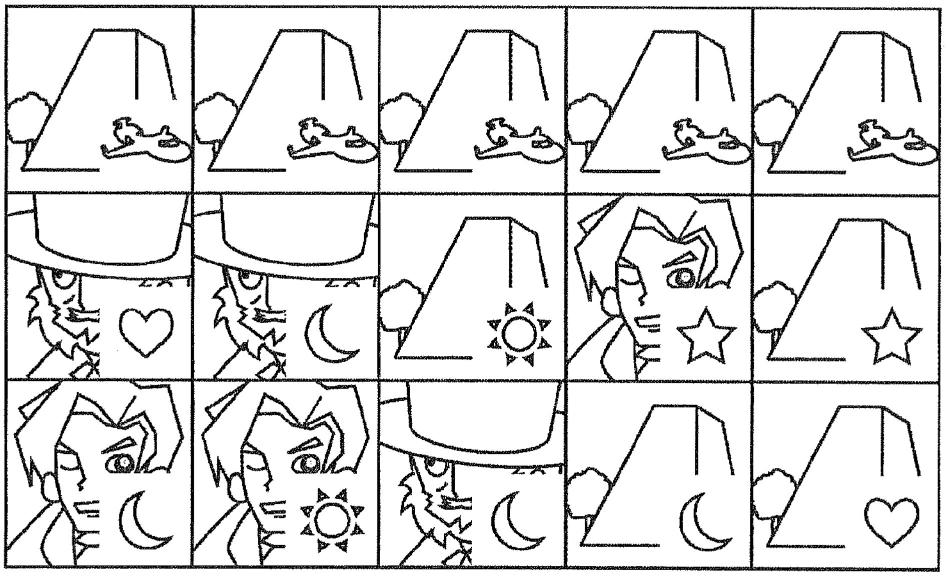
FIG. 1G is a view illustrating an exemplary symbol matrix.

FIG. 1G is a view illustrating an exemplary symbol matrix.

Figure 1H:
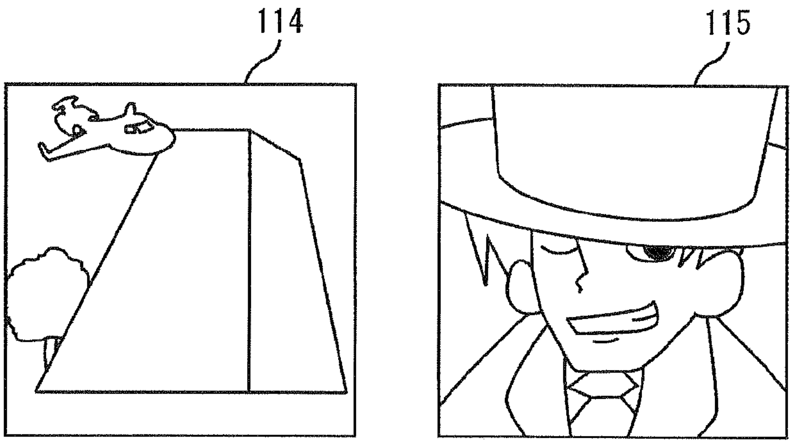
FIG. 1H is a view illustrating an example of symbol images displayed in a symbol matrix.

FIG. 1H is a view illustrating an example of symbol images displayed in a symbol matrix.

FIG. 2 is a view describing symbol images displayed in the symbol matrix.

In the following, symbol images displayed in a symbol matrix SM in a slot machine 10 (cf. FIG. 3) according to the first embodiment are described in line with [I] to [XV] of FIG. 2. It is to be noted that the symbol images is described simply as "symbols" in FIG. 2.

[I] Synthetic Symbol Image

In the slot machine 10 according to the first embodiment, synthetic symbol images (cf. a synthetic symbol image 100A, a synthetic symbol image 100B, a synthetic symbol image 100C in FIG. 1A) are rearranged in the symbol matrix SM. The synthetic symbol images are images each including a normal payout symbol image (small) and a bonus payout symbol image (small).

In the example of FIG. 1A, the synthetic symbol image 100A includes an "AIR PLANE" symbol image (small) 101A and a jackpot trigger symbol image (small) 102A. The synthetic symbol image 100B includes a "SUN" symbol image (small) 101B and a free game trigger symbol image (small) 102B. The synthetic symbol image 100C includes a "MOON" symbol image (small) 1010 and a bonus game trigger symbol image (small) 102C.

As shown in FIG. 1B, the symbol matrix SM is blocked out into three rows and five columns, a total of fifteen synthetic symbol image display regions, and one synthetic symbol image can be rearranged in each synthetic symbol images display region. Further, each synthetic symbol image display region is formed by a normal payout symbol image (small) display region and a bonus payout symbol image (small) display region. A normal payout symbol image (small) can be rearranged in the normal payout symbol image (small) display region. A bonus payout symbol image (small) can be rearranged in the bonus payout symbol image (small) display region.

Further, in the following, three rows constituting the symbol matrix SM are referred simply to as an "upper row", a "middle row", and a "lower row".

[II] Normal Payout Symbol Image (Small)

The "AIR PLANE" symbol image (small) 101A, the "SUN" symbol image (small) 101B and the "MOON" symbol image (small) 101C are examples of the normal payout symbol images (small). In the first embodiment, five kinds of normal payout symbol images exist: the "AIR PLANE" symbol image (small), the "SUN" symbol image (small), the "MOON" symbol image (small), a "STAR" symbol image (small), and a "HEART" symbol image (small) (cf. FIG. 7).

The normal payout symbol image (small) corresponds to the first symbol image in the present invention.

When five normal payout symbol images (small) are rearranged along a line, a normal payout is conducted. In the following, five normal payout symbol images (small) rearranged along a line are described as "AIR PLANE×5", and also referred to as a winning combination (or prize). The number of payouts (hereinafter also referred to as odds) per coin is set to each winning combination (cf. FIG. 7).

[III] Bonus Payout Symbol Image (Small)

The bonus payout symbol image (small) includes the jackpot trigger symbol image (small) 102A, the free game trigger symbol image (small) 102B, and the bonus game trigger symbol image (small) 102C.

The bonus payout symbol image (small) corresponds to the second symbol image in the present invention.

[IV] Jackpot Trigger Symbol Image (Small)

When five jackpot trigger symbol images (small) are rearranged along a line, a payout is conducted based upon a progressive jackpot. The rearrangements of five jackpot trigger symbol images (small) along a line is also referred to as that "establishment of a jackpot trigger" in the present specification.

[V] Free Game Trigger Symbol Image (Small)

When five free game trigger symbol images (small) are rearranged along a line, a free game is generated. During a free game period, a slot machine game is played without BETTING game media. The rearrangements of five free game trigger symbol images (small) along a line is also referred to as "establishment of a free game trigger" in the present specification.

[VI] Bonus Game Trigger Symbol Image (Small)

When five bonus game trigger symbol images (small) are rearranged along a line, a bonus game is generated. During a bonus game period, a slot machine game is played based upon relatively large odds (cf. FIG. 7). The rearrangements of five bonus game trigger symbol images (small) along a line is also referred to as that "establishment of a bonus game trigger" in the present specification.

[VII] Normal Payout Symbol Image (Large)

Rearrangements of the synthetic symbol images is performed in order of a first display region 103A, a second display region 103B, a third display region 103C, a fourth display region 103D, and a fifth display region 103E. FIG. 1B shows a state where the rearrangements have been performed up to the third display region 103C. FIG. 10 shows a state where the rearrangements have been performed up to the fourth display region 103D. FIG. 10 shows a ready-to-win state for establishment of "AIR PLANE×5". Namely, when the "AIR PLANE" symbol image (small) is rearranged on the middle row in the fifth display region, "AIR PLANE×5" is established.

Upon establishment of "AIR PLANE×5", "AIR PLANE" symbol images (large) 111 (cf. FIG. 1D) are displayed on the row where "AIR PLANE×5" has been established. The "AIR PLANE" symbol image (large) is an example of a normal payout symbol image (large). As thus described, images, which are displayed in place of synthetic symbol images including normal payout symbol images (small) constituting a winning combination in the case of establishment of the winning combination, are normal payout symbol images (large).

The normal payout symbol image (large) corresponds to the special first symbol image in the present invention.

[VIII] Jackpot Trigger Symbol Image (Large)

[IX] Free Game Trigger Symbol Image (Large)

[X] Bonus Game Trigger Symbol Image (Large)

In the example of FIG. 1B, bonus game trigger symbol images (small) are rearranged on the upper row in the first display region 103A to the third display region 103C. Subsequently, when the bonus game trigger symbol image (small) is rearranged on the upper row in the fourth display region, bonus game trigger symbol images (large) 112 are displayed on the upper row in the first display region 103A to the fourth display region 103D.

As thus described, images, which are displayed in the first display region 103A to the fourth display region 103D in place of synthetic symbol images including bonus game trigger symbol images (small) in the case of the rearrangements of the bonus game trigger symbol images (small) along a line, are bonus game trigger symbol images (large).

Since a similar description applies to the jackpot trigger symbol image (large) and the free game trigger symbol image (large), descriptions thereof are omitted here.

[XI] Jackpot Trigger Establishment Symbol Image

[XII] Free Game Trigger Establishment Symbol Image

[XIII] Bonus Game Trigger Establishment Symbol Image

FIG. 1E shows a ready-to-win state for establishment of the bonus game trigger. Namely, when the bonus game trigger symbol images (small) are rearranged on the upper row in the fifth display region, five bonus game trigger symbol images (small) are rearranged on the upper row.

When the bonus game trigger symbol image (small) is rearranged on the upper row in the fifth display region after rearrangements of the bonus game trigger symbol images (small) along a line on the upper row in the first display region 103A to the fourth display region 103D, bonus game trigger establishment symbol images 113 are displayed on the upper row in the first display region 103A to the fifth display region 103E, as shown in FIG. 1F.

As thus described, the images displayed on the row as triggered by rearrangements of five bonus game trigger symbol images (small) along a line are bonus game trigger establishment symbol images.

Since a similar description is applicable to jackpot trigger establishment symbol images and free game trigger establishment symbol images, descriptions thereof are omitted here.

The jackpot trigger establishment symbol image, the free game trigger establishment symbol image and the bonus game trigger establishment symbol image constitute the special second symbol images in the present invention.

[XIV] Double Payout Symbol Image

Double payout symbol images are images displayed in the case of establishment of the jackpot trigger simultaneously with establishment of the winning combination on one row in the symbol matrix SM.

In FIG. 1G, on the upper row, "AIR PLANE×5" has been established while the jackpot trigger has been established. In this case, in place of five synthetic symbol images (synthetic symbol images each including the "AIR PLANE" symbol image (small) and the jackpot trigger symbol image (small)) rearranged on the upper row, five double payout symbol images 114 (cf. FIG. 1H) are displayed.

[XV] Special Bonus Game Trigger Establishment Symbol Image

The special bonus game trigger establishment symbol images 115 (cf. FIG. 1H) are images displayed in the case of simultaneous establishment of the free game trigger and the bonus game trigger by one-time rearrangement in the symbol matrix SM. When the free game trigger and the bonus game trigger are established simultaneously by one-time rearrangement, a special bonus game is generated. During a special bonus game period, the slot machine game is played even without BETTING game media, and coins are paid out based upon the same odds as odds used during the bonus game.

In the present specification, slot machine games that are played during periods other than the periods of the free game, the bonus game and the special game are also referred to as normal games.

There has been described the outline of the first embodiment.

Hereinafter, the first embodiment will be described in more detail.

Figure 3:
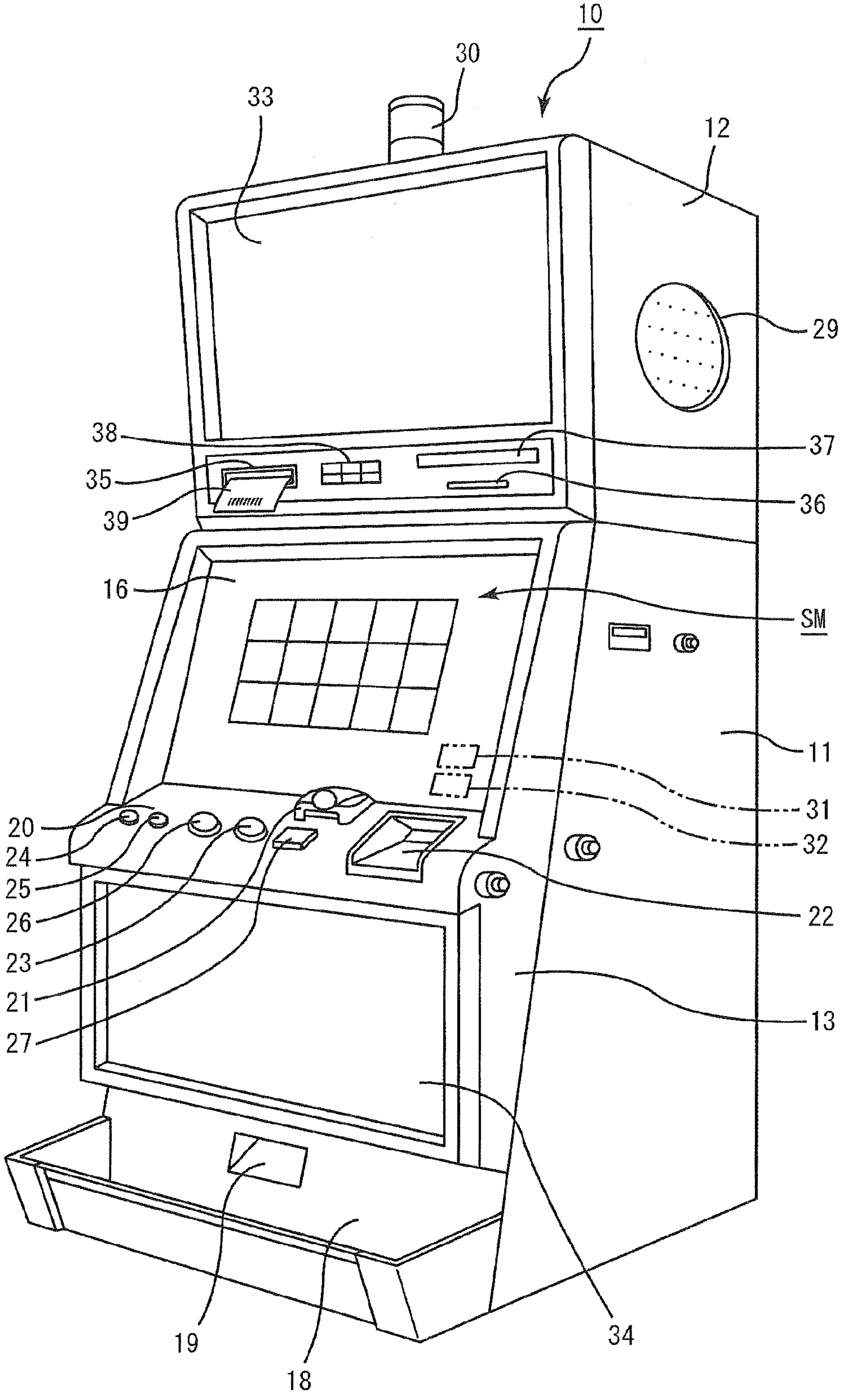
FIG. 3 is a perspective view illustrating the external appearance of a slot machine according to a first embodiment.

FIG. 3 is a perspective view illustrating the external appearance of the slot machine according to the first embodiment.

In the slot machine 10, a coin, a bill, or electronic valuable information corresponding thereto is used as a game medium. However, in the present invention, a game medium is not particularly limited. Examples of the game medium may include a medal, a token, electronic money, or a ticket. It should be noted that the ticket is not particularly limited, and examples thereof include a ticket with a bar code, which will be described later.

Here, the slot machine 10 is a stand-alone type slot machine that is not connected to a network, but the present invention can also be applied to a slot machine connected to a network.

The slot machine 10 includes: a cabinet 11; a top box 12 placed on the upper side of the cabinet 11; and a main door 13 provided at the front face of the cabinet 11. The lower image display panel 16 is provided in front of the main door 13. The lower image display panel 16 includes a liquid crystal display panel and the symbol matrix SM (cf. FIG. 1B etc.) is displayed thereto. The lower image display panel 16 corresponds to the display in the present invention.

In the lower image display panel 16, there are provided a number-of-credits display section 31 and a number-of-payouts display section 32 (not shown).

The number-of-credits display section 31 displays an image indicating the number of credited coins. The number-of-payouts display section 32 displays an image indicating the number of coins to be paid out as the payout.

Further, a touch panel 69, which is not shown in the figure, is provided on the front face of the lower image display panel 16, and the player can input various kinds of commands by operating the touch panel 69.

Below the lower image display panel 16, there are provided a control panel 20 comprised of a plurality of buttons 23 to 27 with each of which a command according to the game progress is inputted by the player, a coin receiving slot 21 through which a coin is accepted into the cabinet 11, and a bill validator 22.

The control panel 20 is provided with a start button 23, a change button 24, a CASHOUT button 25, a 1-BET button 26, and a maximum BET button 27. The start button 23 is used for inputting a command to start a game. The change button 24 is used for making a request of staff at a recreation facility for exchange. The CASHOUT button 25 is used for inputting a command to pay out credited coins to a coin tray 18.

The 1-BET button 26 is used for inputting a command to BET one coin on a game out of credited coins. The maximum BET button 27 is used for inputting a command to BET the maximum number (100 in the first embodiment) of coins that can be bet on a single game out of credited coins.

The bill validator 22 not only discriminates a regular bill from a false bill, but also accepts the regular bill into the cabinet 11. It should be noted that the bill validator 22 may be configured so as to be capable of reading a later-described ticket 39 with a barcode. At the lower front face of the main door 13, namely below the control panel 20, there is provided a belly glass 34 on which a character or the like of the slot machine 10 is drawn.

At the front face of the top box 12, an upper image display panel 33 is provided. The upper image display panel 33 is provided with a liquid crystal panel to display, for example, an image representing an introduction of the contents of a game or a description of a rule of the game.

Further, the top box 12 is provided with a speaker 29. Below the upper image display panel 33, there are provided a ticket printer 35, a card reader 36, a data display 37, and a keypad 38. The ticket printer 35 prints on a ticket a barcode as coded data of the number of credits, date and time, an identification number of the slot machine 10, and the like, and outputs the ticket as a ticket 39 with a barcode. The player can make another slot machine read the ticket 39 with a barcode to play a game thereon, or can exchange the ticket 39 with a barcode with bills or the like at a predetermined place in the recreation facility (for example, a cashier in a casino).

The card reader 36 reads data from a smart card and writes data into the smart card. The smart card is a card owned by the player, and for example, data for identifying a player and data on a history of games played by the player are stored therein. Data corresponding to a coin, a bill, or a credit may be stored in the smart card. Further, in place of the smart card, a magnetic stripe card may be adopted. The data display 37 is comprised of a fluorescent display or the like, and displays, for example, data read by the card reader 36 or data inputted by the player through the keypad 38. The keypad 38 is used for inputting a command and data concerning the issue of a ticket and the like.

Figure 4:
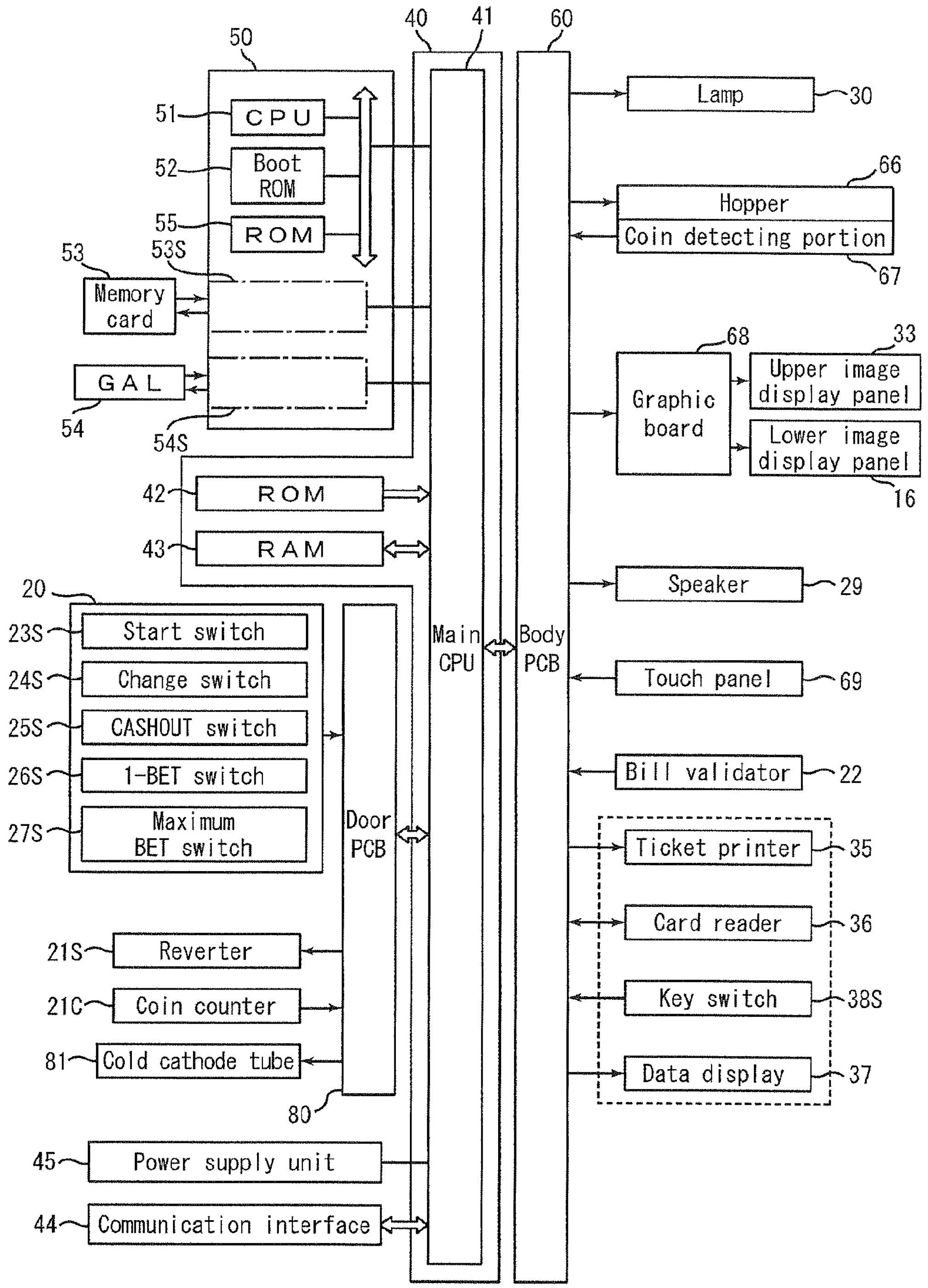
FIG. 4 is a block diagram illustrating an internal configuration of the slot machine illustrated in FIG. 3.

FIG. 4 is a block diagram illustrating an internal configuration of the slot machine shown in FIG. 3.

A gaming board 50 includes a CPU (Central Processing Unit) 51, a ROM 55, and a boot ROM 52 which are interconnected to one another via an internal bus, a card slot 53S corresponding to a memory card 53, and an IC socket 54S corresponding to a GAL (Generic Array Logic) 54.

The memory card 53 is formed from a nonvolatile memory such as CompactFlash (registered trademark) and stores game programs and game system programs. The game programs include a symbol selection program. The aforementioned symbol selection program is a program for determining the symbol images (the normal payout symbol image (small) and the bonus payout symbol image (small)) to be rearranged in the symbol matrix SM. The aforementioned symbol selection program includes symbol weighing data in association with a plurality of types of payout ratios (for example, 80%, 84%, 88%). The symbol weighing data is data indicating the correspondence between the respective symbol images, and one or more random numbers which fall in a predetermined numerical range (0 to 255). The payout ratios are determined based on payout-ratio setting data outputted from the GAL 54 and, based on the symbol weighing data associated with the payout ratios, the symbol images to be rearranged in the symbol matrix are determined.

Further, the game program includes table data (cf. FIG. 7) showing a corresponding relationship between a winning combination and a payout amount.

Further, the card slot 53S is configured so as to allow the memory card 53 to be inserted thereinto or ejected therefrom, and is connected to a mother board 40 via an IDE bus. Thus, the memory card 53 can be ejected from the card slot 53S, and then another game program is written onto the memory card 53, and the memory card 53 can be inserted into the card slot 53S, to change the type and contents of a game to be played on the slot machine 10. The game program includes a program associated with the progress of a game. The game program also includes image data and sound data to be outputted during the game. The image data includes image data indicating a symbol matrix, image data indicating symbol images, and the like.

The GAL 54 is a type of PLD having a fixed OR array structure. The GAL 54 includes plural input ports and plural output ports and, when predetermined data is inputted to an input port, the GAL 54 outputs data corresponding to the aforementioned data from an output port. The data outputted from this output port is the aforementioned payout-ratio setting data.

Further, the IC socket 54S is configured to allow the GAL to be attached thereto and detached therefrom and is connected to the mother board 40 through a PCI bus. Accordingly, the GAL 54 can be replaced with another GAL 54 to change the payout-ratio setting data.

A CPU 51, a ROM 55 and a boot ROM 52 interconnected to one another via an internal bus are connected to the motherboard 40 by PCI bus. The PCI bus supplies power to the gaming board 50 from the mother board 40, as well as transmitting a signal between the mother board 40 and the gaming board 50. The ROM stores country identification information and an authentication program. The boot Rom 52 stores an auxiliary authentication program and a program (boot code) to be used by the CPU 51 for activating the auxiliary authentication program, and the like.

The authentication program is a program (falsification check program) for authenticating a game program and a game system program. The authentication program is written along a procedure (authentication procedure) for checking and proving that a game program and a game system program to be subject to authentication loading processing have not been falsified, namely authenticating the game program and the game system program. The auxiliary authentication program is a program for authenticating the above-mentioned authentication program. The auxiliary authentication program is written along a procedure (authentication procedure) for proving that an authentication program to be subject to the authentication processing has not been falsified, namely, authenticating the authentication program.

The mother board 40 is constructed with a general-purpose mother board commercially available (a printed circuit board on which basic parts of a personal computer are mounted) and includes a main CPU 41, ROM (Read Only Memory) 42 and RAM (Random Access Memory) 43. The mother board 40 is the controller of the present invention.

ROM 42 is constituted of a memory device such as a flash memory and stores thereon a program such as BIOS (Basic Input/Output System) executed by the main CPU 41 and permanent data. When BIOS is executed by the main CPU 41, not only is initialization processing for predetermined peripheral devices conducted, but a capture processing for the game program and game system program stored on the memory card 53 is also started via the gaming board 50. In the present invention, contents of ROM 42 may be rewritable or not rewritable.

RAM 43 stores data and a program used at the time of operation of the main CPU 41, and various flags. RAM 43 can also store the authentication program read through the gaming board 50, the game program, and the game system program. RAM 43 further stores data on the number of credits, the number of coins-in or coins-out for one game, and the like.

Further, in the RAM 43, a number-of-free-game storage area, a number-of-bonus-game storage area, and a number-of-special-bonus-game storage area are provided. The number-of-free-game storage area stores data indicating the remaining number of the free games. The number-of-bonus-game storage area stores data indicating the remaining number of the bonus games. The number-of-special-bonus-game storage area stores data indicating the remaining number of the special bonus game.

To the mother board 40, a body PCB (Printed Circuit Board) 60 and a door PCB 80, which will be described later, are connected through respective USBs. Further, the mother board 40 is connected with a power supply unit 45. When the power is supplied from the power unit 45 to the mother board 40, the main CPU 41 of the mother board 40 is activated and the power is supplied to the gaming board 50 through the PCI bus so that the CPU 51 is activated.

The body PCB 60 and the door PCB 80 are connected with equipment and devices that generate input signals to be inputted to the main CPU 41, and equipment and devices operations of which are controlled by control signals outputted from the main CPU 41. The main CPU 41 executes a game program stored in the RAM 43 based on an input signal inputted to the main CPU 41, thereby executes the predetermined arithmetic processing and stores a result thereof in the RAM 43, or transmits a control signal to each of the equipment and devices as processing for controlling each of the equipment and devices.

To the body PCB 60, there are connected a lamp 30, a hopper 66, a coin detecting portion 67, a graphic board 68, a speaker 29, a touch panel 69, a bill validator 22, a ticket printer 35, a card reader 36, a key switch 38S, and a data display 37. The lamp 30 lights up in a predetermined pattern based on a control signal outputted from the main CPU 41.

The hopper 66 is installed inside the cabinet 11 and pays out a predetermined number of coins from the coin payout exit 19 to the coin tray 18, based on a control signal outputted from the main CPU 41. The coin detecting portion 67 is provided inside the coin payout exit 19, and outputs an input signal to the main CPU 41 when detecting a payout of a predetermined number of coins from the coin payout exit 19.

The graphic board 68 controls, based on a control signal outputted from the main CPU 41, an image display to the upper image display panel 33 and the lower image display panel 16. The number of credits stored in RAM 43 is displayed to the number-of-credits display section 31 (not shown) of the lower image display panel 16. The number of coins-out is displayed to the number-of-payouts display section 32 (not shown) of the lower image display panel 16. The graphic board 68 is equipped with VDP (Video Display Processor) which generates image data based on a control signal outputted from the main CPU 41 and a video RAM which temporarily stores image data generated by VDP, and of the like equipments. It should be noted that image data used in generating image data with VDP is contained in a game program read from the memory card 53 and stored in RAM 43.

The bill validator 22 not only discriminates a regular bill from a false bill, but also accepts the regular bill into the cabinet 11. When accepting a regular bill, the bill validator 22 outputs an input signal to the main CPU 41, based on the face amount of the bill. The main CPU 41 stores, in the RAM 43, the number of credits according to the face amount of the bill transmitted with the input signal.

The ticket printer 35 prints on a ticket, based on a control signal outputted from the main CPU 41, a barcode formed by encoding data such as the number of credits, date and time, an identification number of the slot machine 10, and of the like data stored in the RAM 43, and outputs the ticket as a ticket 39 with a barcode.

The card reader 36 reads data from a smart card and transmits the data to the main CPU 41 or writes data into the smart card based on a control signal from the main CPU 41. The key switch 38S is provided on the keypad 38, and outputs a predetermined input signal to the main CPU 41 when the keypad 38 is operated by the player. The data display 37 displays, based on a control signal outputted from the main CPU 41, data read by the card reader 36 or data inputted by the player through the keypad 38.

To the door PCB 80, there are connected a control panel 20, a reverter 21S, a coin counter 21C, and a cold cathode tube 81. The control panel 20 is provided with a start switch 23S corresponding to the start button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. Each of the switches 23S to 27S outputs an input signal to the main CPU 41 when each of the buttons 23 to 27 corresponding thereto is operated by the player.

The coin counter 210 is provided inside the coin receiving slot 21 and discriminates a regular coin from a false coin inserted into the coin receiving slot 21 by the player. Coins other than regular coins are discharged from the coin payout exit 19. When the coin counter 21C detects a regular coin, the coin counter 21C outputs an input signal to the main CPU 41.

The reverter 21S operates based on a control signal outputted from the main CPU 41, and distributes a coin identified by the coin counter 21C as a regular coin into a cash box (not shown) or the hopper 66, which are disposed in the slot machine 10. Specifically, when the hopper 66 is filled with coins, a regular coin is distributed into the cash box by the reverter 21S. On the other hand, when the hopper 66 is not filled with coins, the regular coin is distributed into the hopper 66. The cold cathode tube 81 functions as a backlight installed on the rear face side of the lower image display panel 16 and the upper image display panel 33, and lights up based on a control signal to be outputted from the main CPU 41.

Next, processing executed in the slot machine 10 will be described.

Figure 5:
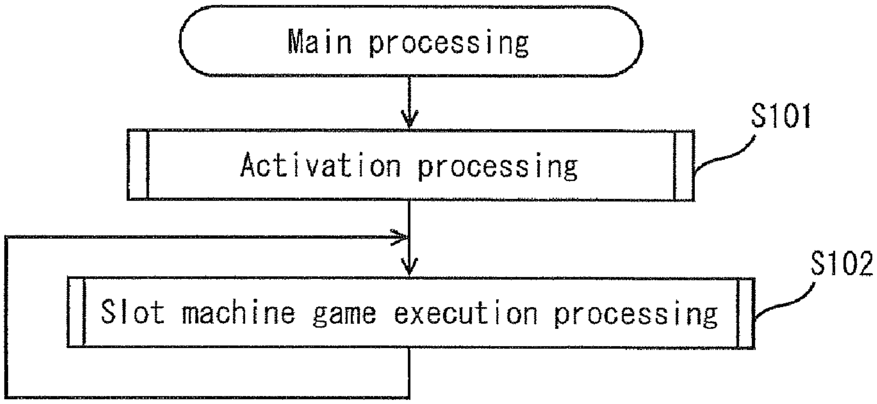
FIG. 5 is a flowchart illustrating main processing executed in the slot machine 10.

FIG. 5 is a flowchart illustrating main processing executed in the slot machine 10 according to a first embodiment.

First, in the slot machine 10, activation processing is executed (step S101). The activation processing will be specifically described later by using FIG. 11 to FIG. 13.

After the activation processing, the main CPU 41 executes processing of addition of the number of credits stored in the RAM 43 as an interrupt processing, on receiving a detection signal outputted from the coin counter 21C when the coin inserted into the coin receiving slot 21 is detected by the coin counter 21.

After the processing of step S101, the main CPU 41 execute slot machine game execution processing (step S102). The slot machine game execution processing will be described in more detail later using FIGS. 6 to 10.

Hereinafter, slot machine game execution processing executed in the slot machine 10 will be described.

The main CPU 41 reads a game program and executes the game program to progress a slot machine game.

Figure 6A:
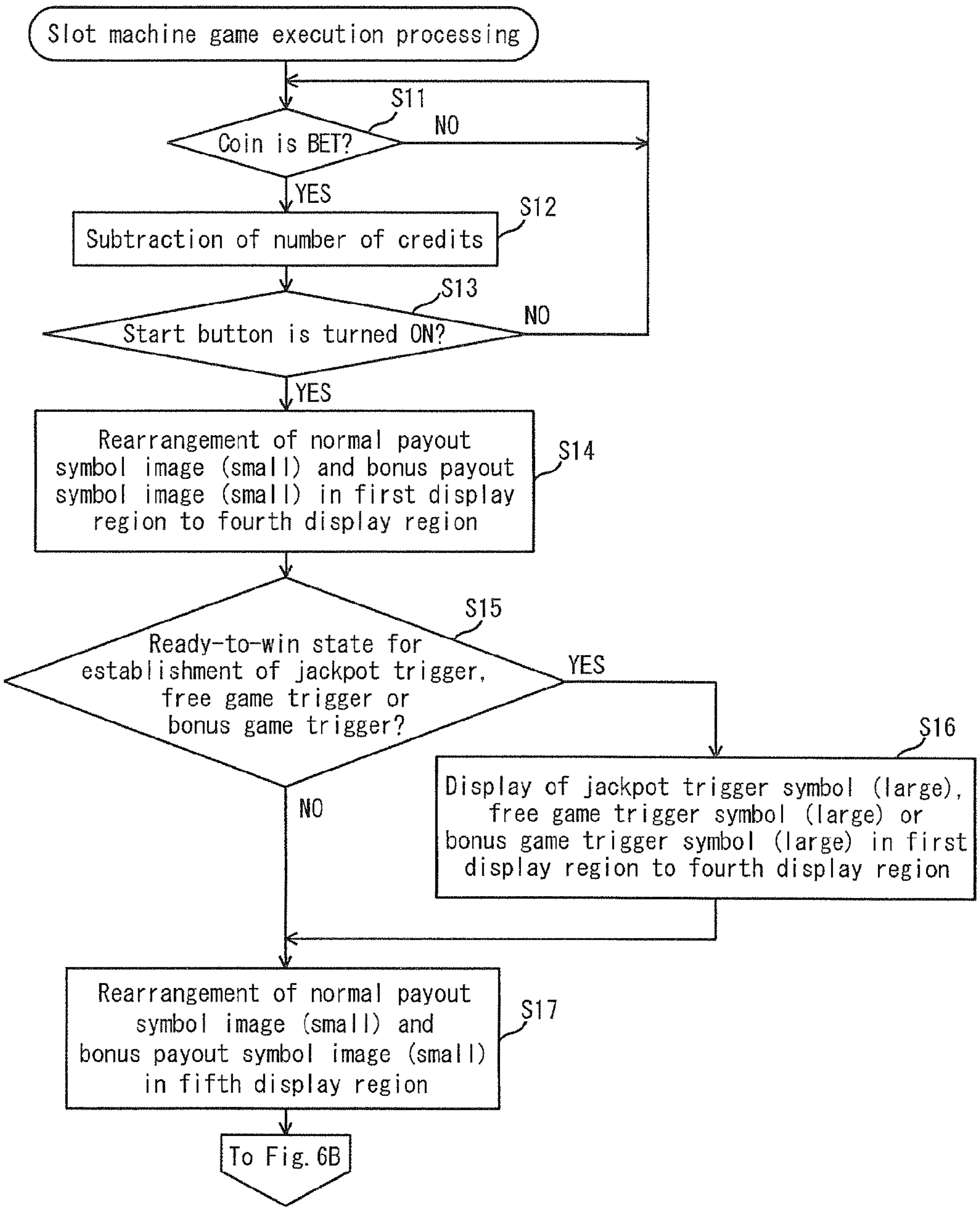
FIG. 6A is a flowchart illustrating a subroutine of slot machine game execution processing.
Figure 6B:
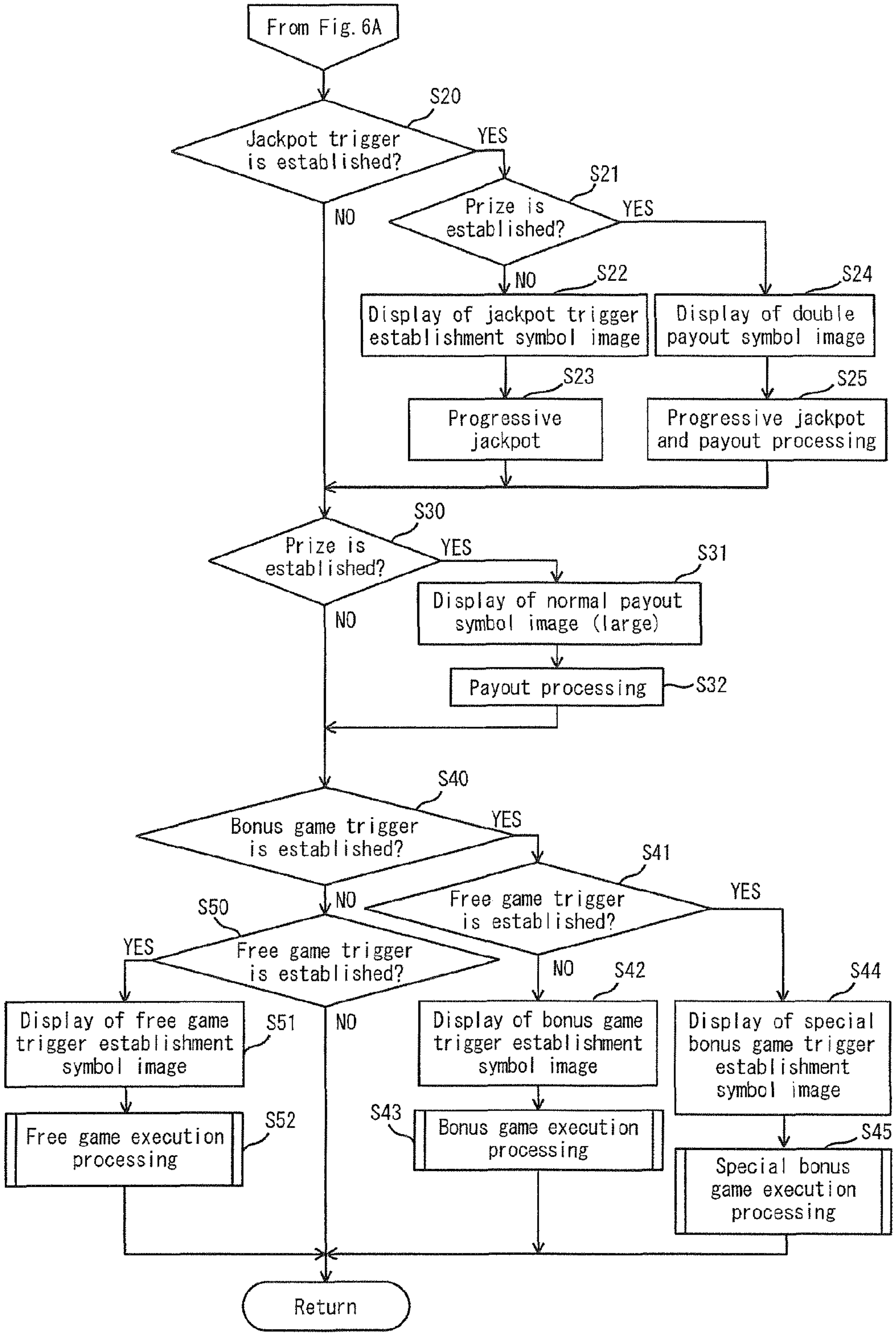
FIG. 6B is a flowchart illustrating a subroutine of slot machine game execution processing.

FIGS. 6A and 6B are flowcharts illustrating a subroutine of slot machine game execution processing.

FIG. 7 is a view illustrating a corresponding relationship between a winning combination and a payout amount.

First, the main CPU 41 determines whether or not a coin has been BET (step S11). In the processing, the main CPU 41 determines whether or not to have received an input signal outputted from the 1-BET switch 26S when the 1-BET button 26 is operated or an input signal outputted from the maximum BET switch 27S when the maximum BET button 27 is operated. When determining that a coin has not been BET, the main CPU 41 returns the processing to step S11.

On the other hand, when determining that a coin has been BET in step S11, the main CPU 41 executes processing for making a subtraction from the number of credits stored in the RAM 43, according to the number of BET coins (step S12). It should be noted that, when the number of BET coins is larger than the number of credits stored in the RAM 43, the main CPU 41 does not execute the processing for making a subtraction from the number of credits stored in the RAM 43, and returns the processing to step S11. When the number of BET coins exceeds an upper limit of the number of coins that can be BET on a single game (10 in the first embodiment), the main CPU 41 does not execute the processing for making a subtraction from the number of credits stored in the RAM 43, and the processing is proceeded to step S13.

Next, the main CPU 41 determines whether or not the start button 23 has been turned on (step S13). In the processing, the main CPU 41 determines whether or not to have received an input signal outputted from the start switch 23S when the start button 23 is pressed.

When determining that the start button 23 has not been turned ON, the main CPU 41 returns the processing to step S11. It should be noted that, when the start button 23 is not turned ON (for example, when a command to end the game is inputted without pressing the start button 23), the main CPU 41 cancels a result of the subtraction obtained in step S12.

On the other hand, when determining in step S13 that the start button 23 has been turned on, the main CPU 41 rearranges the normal payout symbol images (small) and the bonus payout symbol images (small) in the first display region 103A to the fourth display region 103D of the symbol matrix SM (step S14).

In the processing, first, the main CPU 41 starts scroll display of symbol images (normal payout symbol images (small) and bonus payout symbol images (small)) in the first display region 103A to the fifth display region 103E. The main CPU 41 executes the aforementioned symbol selection program, and determines the symbol images (the normal payout symbol images (small) and the bonus payout symbol images (small)) to be rearranged in the first display region 103A to the fifth display region 103E of the symbol matrix SM. The main CPU 41 then rearranges the symbol images (the normal payout symbol images (small) and the bonus payout symbol images (small)) in the normal payout symbol image (small) display regions and the bonus game payout symbol image (small) display regions.

Next, the main CPU 41 determines whether or not the game is in a ready-to-win state for establishment of the jackpot trigger, the free game trigger or the bonus game trigger (step S15). Namely, the main CPU 41 determines whether or not four of at least one kind of bonus payout symbol images (small) out of the jackpot trigger symbol images (small), the free game trigger symbol images (small) and the bonus game trigger symbol images have been rearranged along a line in the bonus payout symbol image (small) display regions of the first display region 103A to the fourth display region 103D.

When determining that the game is in a ready-to win state for establishment of the jackpot trigger, the free game trigger or the bonus game trigger, the main CPU 41 performs the following processing in step S16.

Namely, when four bonus game trigger symbol images (small) are displayed along a line on any row in the bonus payout symbol image (small) display regions of the first display region 103A to the fourth display region 103D, the main CPU 41 completes display of the symbol images ((i) and (ii) described below) on the row.

(i) four bonus game trigger symbol images (small) rearranged along a line (ii) normal payout symbol images (small) included in synthetic symbol images including the aforementioned bonus game trigger symbol image (small) of (i), namely normal payout symbol image (small) constituting synthetic symbol images together with the bonus game trigger symbol images (small), that is, normal payout symbol images (small) rearranged on the same row as the row where the bonus game trigger symbol images (small) are displayed The main CPU 41 then displays bonus game trigger symbol images (large) in the synthetic symbol image display regions of the first display region 103A to the fourth display region 103D on the row where the aforementioned bonus game trigger symbol images (small) of (i) and the aforementioned normal payout symbol images (small) of (ii) have been displayed (cf. FIG. 1E).

Since processing executed by the main CPU 41 in step S16 in a case where four jackpot trigger symbol images (small) are rearranged along a line or four free game trigger symbol images are rearranged along a line is substantially similar to the above-mentioned processing, the descriptions thereof are omitted here.

When determining in step S15 that the game is not in a ready-to-win state for establishment of any of the jackpot trigger, the free game trigger and the bonus game trigger, or after executing the processing of step S16, the main CPU 41 shifts the processing to step S17.

In step S17, the main CPU 41 rearranges symbol images (the normal payout symbol images (small) and the bonus payout symbol images (small)) in the normal payout symbol image (small) display region and the bonus payout symbol image (small) display region of the fifth display region 103E.

Next, the main CPU 41 determines whether or not the jackpot trigger has been established (step S20).

When determining that the jackpot trigger has been established, the main CPU 41 determines whether or not the winning combination has been established on the same row as the row where the jackpot trigger has been established. In the processing, the main CPU 41 determines whether or not five normal payout symbol images (small) have been rearranged along the row where five jackpot trigger symbol images (small) in accordance with establishment of the jackpot trigger have been rearranged along a line.

When determining that the winning combination has not been established on the same row as the row where the jackpot trigger has been established, the main CPU 41 performs the following processing in step S22.

Namely, the main CPU 41 completes display of symbol images ((i) to (iii) described below) on the row where the jackpot trigger has been established.

(i) jackpot trigger symbol images (large) displayed in the first display region 103A to the fourth display region 103D (ii) a jackpot trigger symbol image (small) in accordance with establishment of the jackpot trigger out of bonus payout symbol images (small) rearranged along the fifth display region 103E (iii) a normal payout symbol image (small) included in synthetic symbol images including the aforementioned jackpot trigger symbol image (small) of (ii), namely a normal payout symbol image (small) constituting a synthetic symbol image together with the jackpot trigger symbol image (small), that is, a normal payout symbol image (small) rearranged along the same row as the row where the jackpot trigger symbol image (small) is displayed The main CPU 41 then displays jackpot trigger establishment symbol images in the synthetic symbol image display regions of the first display region 103A to the fifth display region 103E on the row where the aforementioned jackpot trigger symbol images (large) of (i), the aforementioned jackpot trigger symbol image (small) of (ii) and the aforementioned normal payout symbol image (small) of (iii) have been displayed.

Next, the main CPU 41 conducts a payout based upon the progressive jackpot (step S23). The number of coins to be paid out in the progressive jackpot corresponds to a value obtained by adding an initial payout value to an accumulated value (a value resulted from accumulation of a portion of the number of inserted game media) stored in the RAM 43, and the payout is conducted through hand-pay. Examples of the processing executed by the main CPU 41 in the step S23 may include outputting a notification sound from the speaker 29, lighting the lamp 30, printing the ticket 39 with a barcode indicating the number of payout printed thereon, and the like.

Since the slot machine 10 is a stand-alone type slot machine, the value obtained by adding the initial payout value to the accumulated value (the value resulted from accumulation of a portion of the number of inserted game media) of the slot machine 10 is adopted as a payout in the progressive jackpot.

However, in the present invention, the accumulated value adopted to the progressive jackpot is not limited to this example. For example, when the slot machine is connected to a network, it is possible to adopt an accumulated value of the same kind of slot machines inside a single casino, an accumulated value of the same kind of slot machine in the same region (e.g. a state or a country), and the like can be adopted.

When the winning combination is established on the same row as the row where the jackpot trigger has been established in step S21, the main CPU 41 executes the following processing.

Namely, the main CPU 41 completes display of symbol images ((i) to (iii) described below) on the row where the jackpot trigger has been established.

(i) jackpot trigger symbol images (large) displayed in the first display region 103A to the fourth display region 103D (ii) a jackpot trigger symbol image (small) in accordance with establishment of jackpot trigger out of bonus payout symbol images (small) rearranged along the fifth display region 103E (iii) a normal payout symbol image (small) included in synthetic symbol images including the aforementioned jackpot trigger symbol image (small) of (ii), namely a normal payout symbol image (small) constituting a synthetic symbol images together with the jackpot trigger symbol image (small), that is, normal payout symbol images (small) rearranged on the same row as the row where the jackpot trigger symbol image (small) is displayed.

The main CPU 41 then displays double payout symbol images in the synthetic symbol image display regions of the first display region 103A to the fifth display region 103E on the row where the aforementioned jackpot trigger symbol images (large) of (i), the aforementioned jackpot trigger symbol image (small) of (ii) and the aforementioned normal payout symbol images (small) of (iii) have been displayed.

Next, the main CPU 41 conducts a payout based upon establishment of the winning combination while conducting a payout based upon the progressive jackpot (step S25).

The payout based upon the progressive jackpot is as described in step S23. The payout based upon establishment of the winning combination will be described in step S32.

When determining in step S20 that the jackpot trigger has not been established or after executing the processing of step S23 or step S25, the main CPU 41 determines whether or not the winning combination has been established (step S30). In the processing, the main CPU 41 determines whether or not five normal payout symbol images (small) have been rearranged on any row of the symbol matrix SM.

When determining that the winning combination has been established, the main CPU 41 executes the following processing in step S31.

Namely, the main CPU 41 completes display of the symbol images ((i) to (ii) described below) on the row where the winning combination has been established.

(i) five normal payout symbol images (small) constituting the winning combination (ii) bonus payout symbol images (small) included in synthetic symbol images including the aforementioned normal payout symbol images (small) of (i), namely bonus payout symbol images (small) constituting synthetic symbol images together with the normal payout symbol images (small), that is, bonus payout symbol images (small) rearranged on the same row as the row where the normal payout symbol images (small) are displayed.

The main CPU 41 then displays normal payout symbol images (large) in the synthetic symbol image display regions of the first display region 103A to the fifth display region 103E on the row where the aforementioned normal payout symbol images (small) of (i) and the aforementioned bonus payout symbol images (small) of (ii) have been displayed (cf. FIG. 1D).

Next, the main CPU 41 pays out coins based upon odds (normal odds) in the normal game (step S32).

For example, when five coins are BET, the number of coins to be paid out in the case of establishment of "AIR PLANE× 5" is 20×5=100 coins (cf. FIG. 7).

In the case of storing coins, the main CPU 41 executes the processing of addition of the number of credits stored in the RAM 43. On the other hand, in the case where coins are to be paid out, the main CPU 41 transmits a control signal to the hopper 66, to pay out a predetermined number of coins.

When determining in step S30 that the winning combination has not been established, or after executing the processing of step S32, the main CPU 41 determines whether or not the bonus game trigger has been established (step S40).

When determining that the bonus game trigger has been established, the main CPU 41 determines whether or not the free game trigger has been established (step S41).

When determining that the free game trigger has not been established, the main CPU 41 executes the following processing in step S42.

Namely, the main CPU 41 completes display of symbol images ((i) to (iii) described below or (I) described below) on the row where the bonus game trigger has been established.

(i) bonus game trigger symbol images (large) displayed in the first display region 103A to the fourth display region 103D (ii) bonus game trigger symbol images (small) in accordance with establishment of the bonus game trigger out of bonus payout symbol images (small) rearranged along the fifth display region 103E (iii) a normal payout symbol images (small) included in synthetic symbol images including the aforementioned bonus game trigger symbol image (small) of (ii), namely a normal payout symbol images (small) constituting a synthetic symbol image together with the bonus game trigger symbol image (small), that is, a normal payout symbol images (small) rearranged on the same row as the row where the bonus game trigger symbol image (small) is displayed (I) normal payout symbol images (large) displayed in the first display region 103A to the fifth display region 103E.

The main CPU 41 then displays bonus game trigger establishment symbol images (cf. FIG. 1F) displayed in the synthetic symbol image display regions of the first display region 103A to the fifth display region 103E on the row (row where the aforementioned bonus game trigger symbol images (large) of (i), the aforementioned bonus game trigger symbol images (small) of (ii) and the aforementioned normal payout symbol images (small) of (iii) have been displayed (the aforementioned normal payout symbol images (large) of (I) have been displayed).

Next, the main CPU 41 executes bonus game execution processing (step S43). The bonus game execution processing will be described later using FIGS. 8A and 8B. After executing the bonus game execution processing, the main CPU 41 completes the present subroutine.

When determining in step S41 that the free game trigger has been established, the main CPU 41 executes the following processing in step S44.

Namely, the main CPU 41 completes display of the symbol images ((i) to (iii) described below or (I) described below) on the row where the bonus game trigger has been established, and display of the symbol images ((iv) to (vi) described below or (II) described below) on the row where the free game trigger has been established.

(i) bonus game trigger symbol images (large) displayed in the first display region 103A to the fourth display region 103D (ii) a bonus game trigger symbol image (small) in accordance with establishment of the bonus game trigger out of bonus payout symbol images (small) rearranged along the fifth display region 103E (iii) a normal payout symbol image (small) included in a synthetic symbol image including the aforementioned bonus game trigger symbol image (small) of (ii), namely a normal payout symbol image (small) constituting a synthetic symbol image together with the bonus game trigger symbol image (small), that is, a normal payout symbol image (small) rearranged on the same row as the row where the bonus game trigger symbol image (small) is displayed (I) normal payout symbol images (large) displayed in the first display region 103A to the fifth display region 103E (iv) free game trigger symbol images (large) displayed in the first display region 103A to the fourth display region 103D (v) free game trigger symbol images (small) in accordance with establishment of the free game trigger out of bonus payout symbol images (small) rearranged in the fifth display region 103E (vi) normal payout symbol images (small) included in synthetic symbol images including the aforementioned free game trigger symbol images (small) of (v), namely normal payout symbol images (small) constituting synthetic symbol images together with the free game trigger symbol images (small), that is, normal payout symbol images (small) rearranged on the same row as the row where the free game trigger symbol images (small) are displayed (II) normal payout symbol images (large) displayed in the first display region 103A to the fifth display region 103E The main CPU 41 then displays special bonus game trigger establishment symbol images in the first display region 103A to the fifth display region 103E on the row where the aforementioned bonus game trigger symbol images (large) of (i), the aforementioned bonus game trigger symbol image (small) of (ii), and the aforementioned normal payout symbol image (small) of (iii) have been displayed (the row where the aforementioned normal payout symbol images (large) of (I) have been displayed) and the row where the aforementioned free game trigger symbol images (large) of (iv), the aforementioned free game trigger symbol images (small) of (v) and the aforementioned normal payout symbol images (small) of (vi) have been displayed (the row where the aforementioned normal payout symbol images (large) of (II) have been displayed).

Next, the main CPU 41 executes special bonus game execution processing (step S45). The special bonus game execution processing will be described later using FIGS. 10A and 10B. After executing the special bonus game execution processing, the main CPU 41 completes the present subroutine.

When determining in step S40 that the bonus game trigger has not been established, the main CPU 41 determines whether or not the free game trigger has been established (step S50).

When determining that the free game trigger has not been established, the main CPU 41 completes the present subroutine.

On the other hand, when determining that the free game trigger has been established, the main CPU 41 executes the following processing in step S51.

Namely, the main CPU 41 completes display of the symbol images ((i) to (iii) described below or (I) described below) on the row where the free game trigger has been established.

(i) free game trigger symbol images (large) displayed in the first display region 103A to the fourth display region 103D (ii) a free game trigger symbol image (small) in accordance with establishment of the free game trigger out of bonus payout symbol images (small) rearranged along the fifth display region 103E (iii) a normal payout symbol image (small) included in a synthetic symbol image including the aforementioned free game trigger symbol image (small) of (ii), namely a normal payout symbol image (small) constituting a synthetic symbol image together with the free game trigger symbol image (small), that is, a normal payout symbol image (small) rearranged on the same row as the row where the free game trigger symbol image (small) is displayed (I) normal payout symbol images (large) displayed in the first display region 103A to the fifth display region 103E The main CPU 41 then displays free game trigger establishment symbol images in synthetic symbol image display regions of the first display region 103A to the fifth display region 103E on the row where the aforementioned free game trigger symbol images (large) of (i), the aforementioned free game trigger symbol image (small) of (ii) and the aforementioned normal payout symbol image (small) of (iii) have been displayed (the row where the aforementioned normal payout symbol images (large) of (I) have been displayed)

Next, the main CPU 41 executes free game execution processing (step S52). The free game execution processing will be described later using FIGS. 9A and 9B. After executing free game execution processing, the main CPU 41 completes the present subroutine.

Figure 8A:
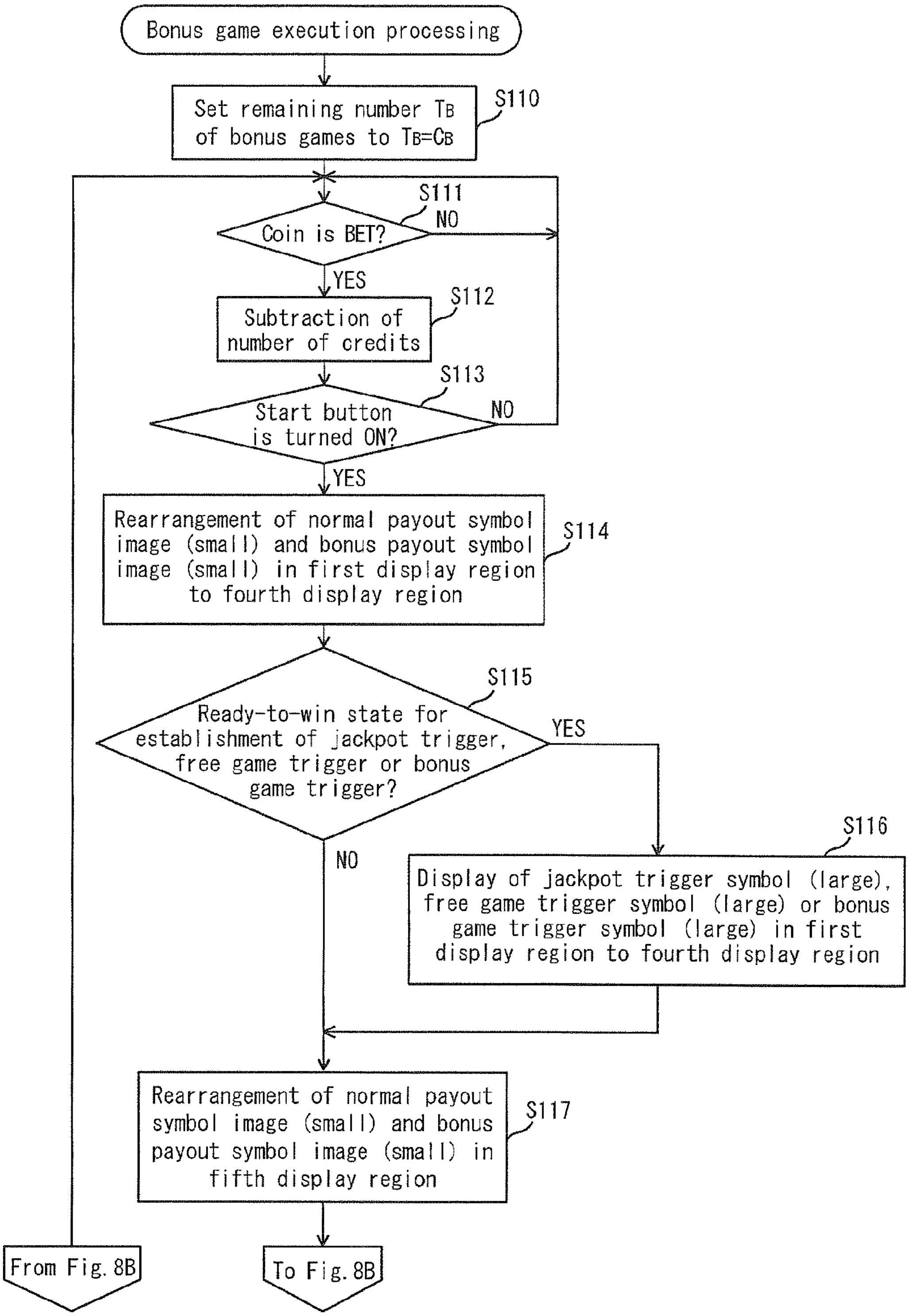
FIG. 8A is a flowchart illustrating a subroutine of bonus game execution processing.
Figure 8B:
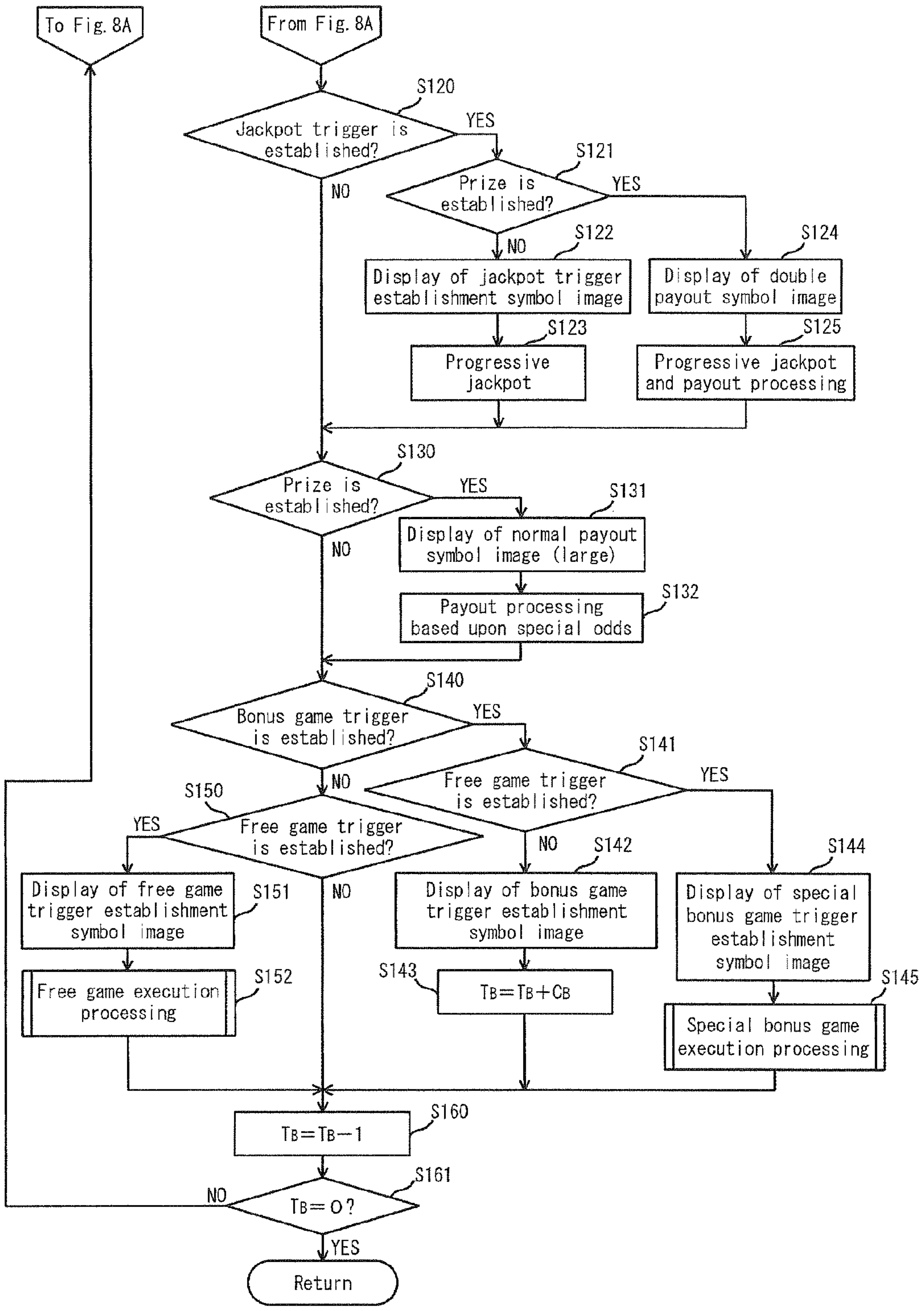
FIG. 8B is a flowchart illustrating a subroutine of bonus game execution processing.

FIGS. 8A and 8B are flowcharts illustrating a subroutine of the bonus game execution processing.

First, the main CPU 41 sets the remaining number $T_B$ of bonus games to $T_B=C_B$ ($C_B=10$ in the first embodiment) in a number-of-bonus-game storage area of the RAM 43 (step S110).

Subsequently, the main CPU 41 executes processing of steps S111 to S117, steps S120 to S125, steps S130 to 132, steps S140 to S145, and steps S150 to S152. However, the processing is substantially same as the processing of steps S11 to S17 of FIG. 6A, steps S20 to S25, steps S30 to S32, steps S40 to S45, and steps S50 to S52 of FIG. 6B. Here, only parts different from the processing in FIGS. 6A and 6B are described.

It has been described that in steps S25 and S32 of FIG. 6B, the main CPU 41 pays out coins based upon odds (normal odds) in the normal game. On the contrary, in steps S125 and S132 of FIG. 8B, the main CPU 41 pays out coins based upon odds (special odds) in the bonus game.

For example, when five coins are BET, the number of coins that are paid out in the case of establishment of "AIR PLANE×5" is 50×5=250 (cf. FIG. 7).

Further, it has been described that in step S43 of FIG. 6B, the main CPU 41 executes the bonus game execution processing. On the contrary, in step S143 of FIG. 8B, the main CPU 41 sets the remaining number $T_B$ of bonus games to $T_B=T_B+C_B$ ($C_B=10$ in the first embodiment) in the number-of-bonus-game storage area of the RAM 43.

When determining in step S150 that the free game trigger has not been established, or after executing the processing of step S143, step S145 or step S152, the main CPU 41 sets the remaining number $T_B$ of bonus games to $T_B=T_B-1$ in the number-of-bonus-games storage area of the RAM 43 (step S160). Next, the main CPU 41 determines whether or not $T_B$ is 0 (step S161).

When determining that $T_B$ is not 0, the main CPU 41 returns the processing to step S111. On the other hand, when determining that $T_B$ is 0, the main CPU 41 completes the present subroutine.

Figure 9A:
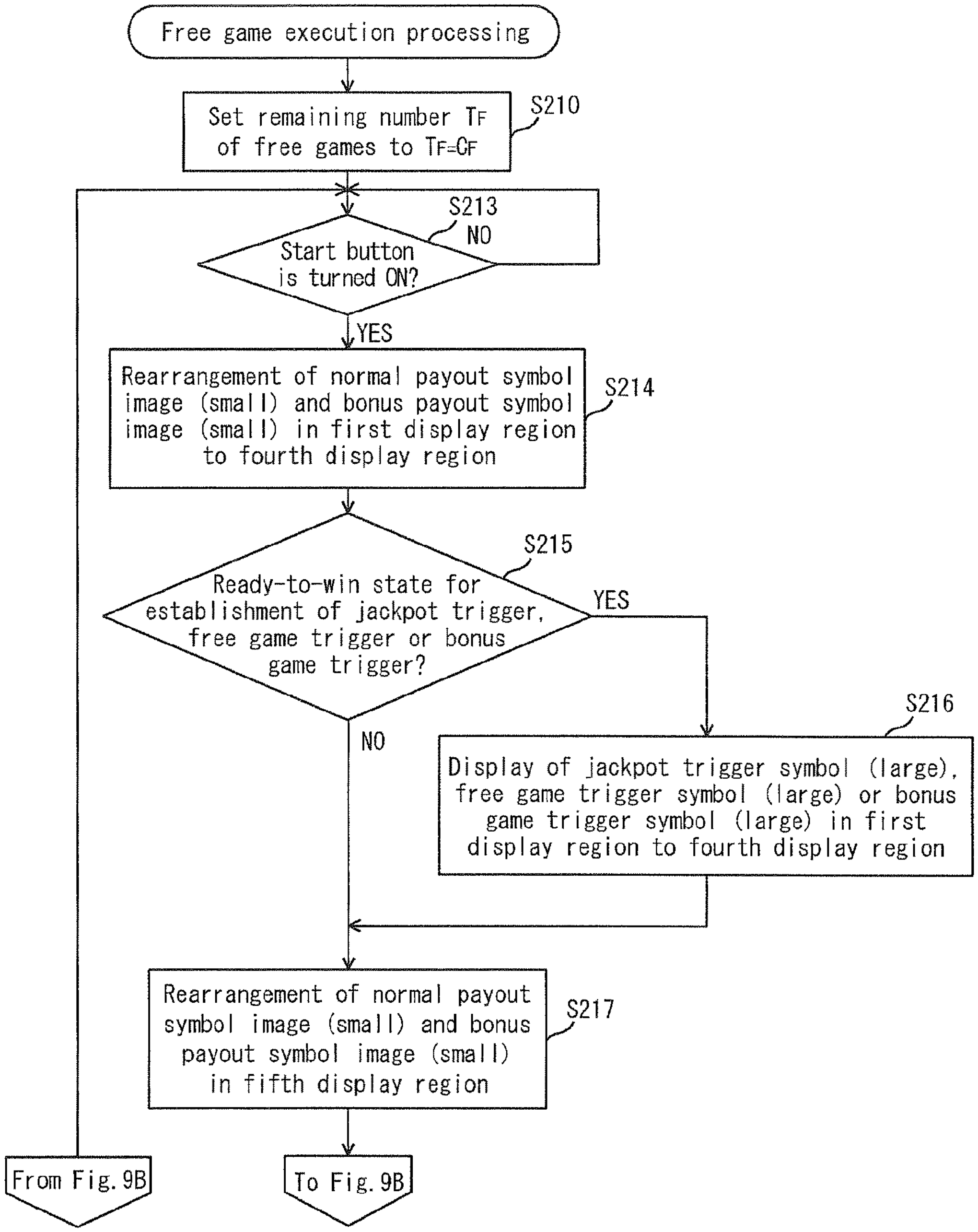
FIG. 9A is a flowchart illustrating a subroutine of free game execution processing.
Figure 9B:
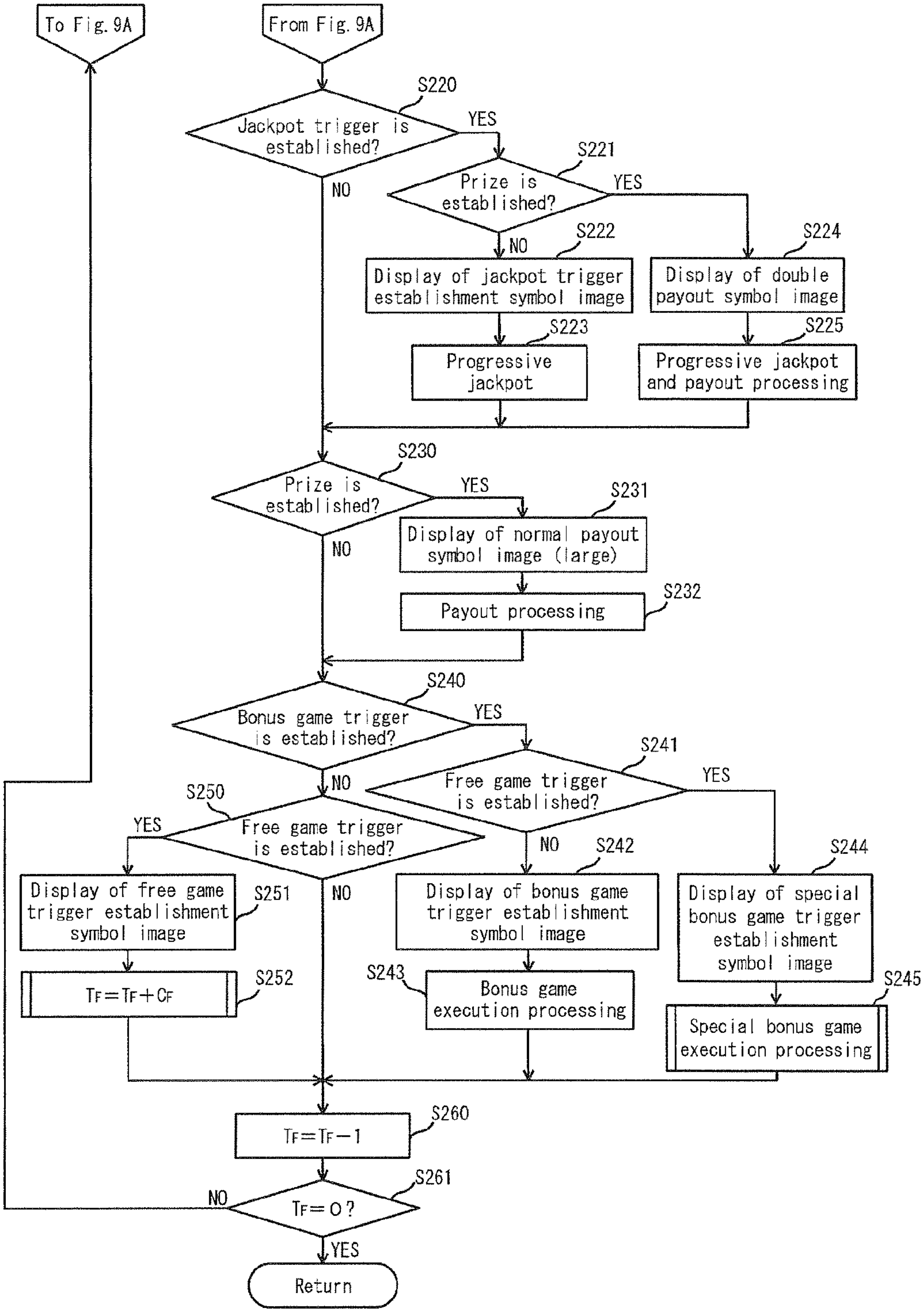
FIG. 9B is a flowchart illustrating a subroutine of free game execution processing.

FIGS. 9A and 9B are flowcharts illustrating subroutines of the free game execution processing.

First, the main CPU 41 sets the remaining number $T_F$ of free games to $T_F=C_F$ ($C_F=10$ in the first embodiment) in a number-of-free-games storage area of the RAM 43 (step S210).

Subsequently, the main CPU 41 executes processing of steps S213 to S217, steps S220 to S225, steps S230 to 232, steps S240 to S245, and steps S250 to S252. However, the processing is substantially same as the processing of steps S13 to S17 of FIG. 6A, steps S20 to S25, steps S30 to S32, steps S40 to S45, and steps S50 to S52 of FIG. 6B. Here, only parts different from the processing in FIGS. 6A and 6B are described.

Further, it has been described that in step S52 of FIG. 6B, the main CPU 41 executes the free game execution processing. On the contrary, in step S252 of FIG. 9B, the main CPU 41 sets the remaining number $T_F$ of free games to $T_F=T_F+C_F$ ($C_F=10$ in the first embodiment) in the number-of-free-games storage area of the RAM 43.

When determining in step S250 that the free game trigger has not been established, or after executing the processing of step S243, step S245 or step S252, the main CPU 41 sets the remaining number $T_F$ of free games to $T_F=T_F-1$ in the number-of-free-games storage area of the RAM 43 (step S260).

Next, the main CPU 41 determines whether or not $T_F$ is 0 (step S261).

When determining that $T_F$ is not 0, the main CPU 41 returns the processing to step S213. On the other hand, when determining that $T_F$ is 0, the main CPU 41 completes the present subroutine.

Figure 10A:
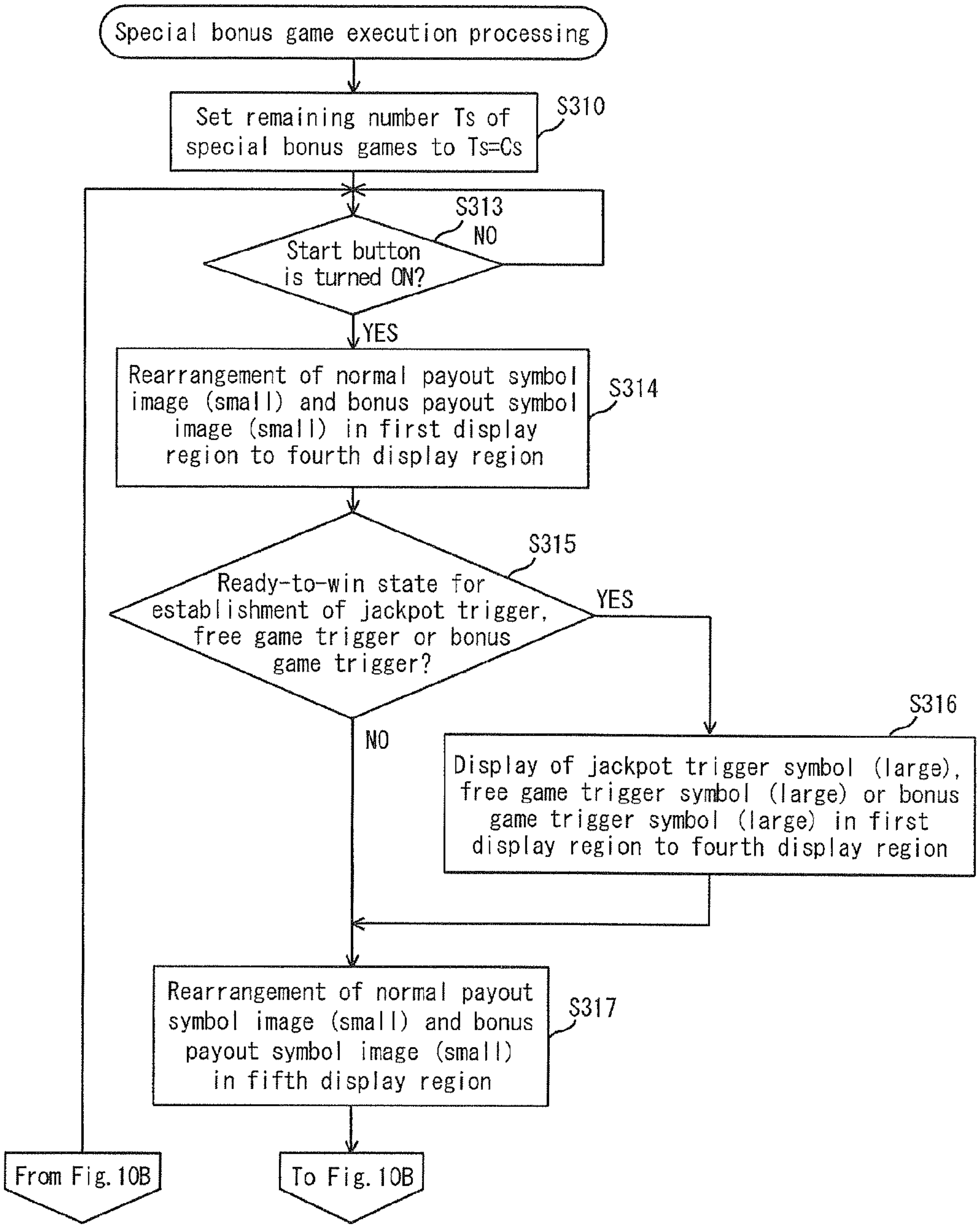
FIG. 10A is a flowchart illustrating a subroutine of special bonus game execution processing.
Figure 10B:
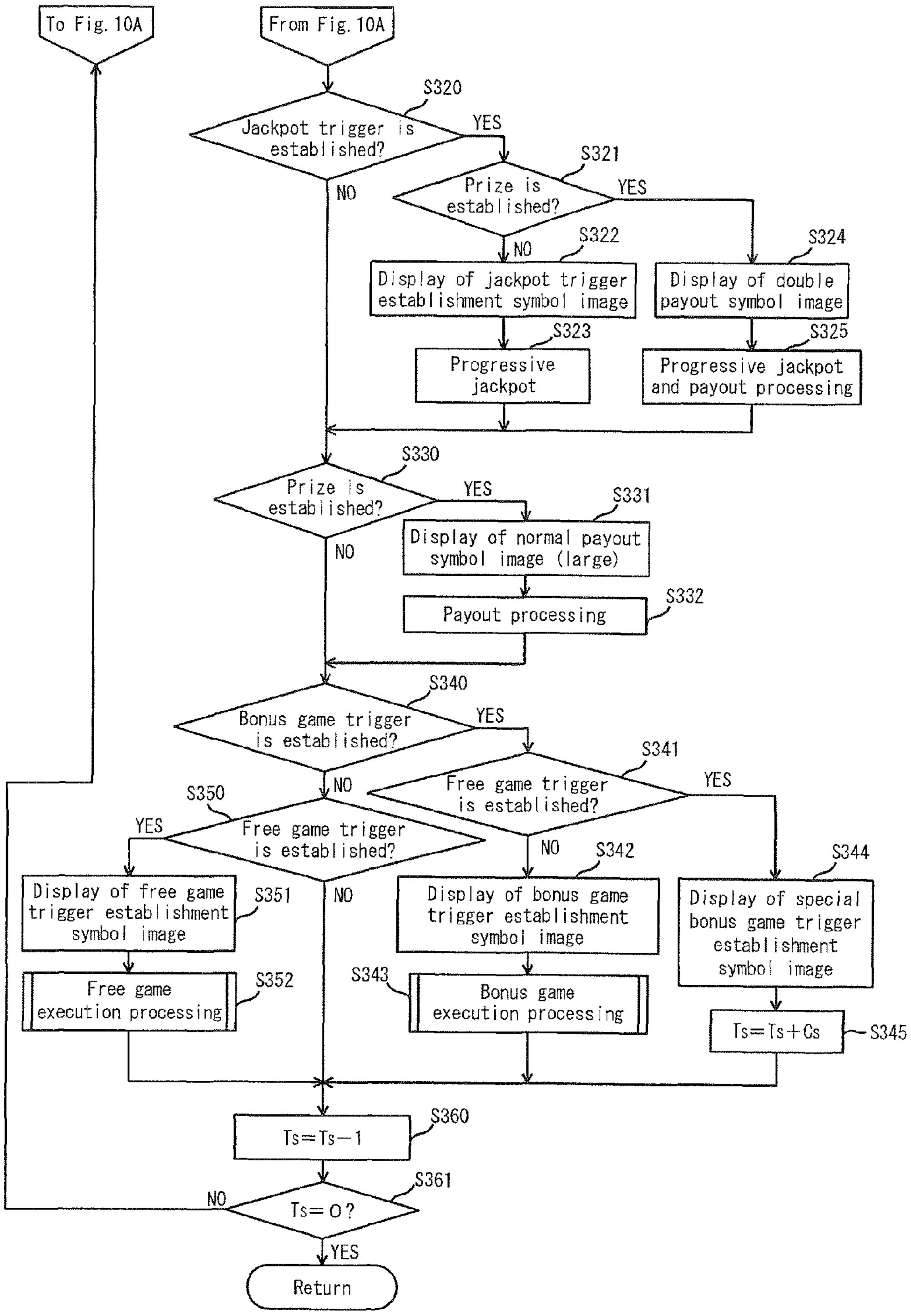
FIG. 10B is a flowchart illustrating a subroutine of special bonus game execution processing.

FIGS. 10A and 10B are flowcharts illustrating subroutines of the special bonus game execution processing.

First, the main CPU 41 sets the remaining number $T_S$ of special bonus games to $T_S=C_S$ ($C_S=10$ in the first embodiment) in a number-of-special-bonus-game storage area of the RAM 43 (step S310).

Subsequently, the main CPU 41 executes processing of steps S313 to S317, steps S320 to S325, steps S330 to 332, steps S340 to S345, and steps S350 to S352. However, the processing is substantially same as the processing of steps S13 to S17 of FIG. 6A, steps S20 to S25, steps S30 to S32, steps S40 to S45, and steps S50 to S52 of FIG. 6B. Here, only parts different from the processing in FIGS. 6A and 6B are described.

It has been described that in steps S25 and S32 of FIG. 6B, the main CPU 41 pays out coins based upon odds (normal odds) in the normal game. On the contrary, in steps S325 and S332 of FIG. 10B, the main CPU 41 pays out coins based upon odds (special odds) in the bonus game. For example, when five coins are BET, the number of coins that are paid out in the case of establishment of "AIR PLANE×5" is 50×5=250 (cf. FIG. 7).

Further, it has been described that in step S45 of FIG. 6B, the main CPU 41 executes the special bonus game execution processing. On the contrary, in step S345 of FIG. 10B, the main CPU 41 sets the remaining number $T_S$ of special bonus games to $T_S=T_S+C_S$ ($C_S=10$ in the first embodiment) in the number-of-special-bonus-game storage area of the RAM 43.

When determining in step S350 that the free game trigger has not been established, or after executing the processing of step S343, step S345 or step S352, the main CPU 41 sets the remaining number $T_S$ of special bonus games to $T_S=T_S-1$ in the number-of-special-bonus-game storage area of the RAM 43 (step S360).

Next, the main CPU 41 determines whether or not $T_S$ is 0 (step S361).

When determining that $T_S$ is not 0, the main CPU 41 returns the processing to step S313. On the other hand, when determining that $T_S$ is 0, the main CPU 41 completes the present subroutine.

Subsequently, there will be described activation processing (see step S101 in FIG. 5) by using FIG. 11 to FIG. 13.

Figure 11:
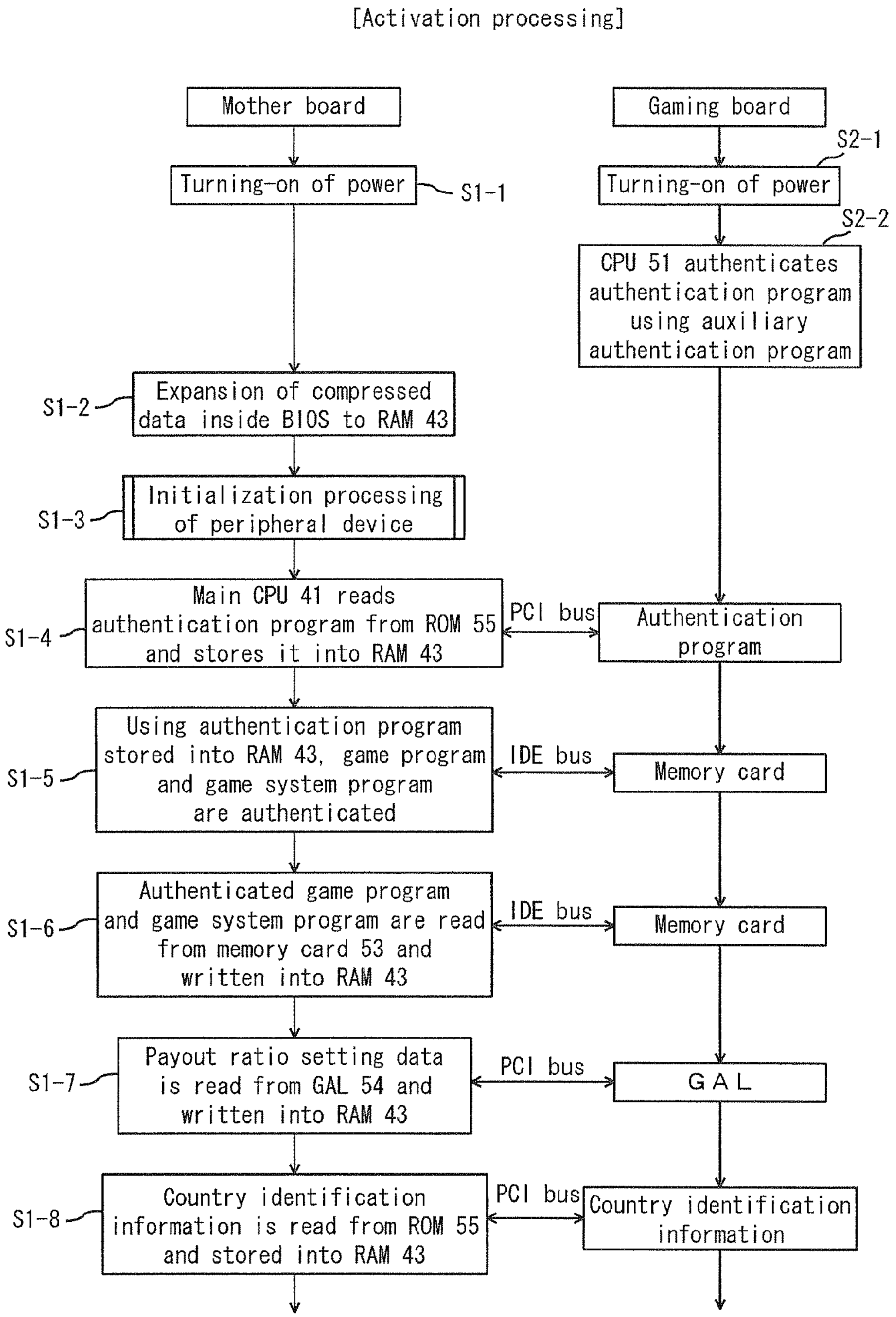
FIG. 11 is a flowchart illustrating a procedure of activation processing.

FIG. 11 is a flowchart illustrating a procedure of activation processing. This activation processing is the processing conducted by the mother board 40 and the gaming board 50. It should be noted that the memory card 53 is inserted into the card slot 53S in the gaming board 50, and the GAL 54 is mounted onto the IC socket 54S.

First, when a power switch is turned on (power is turned on) in the power supply unit 45, the mother board 40 and the gaming board 50 are activated (steps S1-1, S2-1). Inactivation of the mother board 40 and the gaming board 50, individual processing is respectively executed in parallel. Namely, in the gaming board 50, the CPU 51 reads the auxiliary authentication program stored in the boot ROM 52, and conducts auxiliary authentication according to the read auxiliary authentication program, to previously check and prove that the authentication program is not falsified before loading the program to the mother board 40 (step S2-2). Meanwhile, in the mother board 40, the main CPU 41 executes the BIOS stored in the ROM 42, and expands compressed data which is incorporated in the BIOS into the RAM 43 (step S1-2). The main CPU 41 then executes the BIOS expanded into the RAM 43 to diagnose and initialize a variety of peripheral devices (step S1-3). The processing of step S1-3 will be specifically described later with reference to FIG. 12.

Since the ROM 55 of the gaming board 50 is connected to the main CPU 41 via the PCI bus, the main CPU 41 reads the authentication program stored in the ROM 55, and stores the read authentication program into the RAM 43 (step S1-4). At this time, according to the standard BIOS function of BIOS, the main CPU 41 takes a checksum by ADDSUM system (normal checking system) and stores the authentication program into the RAM 43, while conducting processing for confirming whether or not the storage is certainly conducted.

Next, after confirming what is connected to the IDE bus, the main CPU 41 accesses, via the IDE bus, the memory card 53 inserted in the card slot 53S, to read a game program or a game system program from the memory card 53. In this case, the main CPU 41 reads data constituting the game program and the game system program by 4 bytes. Subsequently, the main CPU 41 conducts authentication to check and prove that the read game program and game system program have not been falsified, following the authentication program stored in the RAM 43 (step S1-5). When this authentication processing is normally completed, the main CPU 41 writes and stores the game program and the game system program, which have been the authentication targets (which have been authenticated), into the RAM 43 (step S1-6). Next, the main CPU 41 accesses, via the PCI bus, the GAL 54 mounted on the IC socket 54S, reads payout ratio setting data from the GAL 54, and writes and stores the data into the RAM 43 (step S1-7). Subsequently, the main CPU 41 conducts processing for reading country identification information stored in the ROM 55 of the gaming board 50 via the PCI bus, and writes and stores the read country identification information into the RAM 43 (step S1-8).

After conducting the above-mentioned processing, the main CPU 41 sequentially reads and executes the game program and the game system program, thereby executes insurance setting processing and game execution processing.

Figure 12:
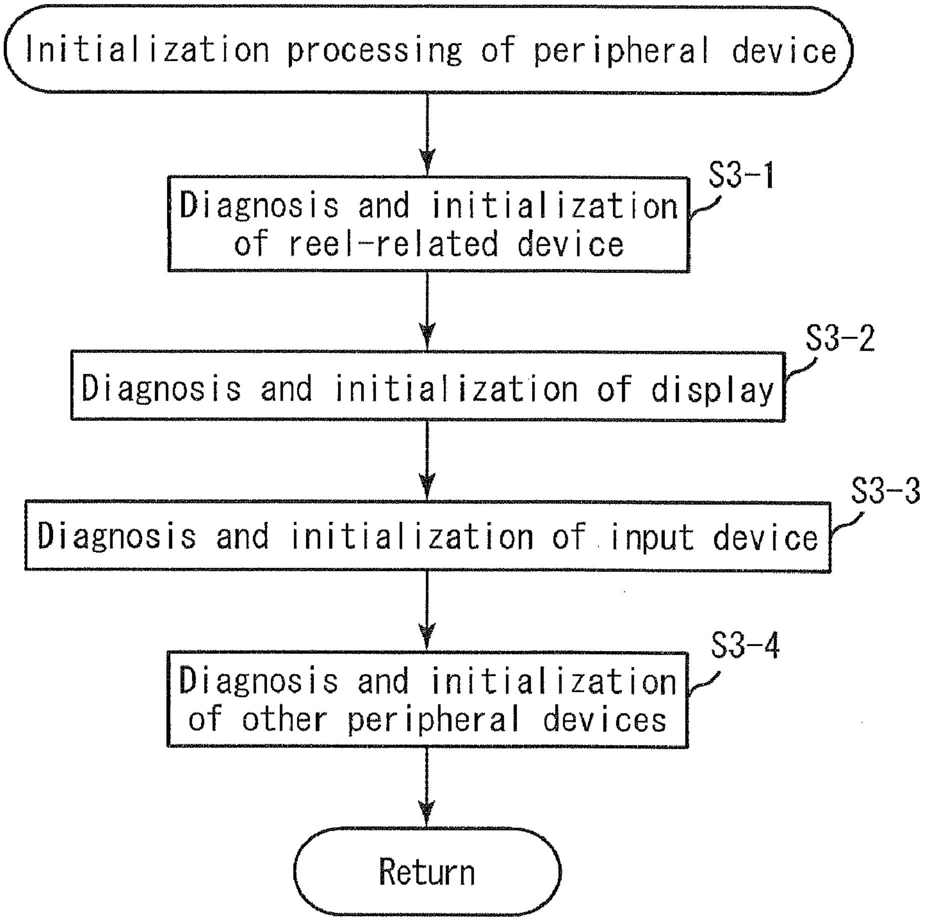
FIG. 12 is a view illustrating peripheral device initialization processing.

FIG. 12 is a view illustrating a procedure of peripheral-device initialization processing.

First, the main CPU 41 diagnoses and initializes a reel-related device (step S3-1). In this processing, the main CPU 41 sequentially transmits request signals to the index detecting circuit 65, the position-change detecting circuit 71, and the motor driving circuit 62. Then, the main CPU 41 determines whether or not to have received predetermined response signals and conducts clearance of a predetermined storage area, and the like.

Next, the main CPU 41 diagnoses and initializes a display (step S3-2). In this processing, the main CPU 41 transmits the request signal to the graphic board 68. Then, the main CPU 41 determines whether or not to have received a predetermined response signal and conducts clearance of a predetermined storage area, and the like.

Next, the main CPU 41 diagnoses and initializes various types of input devices (step S3-3). In this processing, the main CPU 41 transmits request signals to the input devices such as the spin switch 23S, the change switch 24S, the CASHOUT switch 25S, the 1-BET switch 26S, the maximum BET switch 27S, and the touch panel 11, and then determines whether or not to have received predetermined response signals.

Subsequently, the main CPU 41 diagnoses and initializes other peripheral devices connected to the main CPU 41 (step S3-4). Then the present subroutine is terminated.

In the present embodiment, there has been described the case where the slot machine 10 is a stand-alone type slot machine. However, in the present invention, a plurality of slot machines may be connected to a central controller via a network and controlled by the central controller.

Figure 13:
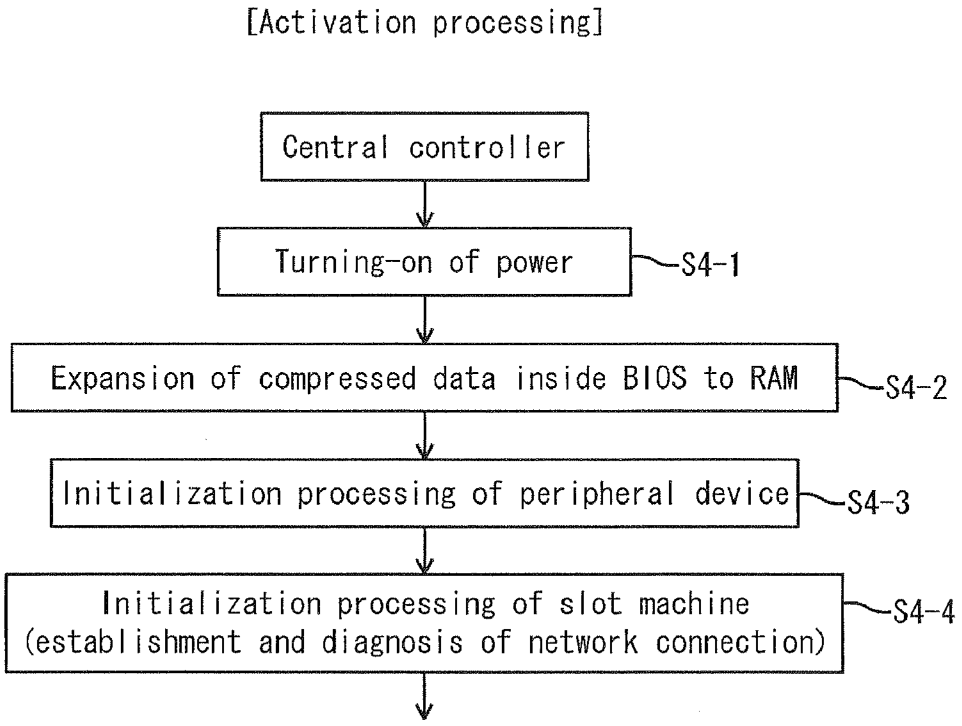
FIG. 13 is a flowchart illustrating a subroutine of activation processing executed by a central controller.

FIG. 13 is a flowchart illustrating a procedure of activation processing executed by the central controller.

First, when the power switch is turned on (the power is turned on) in the power unit, a mother board is activated (step S4-1).

In the mother board, a CPU executes a BIOS stored in a ROM so as to expand compressed data incorporated in the BIOS into a RAM (step S4-2). Then, the CPU executes the BIOS expanded into the RAM, and then, diagnoses and initializes various types of peripheral devices such as a display (step S4-3).

Next, the CPU executes initialization processing of each slot machine. In this processing, the CPU establishes a network connection between the central controller and each slot machine, and diagnoses if the network functions properly.

After the above-described processing, the CPU controls proceeding of the game executed in a plurality of the slot machines by reading and executing a game control program.

According to the slot machine 10 of the first embodiment, the synthetic symbol images each including the normal payout symbol image (small) and the bonus payout symbol image (small) are rearranged in the symbol matrix (SM). Such symbol images formed by synthesizing the two kinds of symbol images are not usually displayed in slot machines, and a player is unfamiliar with such symbol images. Therefore, by showing the player such symbol images, it is possible to have the player feel freshness. This can result in provision of a game in which the player is unlikely to become bored.

Further, according to the slot machine 10 of the first embodiment, the normal payout symbol image (small) is associated with the winning combination. When the normal payout symbol images (small) included in the rearranged synthetic symbol images or a combination thereof constitute the winning combination, the normal payout symbol images (large) are displayed to the symbol matrix (SM) in place of the synthetic symbol images (the synthetic symbol images rearranged along the winning line) including the normal payout symbol images that constitute the winning combination. The normal payout symbol image (large) has substantially the same picture as that of the normal payout symbol image (small) that constitute the winning combination.

Thereby, when the normal payout symbol images (small) included in the rearranged synthetic symbol images constitute the winning combination, the normal payout symbol images (large) can be displayed in the symbol matrix (SM) with substantially the same sizes as those of the synthetic symbol images. It is therefore possible to give the player an impression as if the normal payout symbol images (small) constituting the winning combination have expanded to the normal payout symbol images (large) as triggered by establishment of the winning combination. Hence it becomes possible to have the player feel interested in a view being as if the normal payout symbol images (small) expand to the normal payout symbol images (large), so as to make the player absorbed in the game.

Moreover, since the normal payout symbol images (large) corresponding to the winning combination are displayed with sizes larger than those of the normal payout symbol images (small) and the bonus payout symbol images (small) in the case of establishment of the winning combination, it is possible to make the player immediately aware of which prize has been established. This enables provision of a game very easy to understand for the player.

According to the slot machine 10 of the first embodiment, the bonus payout symbol image (small) is associated with the progressive jackpot, the free game and the bonus game. Namely, the two kinds of symbol images constituting the synthetic symbol image are both associated with prizes. It is thereby possible to make the player pay attention to both the normal payout symbol images (small) and the bonus payout symbol images (small). Consequently, it is possible to make the player further absorbed in the game.

Moreover, according to the slot machine 10 of the first embodiment, when a combination of the jackpot trigger symbol images (small), free game trigger symbol images (small) or the bonus game trigger symbol images (small) included in the rearranged synthetic symbol images establishes the jackpot trigger, the free game trigger or the bonus game trigger, the jackpot trigger establishment symbol images, the free game trigger establishment symbol images or the bonus game trigger establishment symbol images are displayed in the symbol matrix (SM) in place of the synthetic symbol images including the jackpot trigger symbol images (small), free game trigger symbol images (small) or the bonus game trigger symbol images (small).

Namely, it is possible to display in the symbol matrix (SM) the normal payout symbol images (large) with substantially the same sizes as those of the synthetic symbol images in the case of establishment of the winning combination by the normal payout symbol images, while displaying in the symbol matrix (SM) the symbol images indicating completion of the bonus trigger with substantially the same sizes as those of the synthetic symbol images in the case of completion of the bonus trigger by the bonus payout symbol images (small). It is therefore possible to give the player an impression as if the normal payout symbol images (small) constituting the winning combination have expanded to the normal payout symbol images (large) in the case of establishment of the winning combination by the normal payout symbol images (small), while giving the player an impression as if the jackpot trigger symbol images (small), the free game trigger symbol images (small) or the bonus game trigger symbol images (small) have expanded to the jackpot trigger establishment symbol images, the free game trigger establishment symbol images or the bonus game trigger establishment symbol images in the case of establishment of the jackpot trigger, the free game trigger or the bonus game trigger.

As thus described, it is possible to show the player a view being as if the normal payout symbol images (small) expand to the normal payout symbol images (large) or a view being as if the jackpot trigger symbol images (small), the free game trigger symbol images (small) or the bonus game trigger symbol images (small) expand to the jackpot trigger establishment symbol images, the free game trigger establishment symbol images or the bonus game trigger establishment symbol images, depending upon whether the winning combination is established or the bonus is established. It is thus possible to have the player feel increasingly interested in such unfamiliar views.

Second Embodiment

In the first embodiment, the case has been described where synthetic symbol images are rearranged in the symbol matrix SM on the lower image display panel 16 (the case where the slot machine 10 is a so-called video slot machine). However, the slot machine of the present invention may be configured so as to stop-display synthetic symbols by using so-called mechanical reels.

In the following, a slot machine 310 having such a configuration is described.

It is to be noted that in the following, the same constituents as those of the slot machine 10 according to the first embodiment are described while provided with the same numerals.

Moreover, descriptions of parts in the second embodiment, to which the descriptions in the first embodiment are applicable, are omitted.

A general description of a second embodiment will be given by using FIGS. 14 to 16.

Figure 14A:
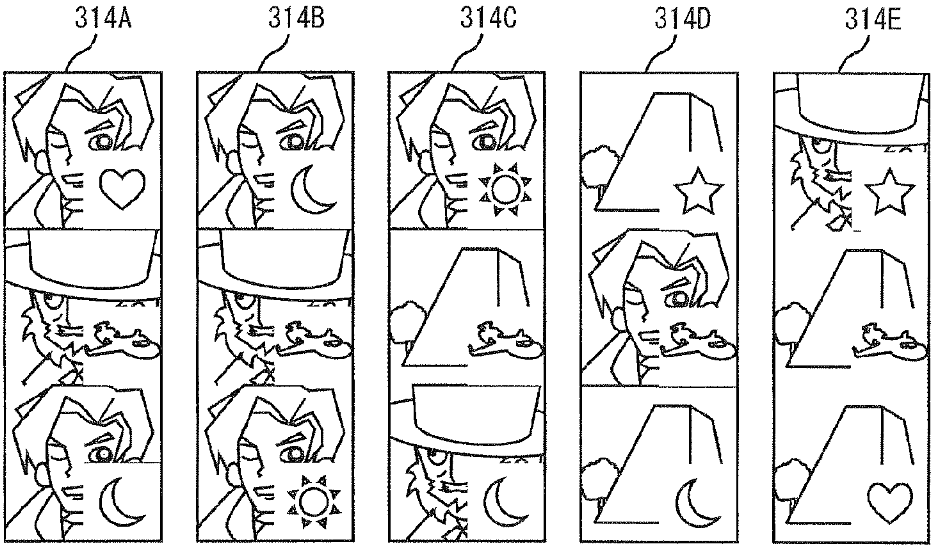
FIG. 14A is a view illustrating synthetic symbols stop-displayed by reels.

FIG. 14A is a view illustrating synthetic symbols stop-displayed by reels.

Figure 14B:
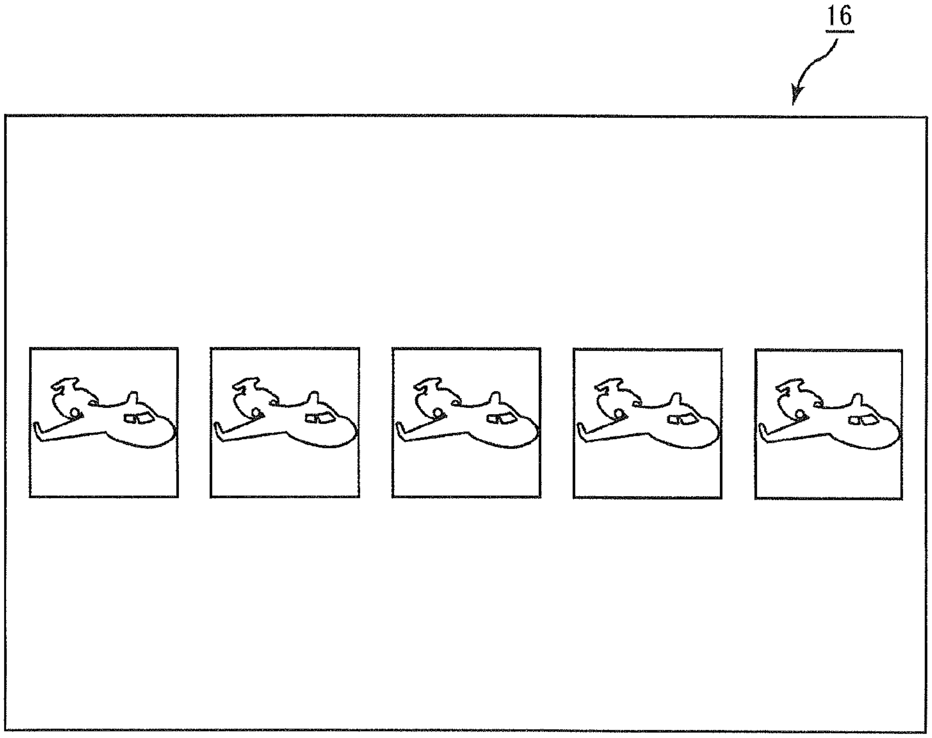
FIG. 14B is a view illustrating an example of normal payout symbol images (large).

FIG. 14B is a view illustrating an example of normal payout symbol images (large).

Figure 14C:
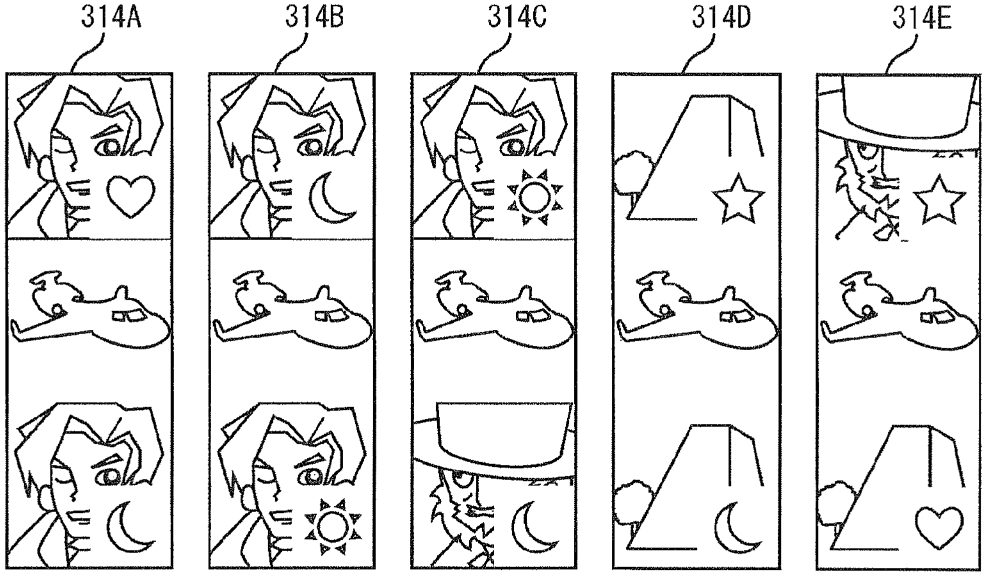
FIG. 14C is a view schematically illustrating a display region seen from the player.

FIG. 14C is a view schematically illustrating a display region seen from the player.

Figure 15A:
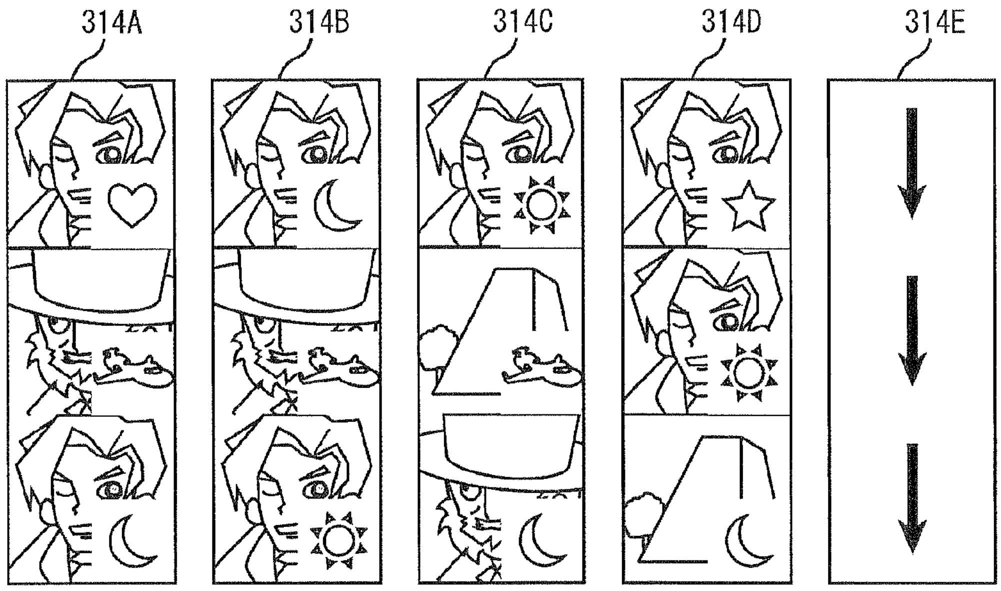
FIG. 15A is a view illustrating synthetic symbols stop-displayed by reels.

FIG. 15A is a view illustrating synthetic symbols stop-displayed by reels.

Figure 15B:
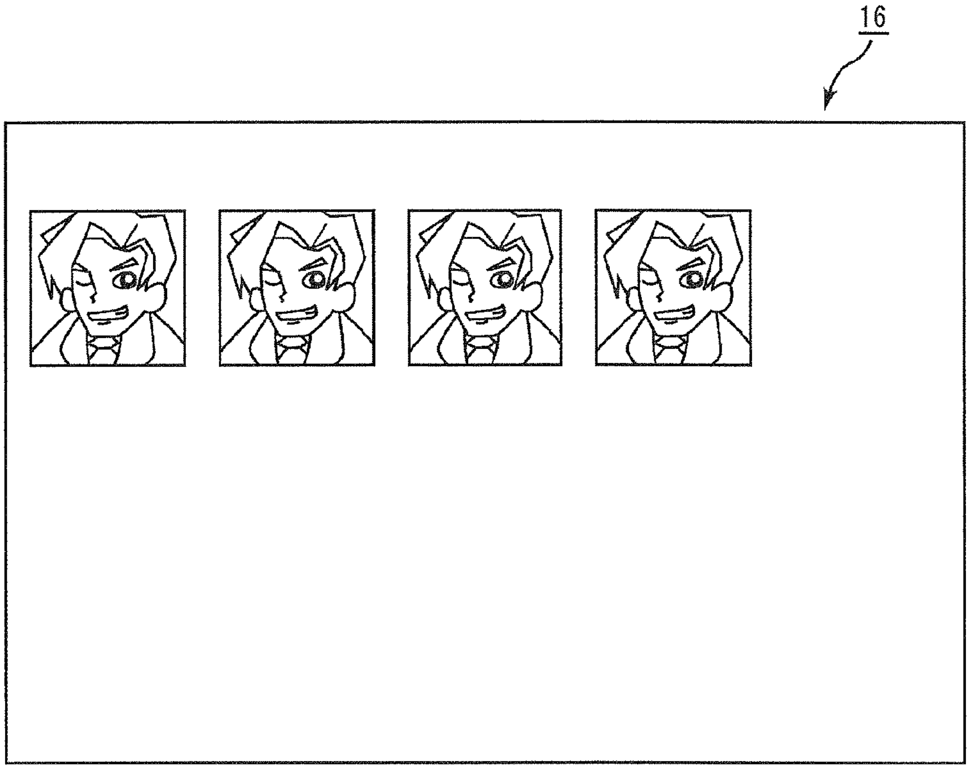
FIG. 15B is a view illustrating an example of bonus game trigger symbol images (large).

FIG. 15B is a view illustrating an example of bonus game trigger symbol images (large).

Figure 15C:
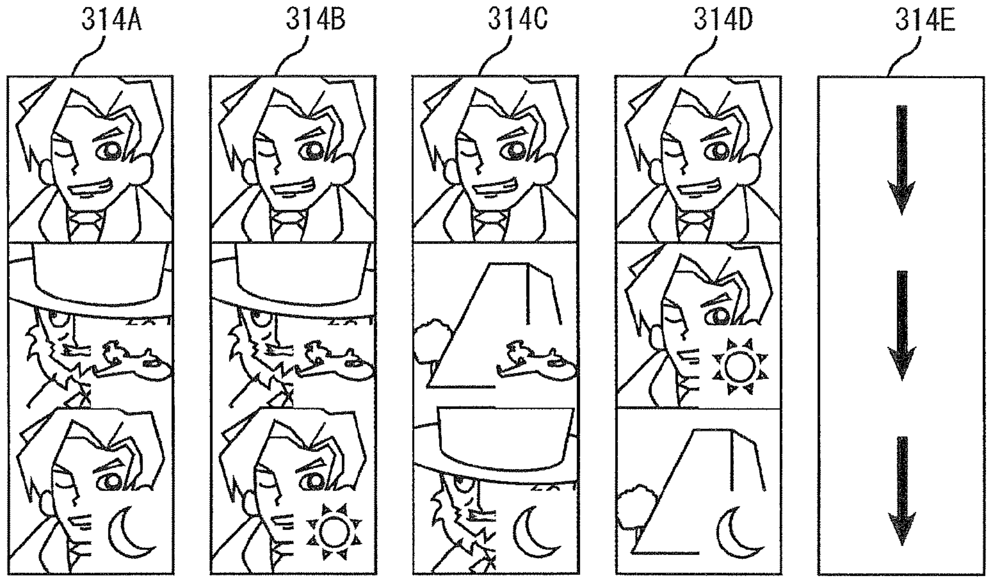
FIG. 15C is a view schematically illustrating a display region seen from the player.

FIG. 15C is a view schematically illustrating a display region seen from the player.

Figure 15D:
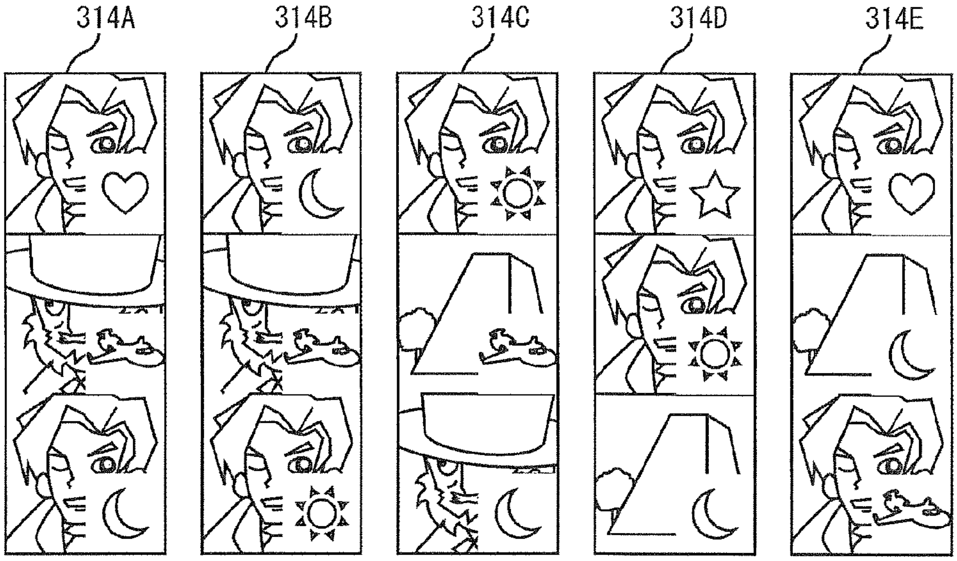
FIG. 15D is a view illustrating synthetic symbols stop-displayed by reels.

FIG. 15D is a view illustrating synthetic symbols stop-displayed by reels.

Figure 15E:
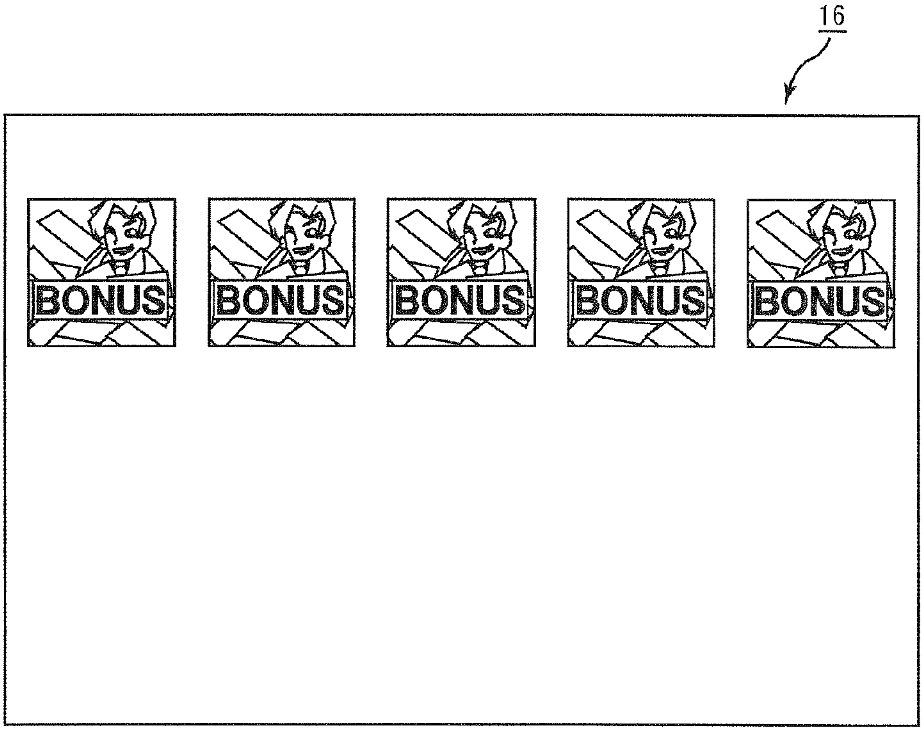
FIG. 15E is a view illustrating an example of bonus game trigger establishment symbol images.

FIG. 15E is a view illustrating an example of bonus game trigger establishment symbol images.

Figure 15F:
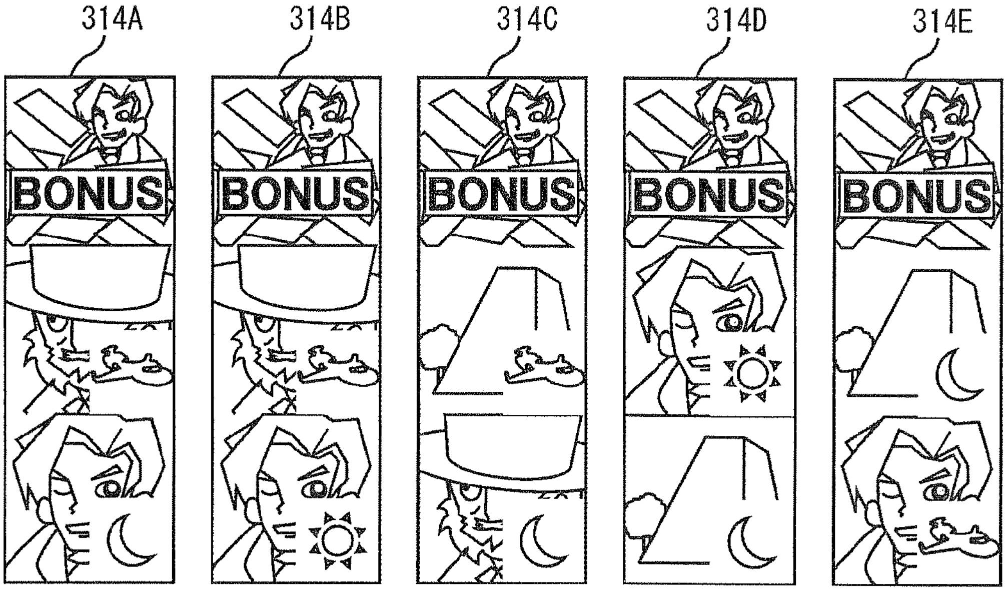
FIG. 15F is a view schematically illustrating a display region seen from the player.

FIG. 15F is a view schematically illustrating a display region seen from the player.

Figure 16:
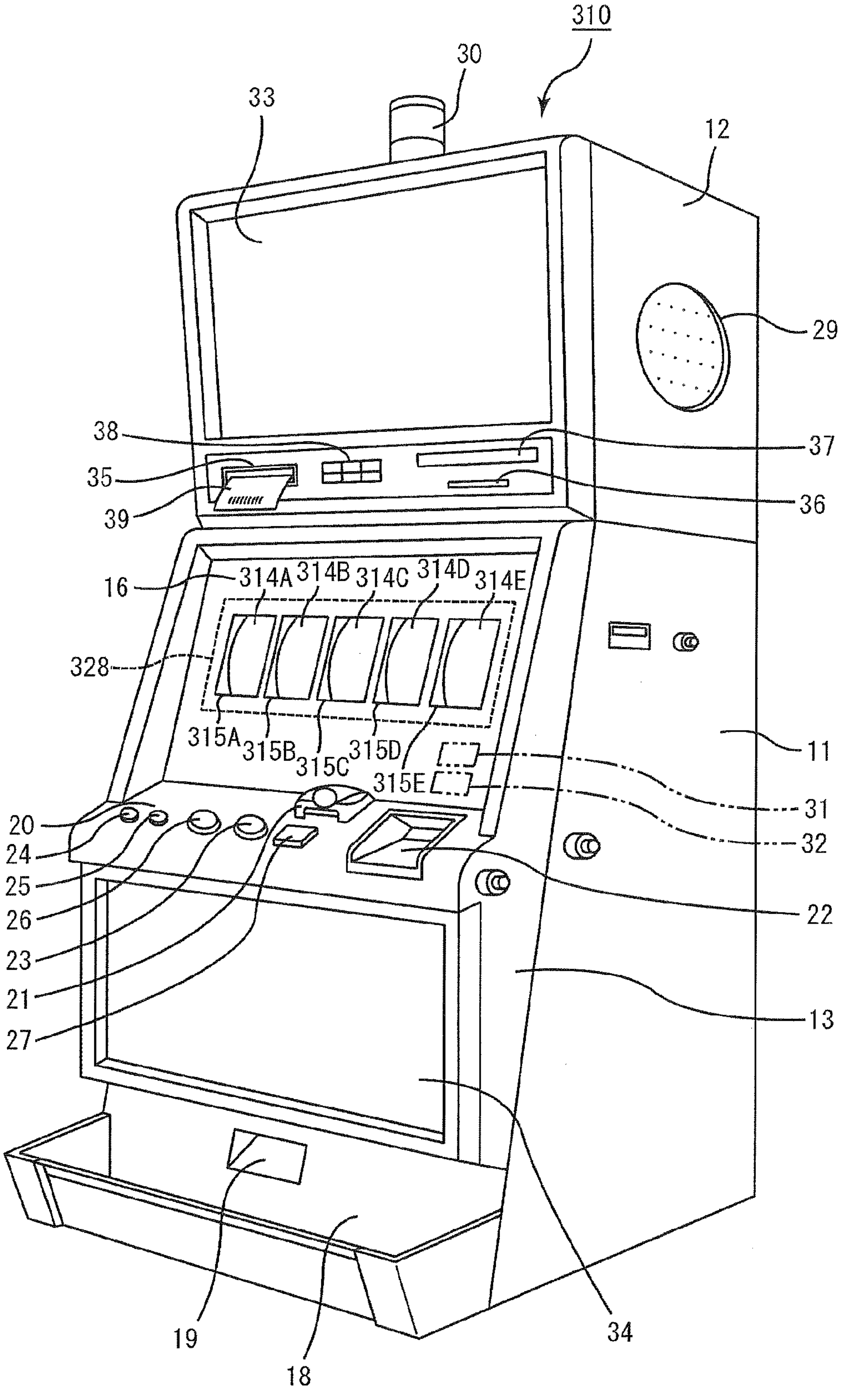
FIG. 16 is a perspective view illustrating the external appearance of a slot machine according to a second embodiment.

FIG. 16 is a perspective view illustrating the external appearance of a slot machine according to a second embodiment.

In the slot machine 310 (FIG. 16) according to the second embodiment, five reels 314 (314A, 314B, 314C, 314D and 314E) are rotatably provided inside the cabinet 11. Synthetic symbols are drawn on the outer peripheral surfaces of 314A, 314B, 314C, 314D, and 314E. The synthetic symbol corresponds to the synthetic symbol image in the first embodiment. The reels 314 correspond to the symbol display in the present invention.

A display region 328 that displays symbols are provided at the central portion of the lower image display panel 16 provided at a front of the five reels 314. Five display windows 315 (315A, 315B, 315C, 315D and 315E), the rear surfaces of which are visible, are formed inside the display region 328. Three of synthetic symbols drawn on the outer peripheries of the reels 314A, 314B, 3140, 314D, and 314E are displayed through each display window 315A, 315B, 315C, 315D, and 315E.

The synthetic symbol includes a normal payout symbol (small) and a bonus game payout symbol (small). The normal payout symbol (small) corresponds to the normal payout symbol image (small) in the first embodiment. The bonus game payout symbol (small) corresponds to the bonus game payout symbol image (small) in the first embodiment.

Like in the first embodiment, the bonus game payout symbol (small) includes a jackpot trigger symbol (small), a free game trigger symbol (small) and a bonus game trigger symbol (small).

In the second embodiment, when five normal payout symbols (small) are stop-displayed along a line (a winning combination is established), five normal payout symbol images (large) are displayed in predetermined positions of the display region 328. The predetermined position is a position corresponding to the synthetic symbol including the normal payout symbol (small) constituting the established winning combination.

In the example showing in FIG. 14A, "AIR PLANE×5" is established on the middle row of the reels 314. Due to this, in FIG. 14B, "AIR PLANE" symbol images (large) are displayed in positions corresponding to the five synthetic symbols including the five normal payout symbols (small) that constitute "AIR PLANE×5".

At this time, when seen from the player, the five synthetic symbols are hidden by the "AIR PLANE" symbol images (large), and seen as in FIG. 14C.

In an example shown in FIG. 15A, four bonus game trigger symbols (small) are stop-displayed on the upper row of the reels 314A to 314D. At this time, as shown in FIG. 15B, four bonus game trigger symbol images (large) are displayed in predetermined positions of the display region 328. The predetermined positions are position corresponding to four synthetic symbols including the four stop-displayed bonus game trigger symbols (small).

At this time, when seen from the player, the four synthetic symbols are hidden by bonus game trigger symbol images (large), and seen as in FIG. 15C.

Also when four jackpot trigger symbols (small) are stop-displayed along a line on the reels 314A to 314D, four jackpot trigger symbol images (large) are similarly displayed in positions corresponding to four synthetic symbols including the four jackpot trigger symbols (small).

Further, also when four free game trigger symbols (small) are stop-displayed along a line on the reels 314A to 314D, four free game trigger symbol images (large) are similarly displayed in positions corresponding to four synthetic symbols including the four free game trigger symbols (small).

In an example shown in FIG. 15D, on the upper row of the reels 314A to 314E, five bonus game trigger symbols (small) are stop-displayed. At this time, as shown in FIG. 15E, five bonus game trigger establishment symbol images are displayed in predetermined positions in the display region 328. The predetermined positions are positions corresponding to five synthetic symbols including the five stop-displayed bonus game trigger symbols (small).

At this time, when seen from the player, the five synthetic symbols are hidden by bonus game trigger symbol images (large), and seen as in FIG. 15F.

Also when five jackpot trigger symbols (small) are stop-displayed along a line on the reels 314A to 314E, five jackpot trigger establishment symbol images are similarly displayed in positions corresponding to five synthetic symbols including the five jackpot trigger symbols (small).

Further, also when five free game trigger symbols (small) are stop-displayed along a line on the reels 314A to 314E, five free game trigger establishment symbol images are similarly displayed in positions corresponding to five synthetic symbols including the five free game trigger symbols (small).

There has been described the outline of the second embodiment.

Hereinafter, the second embodiment will be described in more detail.

Figure 17:
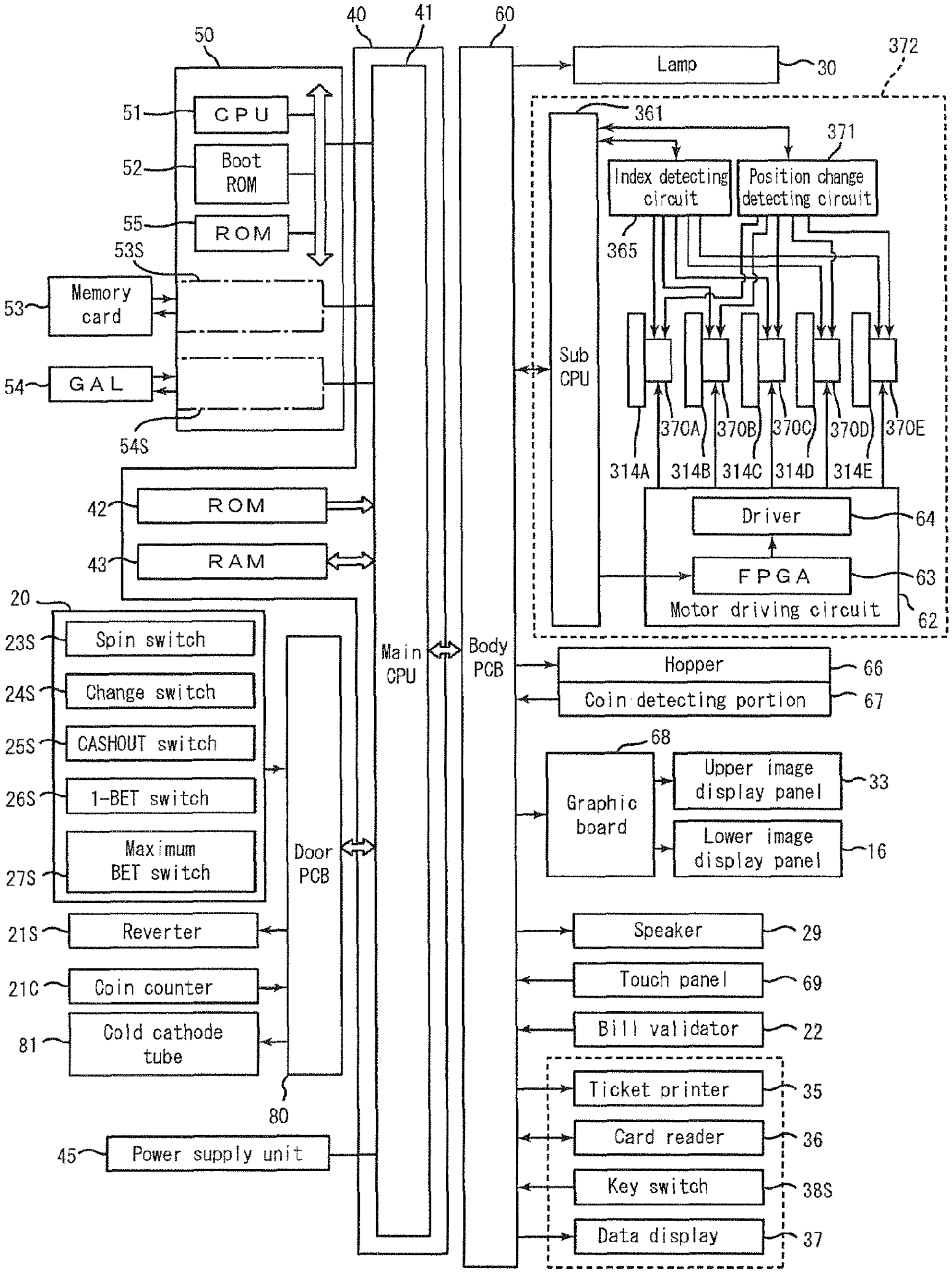
FIG. 17 is a block diagram illustrating an internal configuration of the slot machine illustrated in FIG. 16.

FIG. 17 is a block diagram illustrating an internal configuration of the slot machine shown in FIG. 16.

A reel controller 372 is connected to the main PCB 360.

The sub CPU 61 included in the reel controller 372 controls the rotation and stoppage of the reels 314 (314A, 314B, 314C, 314D and 314E). A motor driving circuit 362 equipped with FPGA (Field Programmable Gate array) 363 and a driver 364 is connected to the sub CPU 361. FPGA 363 is an electronic circuit such as LSI capable of programming and works as a control circuit of a stepping motor 370. The driver 364 works as an amplifier circuit of a pulse to be inputted to the stepping motor 370. The stepping motors 370 (370A, 370B, 370C, 370D and 370E) which rotate each of the reels 314, are connected to the motor driving circuit 362. The stepping motor 370 is a 1-2 phase excitation type stepping motor.

An index detecting circuit 365 and a position change detecting circuit 371 are connected to the sub CPU 361. The index detecting circuit 365 is used for detecting positions (indexes described later) of the rotating reels 314 and can also detect an out-of-order state of the reels 314.

The position change detecting circuit 71 detects a change of stoppage positions of the reels 14 after the stoppage of the rotating of the reels 14.

The position change detecting circuit 371 detects the change of stoppage positions of the reels 314, for example, in a case where the stoppage position is changed by force by a player as if the state of the arrangement of symbols is in a winning state, despite the fact that the state of the arrangement of symbols is not actually in a winning state, and of the like cases. The position change detecting circuit 371 is configured to be capable of detecting the change of stoppage position of the reel 314 by, for example, detecting fins (not shown in the figure) attached with a predetermined space on the inner side of the reel 314.

Figure 18A:
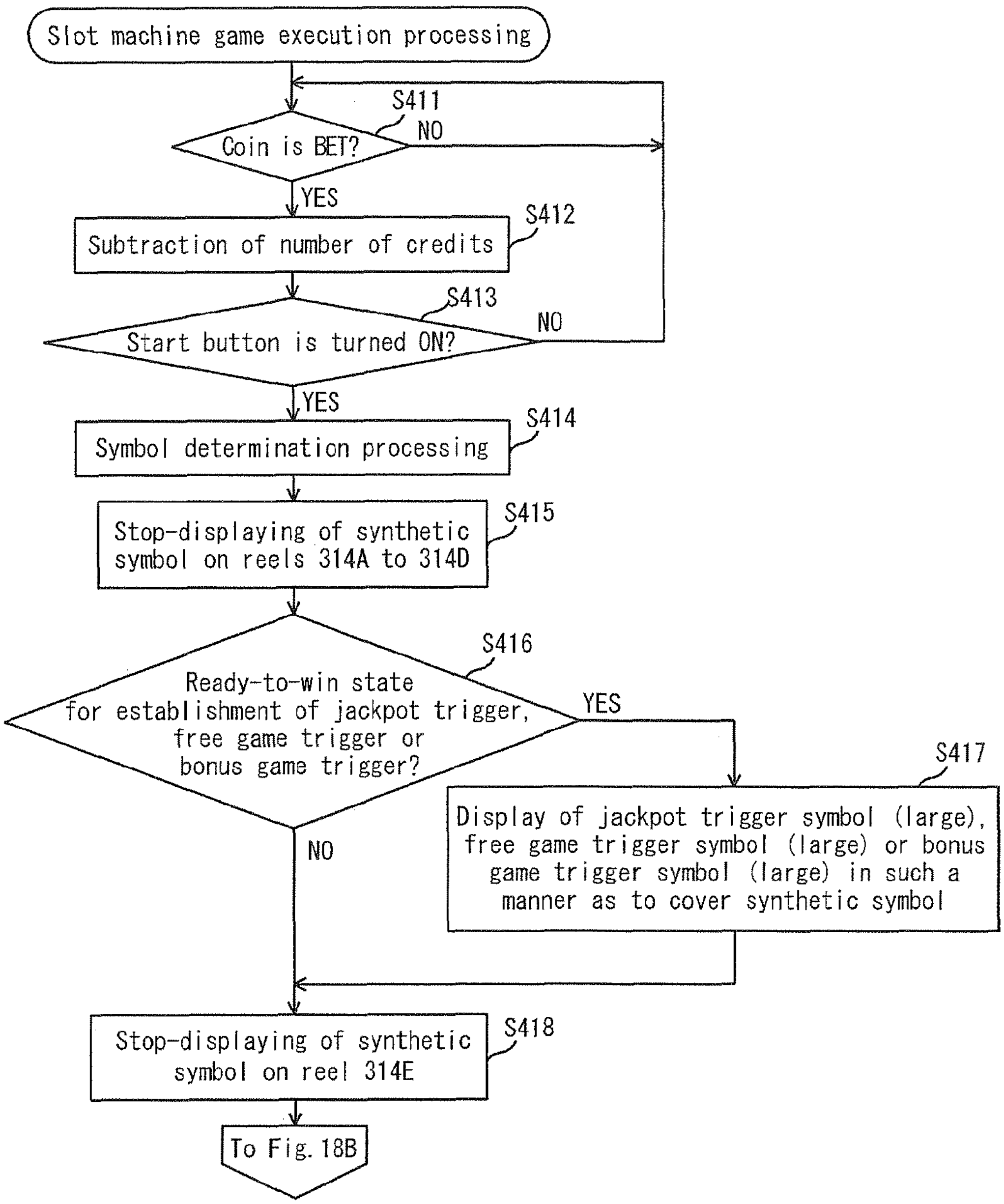
FIG. 18A is a flowchart illustrating a subroutine of slot machine game execution processing according to the second embodiment.
Figure 18B:
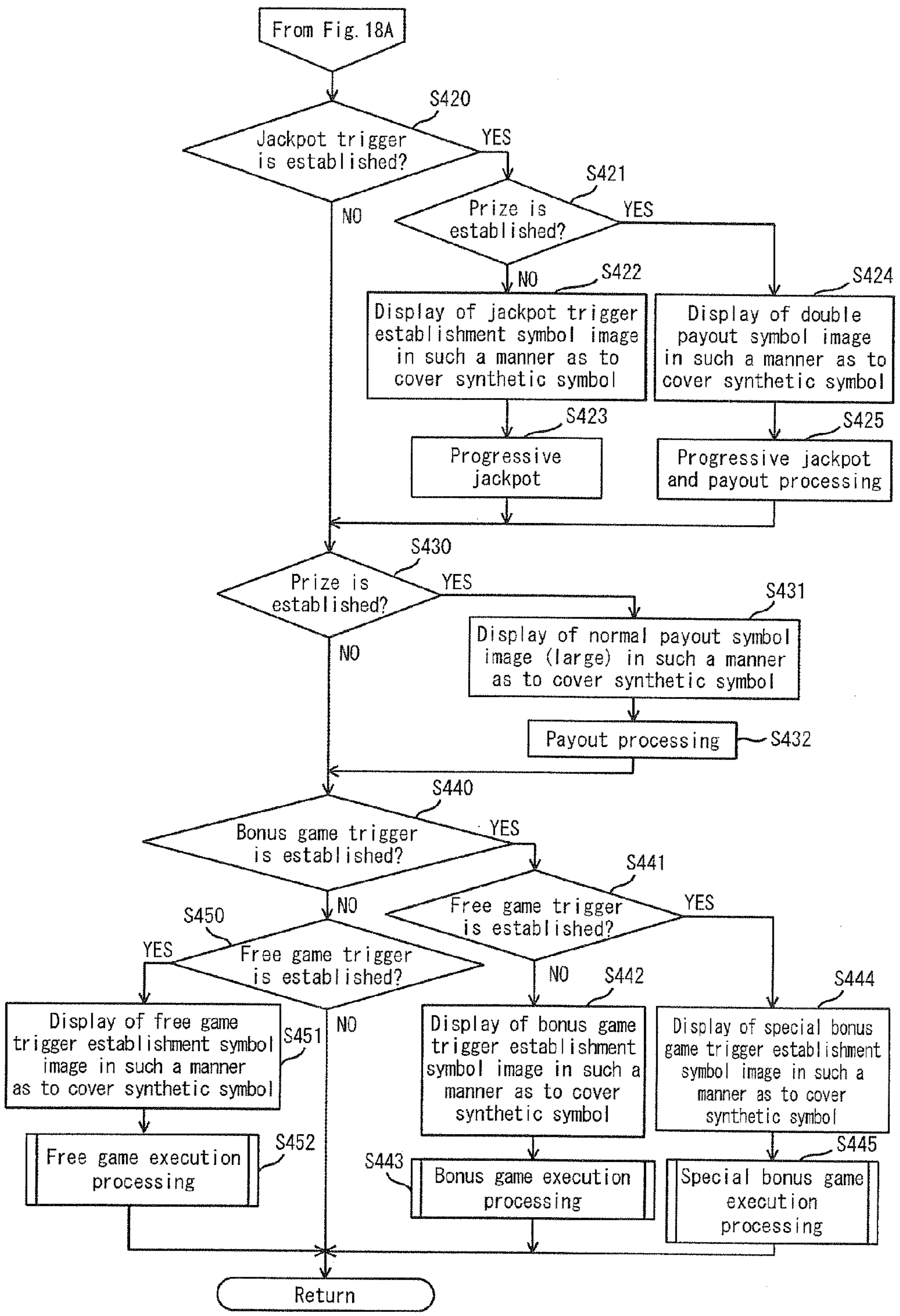
FIG. 18B is a flowchart illustrating a subroutine of slot machine game execution processing according to the second embodiment.

FIGS. 18A and 18B are flowcharts illustrating a subroutine of slot machine game execution processing according to the second embodiment.

First, the main CPU 41 executes the processing of steps S411 to S413. However, since the processing is similar to the processing of steps S11 to S13 of FIG. 6A, the descriptions thereof are omitted here.

When determining in step S413 that the spin button 23 has been turned on, the main CPU 41 executes symbol determination processing (step S414). In the processing, the main CPU 41 executes a symbol determination program stored in the RAM 43, to determine code Nos. at the time of stoppage of each reel 314. The symbol determination program is a program for determining synthetic symbols (code Nos. corresponding to synthetic symbols) stop-displayed in the display region 328.

Specifically, the main CPU 41 executes a program for random number generation which is included in the symbol determination program, to select a random number value corresponding to each of the five reels 314 out of numeric values of 0 to 255. In the present embodiment, descriptions will be given of a case where random numbers are generated on a program (a case where so-called software random numbers are used). In the present invention, however, a random number generator may be provided, and random numbers may be extracted therefrom (so-called hardware random numbers may be used).

The main CPU 41 determines a code No. of each reel 314 based upon the selected five random number values. Code No. of each reel 314 corresponds to a code No. of the synthetic symbols to be stop-displayed at the central portion of each display window 315. The main CPU 41 determines the codes No. of the respective reels 314, so as to determine a prize. For example, when deciding the code Nos. of the reels 314 to "00", "00", "00", "00", and "00", it means that the main CPU 41 determines "AIR PLANE×5" as the prize.

Next, the main CPU 41 stop-displays synthetic symbols on the reels 314A to 314D (step S415). In the processing, the main CPU 41 executes reel rotation control processing. This is processing where, after start rotation of all the reels 314, the rotation of the reels is stopped so that symbols having been determined in step S414 are stop-displayed.

Next, the main CPU 41 determines whether or not the game is in a ready-to-win state for establishment of the jackpot trigger, the free game trigger or the bonus game trigger (step S416). Namely, the main CPU 41 determines whether or not four of at least one kind of bonus payout symbols (small) out of the jackpot trigger symbols (small), the free game trigger symbols (small) and the bonus game trigger symbols (small) have been stop-displayed along a line on the reels 314A to 314D.

When determining that the game is in the ready-to-win state for establishment of the jackpot trigger, the free game trigger or the bonus game trigger, the main CPU 41 executes the following processing in step S417.

Namely, when four bonus game trigger symbols (small) are stop-displayed in a line on the reels 314A to 314D, the main CPU 41 displays bonus game trigger symbol images (large) in the display region 328 of the lower image display panel 16 in such a manner as to cover four synthetic symbols including the four bonus game trigger symbols (small). At this time, the main CPU 41 refers to positional table data included in the game program stored in the RAM 43. The positional table data is data indicating a table where a position of synthetic symbol to be stop-displayed is associated with a position of the display region.

Consequently, when seen from the player, the four synthetic symbols are hidden by the bonus game trigger symbol images (large) (cf. FIG. 15C).

Further, when four jackpot trigger symbols (small) are stop-displayed along a line on the reels 314A to 314D, the main CPU 41 similarly displays jackpot trigger symbol images (large) in the display region 328 of the lower image display panel 16 in such a manner as to cover four synthetic symbols including the four jackpot trigger symbols (small).

Moreover, when four free game trigger symbols (small) are stop-displayed along a line on the reels 314A to 314D, the main CPU 41 similarly displays free game trigger symbol images (large) in the display region 328 of the lower image display panel 16 in such a manner as to cover four synthetic symbols including the four free game trigger symbols (small).

When determining that the game is not in the ready-to-win state for establishment of any of the jackpot trigger, the free game trigger, or the bonus game trigger, or after executing the processing of step S417, the main CPU 41 shifts the processing to step S418.

In step S418, the main CPU 41 controls rotation of the reels, to stop-display synthetic symbols on the reel 314E (step S418).

Next, the main CPU 41 determines whether or not the jackpot trigger has been established (step S420).

When determining that the jackpot trigger has been established, the main CPU 41 determines whether or not the winning combination has been established on the same row as the row where the jackpot trigger has been established (step S421). In the processing, the main CPU 41 determines whether or not five normal payout symbols (small) have been stop-displayed on the row where the five jackpot trigger symbols (small) in accordance with establishment of the jackpot trigger have been stop-displayed along a line.

When determining that the winning combination has not been established on the same row as the row where the jackpot trigger has been established, the main CPU 41 displays jackpot trigger establishment symbol images in the display region 328 of the lower image display panel 16 in such a manner as to cover five synthetic symbols including the five jackpot trigger symbols (small) in accordance with establishment of the jackpot trigger (step S422).

Next, the main CPU 41 conducts a payout based upon the progressive jackpot (step S423).

When determining in step S421 that the winning combination has been established on the same row as the row where the jackpot trigger has established, the main CPU 41 displays double payout symbol images (large) in the display region 328 of the lower image display panel 16 in such a manner as to cover five synthetic symbols including the five jackpot trigger symbols (small) in accordance with establishment of the jackpot trigger (step S424).

Next, the main CPU 41 conducts a payout based upon a progressive jackpot and also conducts a payout based upon establishment of the winning combination (step S425).

When determining in step S420 that the jackpot trigger has not been established, or after executing the processing of step S423 or S425, the main CPU 41 determines whether or not the winning combination has been established (step S430). In the processing, the main CPU 41 determines whether or not five normal payout symbols (small) have been stop-displayed on any row of the reels 314.

When determining that the winning combination has been established, the main CPU 41 displays normal payout symbol images (large) in the display region 328 of the lower image display panel 16 in such a manner as to cover five synthetic symbols including the five normal payout symbols (small) that constitute the winning combination (step S431).

Consequently, when seen from the player, the five synthetic symbols are hidden by the normal payout symbol images (large) (cf. FIG. 14*c*).

Next, the main CPU 41 pays out coins based upon odds in the normal game (normal odds) (step S432).

When determining in step S430 that the winning combination has not been established, or after executing the processing of step S432, the main CPU 41 determines whether or not the bonus game trigger has been established (step S440).

When determining that the bonus game trigger has been established, the main CPU 41 determines whether or not the free game trigger has been established (step S441).

When determining that the free game trigger has not been established, the main CPU 41 displays bonus game trigger establishment symbol images in the display region 328 of the lower image display panel 16 in such a manner as to cover five synthetic symbols including the five bonus game trigger symbol (small) in accordance with establishment of the bonus game trigger (step S442).

Consequently, when seen from the player, the five synthetic symbols are hidden by the bonus game trigger establishment symbol images (cf. FIG. 15F).

Subsequently, the main CPU 41 executes the bonus game execution processing (step S443), and completes the present subroutine.

When determining in step S441 that the free game trigger has been established, the main CPU 41 displays special bonus game trigger establishment symbol images in the display region 328 of the lower image display panel 16 in such a manner as to cover five synthetic symbols including the five bonus game trigger symbols (small) in accordance with establishment of the bonus game trigger and five synthetic symbols including the five free game trigger symbols (small) in accordance with establishment of the free game trigger (step S444).

Subsequently, the main CPU 41 executes the special bonus game execution processing (step S445), and completes the present subroutine.

When determining that the bonus game trigger has not been established in step S440, the main CPU 41 determines whether or not the free game trigger has been established (step S450).

When determining that the free game trigger has not been established, the main CPU 41 completes the present subroutine.

On the other hand, when determining that the free game trigger has been established, the main CPU 41 displays free game trigger establishment symbol images in the display region 328 of the lower image display panel 16 in such a manner as to cover five synthetic symbols including the five free game trigger symbols (small) in accordance with establishment of the free game trigger (step S451).

Subsequently, the main CPU 41 executes the free game execution processing (step S452), and completes the present subroutine.

According to the slot machine 310 of the second embodiment, the synthetic symbol images each including the normal payout symbol (small) and the bonus payout symbol (small) are stop-displayed on the reels 314A to 314D. Such symbol images formed by synthesizing the two kinds of symbol images are not usually displayed in slot machines, and a player is unfamiliar with such symbols. Therefore, by showing the player such symbols, it is possible to have the player feel freshness. This can result in provision of a game in which the player is unlikely to become bored.

Further, according to the slot machine 310 of the second embodiment, the normal payout symbol (small) is associated with the winning combination. When the normal payout symbols (small) included in the stop-displayed synthetic symbols or a combination thereof constitute the winning combination, the normal payout symbol images (large) are displayed in the symbol matrix (SM) in such a manner as to cover the synthetic symbols (the synthetic symbols stop-displayed along the winning line) including the normal payout symbols (small) constituting the winning combination. The normal payout symbol image (large) has substantially the same picture as that of the normal payout symbol image (small) that constitute the winning combination.

Thereby, when seen from the player, the synthetic symbols each including the normal payout symbol that constitutes the winning combination are hidden by the normal payout symbol images (large). It is therefore possible to give the player an impression as if the normal payout symbols (small) constituting the winning combination have expanded to the normal payout symbol images (large) as triggered by establishment of the winning combination. Hence it becomes possible to have the player feel interested in a view being as if the normal payout symbols (small) expand to the normal payout symbol images (large), so as to make the player absorbed in the game.

Moreover, since the normal payout symbol images (large) corresponding to the winning combination are displayed with sizes larger than those of the normal payout symbols (small) and the bonus payout symbols (small) in the case of establishment of the winning combination, it is possible to make the player immediately aware of which prize has been established. This enables provision of a game very easy to understand for the player.

According to the slot machine 310 of the second embodiment, the bonus payout symbol (small) is associated with the progressive jackpot, the free game and the bonus game. Namely, the two kinds of symbols constituting the synthetic symbol image are both associated with prizes. It is thereby possible to make the player pay attention to both the normal payout symbols (small) and the bonus payout symbols (small). Consequently, it is possible to make the player further absorbed in the game.

Moreover, according to the slot machine 310 of the second embodiment, when a combination of the jackpot trigger symbols (small), the free game trigger symbols (small) or the bonus game trigger symbols (small) included in the stop-displayed synthetic symbols establishes the jackpot trigger, the free game trigger and the bonus game trigger, the jackpot trigger establishment symbol images, free game trigger establishment symbol images or bonus game trigger establishment symbol images are displayed in the display region 328 in such a manner as to cover the synthetic symbols each including the jackpot trigger symbol (small), free game trigger symbol (small) or the bonus game trigger symbol (small).

Namely, it is possible that, when the winning combination is established by the normal payout symbols (small), the normal payout symbol images (large) are displayed in the display region 328 with substantially the same sizes as those of the synthetic symbols, whereas when the bonus game trigger is established by the bonus game payout symbols (small), the symbol images indicating establishment of the bonus game trigger are displayed in the display region 328 with substantially the same sizes as those of the synthetic symbols. It is therefore possible to give the player an impression as if the normal payout symbols (small) constituting the winning combination have expanded to the normal payout symbol images (large) in the case of establishment of the winning combination, while giving the player an impression as if the jackpot trigger symbol images (small), free game trigger symbols (small) or the bonus game trigger symbols (small) have expanded to the jackpot trigger establishment symbol images, the free game trigger establishment symbol images or the bonus game trigger establishment symbol images in the case of establishment of the jackpot trigger, the free game trigger or the bonus game trigger.

As thus described, it is possible to show the player a view being as if the normal payout symbols (small) expand to the normal payout symbol images (large) or a view being as if the jackpot trigger symbols (small), free game trigger symbols (small) or the bonus game trigger symbols (small) expand to the jackpot trigger establishment symbol images, the free game trigger establishment symbol images or the bonus game trigger establishment symbol images, depending upon whether the winning combination is established or the bonus is established. It is thus possible to have the player feel increasingly interested in such unfamiliar views.

Third Embodiment

It has been described that in the slot machine 310 according to the second embodiment, synthetic symbols are stop-displayed on the reels 314A to 314E. However, the slot machine of the present invention may be configured such that bonus payout symbols (small) are stop-displayed on the reels.

In the following, the same constituents as those of the slot machine 310 according to the second embodiment are described while provided with the same numerals.

Further, descriptions of parts in the third embodiment, to which the descriptions in the first embodiment and the second embodiment are applicable, are omitted.

A general description of the third embodiment will be given by using FIGS. 19 to 21.

Figure 19A:
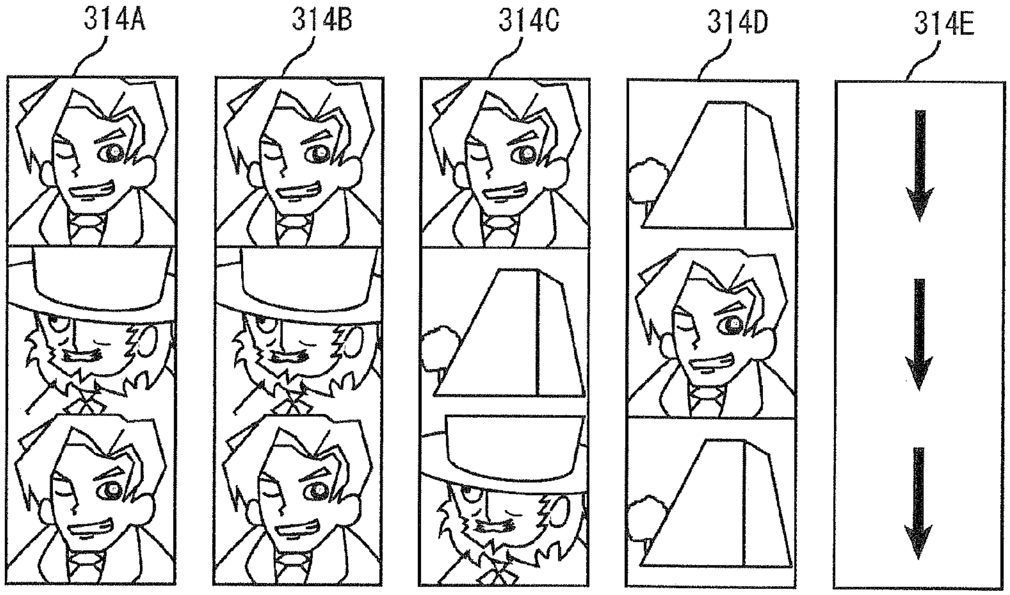
FIG. 19A is a view illustrating synthetic symbols stop-displayed by reels.

FIG. 19A is a view illustrating synthetic symbols stop-displayed by reels.

Figure 19B:
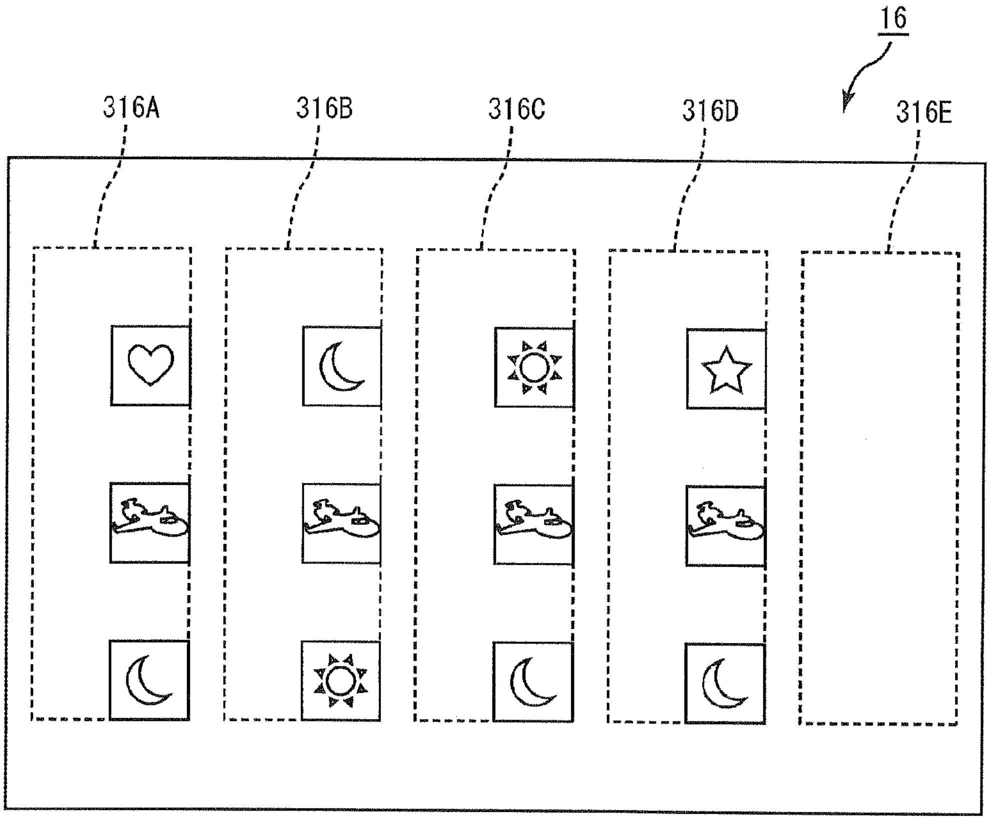
FIG. 19B is a view illustrating an example of symbol images displayed in symbol image display regions.

FIG. 19B is a view illustrating an example of symbol images displayed in symbol image display regions.

Figure 19C:
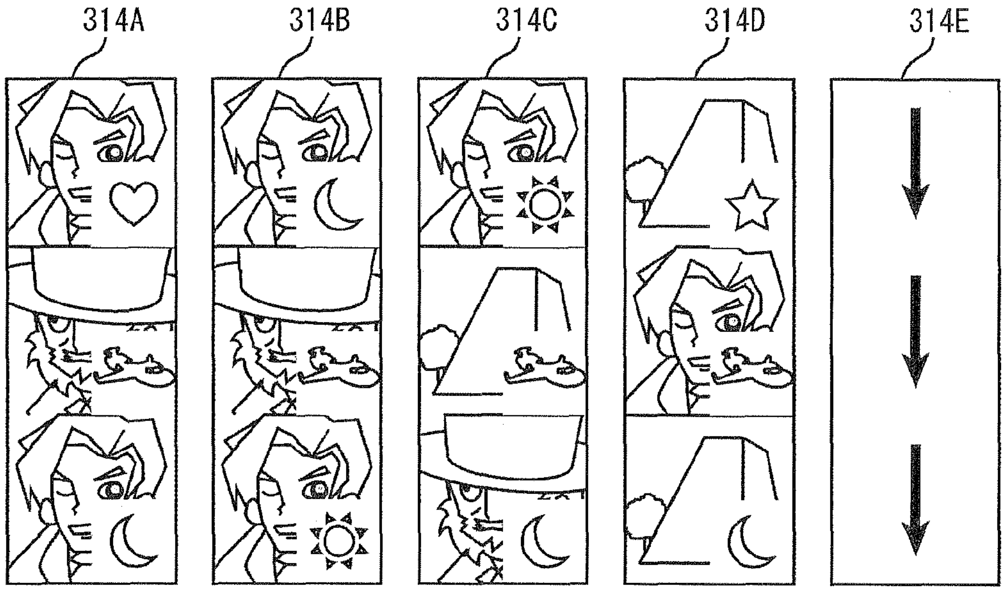
FIG. 19C is a view schematically illustrating a display region seen from the player.
Figure 20A:
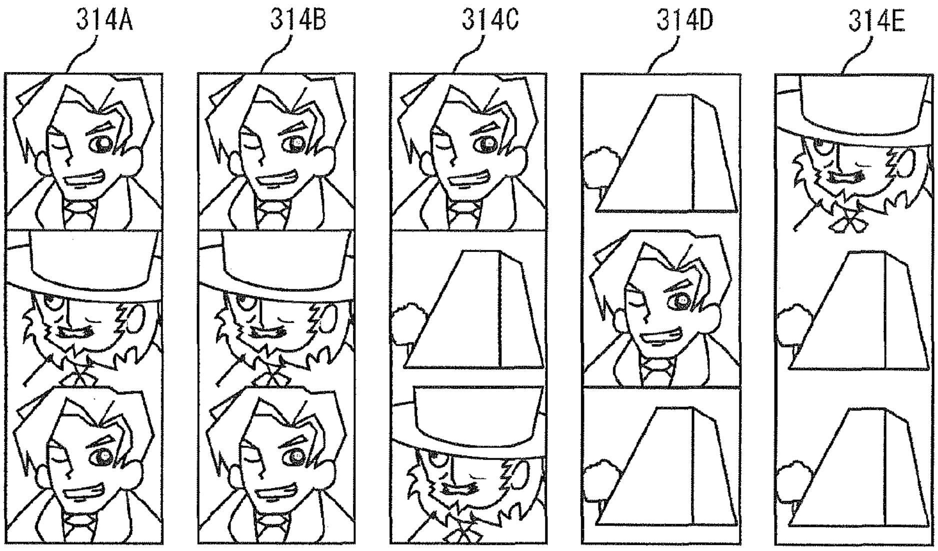
FIG. 20A is a view illustrating synthetic symbols stop-displayed by reels.

FIG. 19C is a view a view schematically illustrating a display region seen from the player FIG. 20A is a view illustrating synthetic symbols stop-displayed by reels.

Figure 20B:
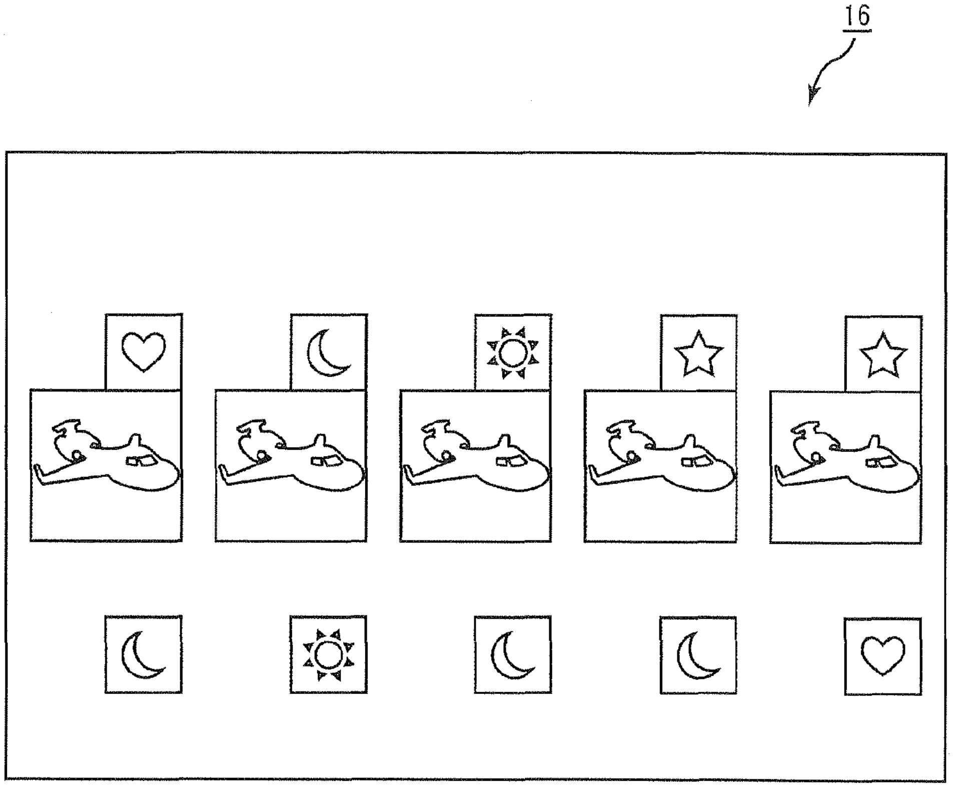
FIG. 20B is a view illustrating an example of symbol images displayed in symbol image display regions.

FIG. 20B is a view illustrating an example of symbol images displayed in symbol image display regions.

Figure 20C:
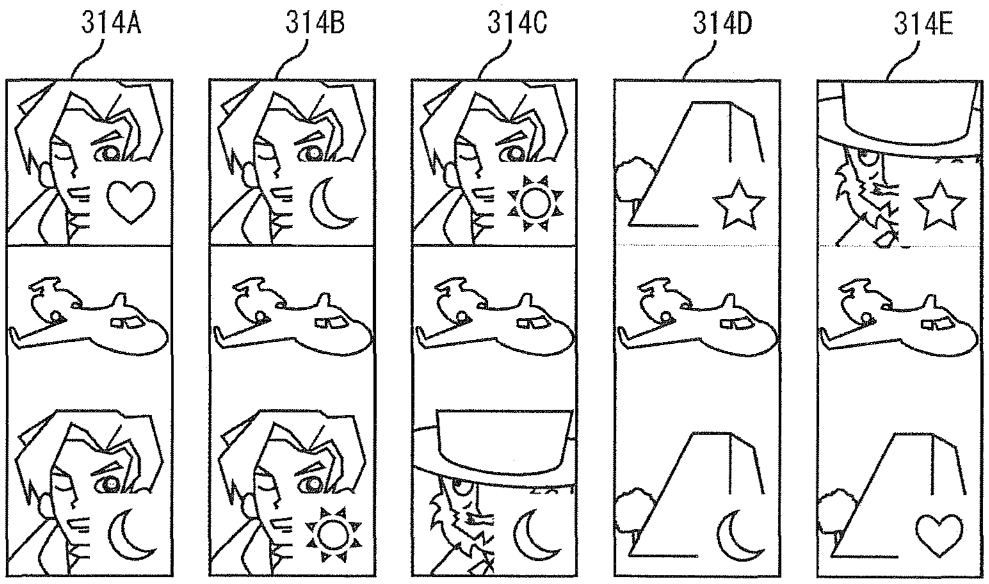
FIG. 20C is a view schematically illustrating a display region seen from the player.

FIG. 20C is a view schematically illustrating a display region seen from the player.

Figure 21A:
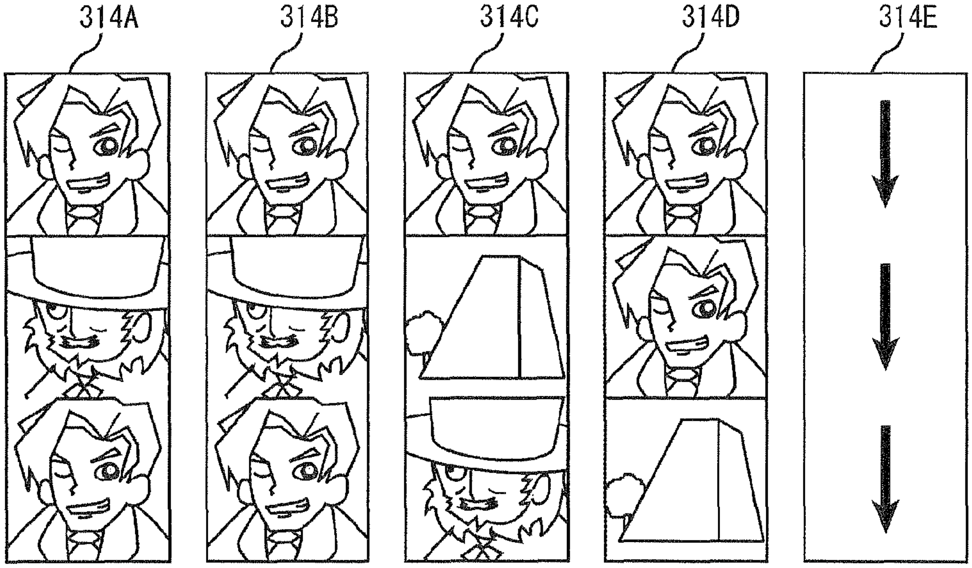
FIG. 21A is a view illustrating synthetic symbols stop-displayed by reels.

FIG. 21A is a view illustrating synthetic symbols stop-displayed by reels.

Figure 21B:
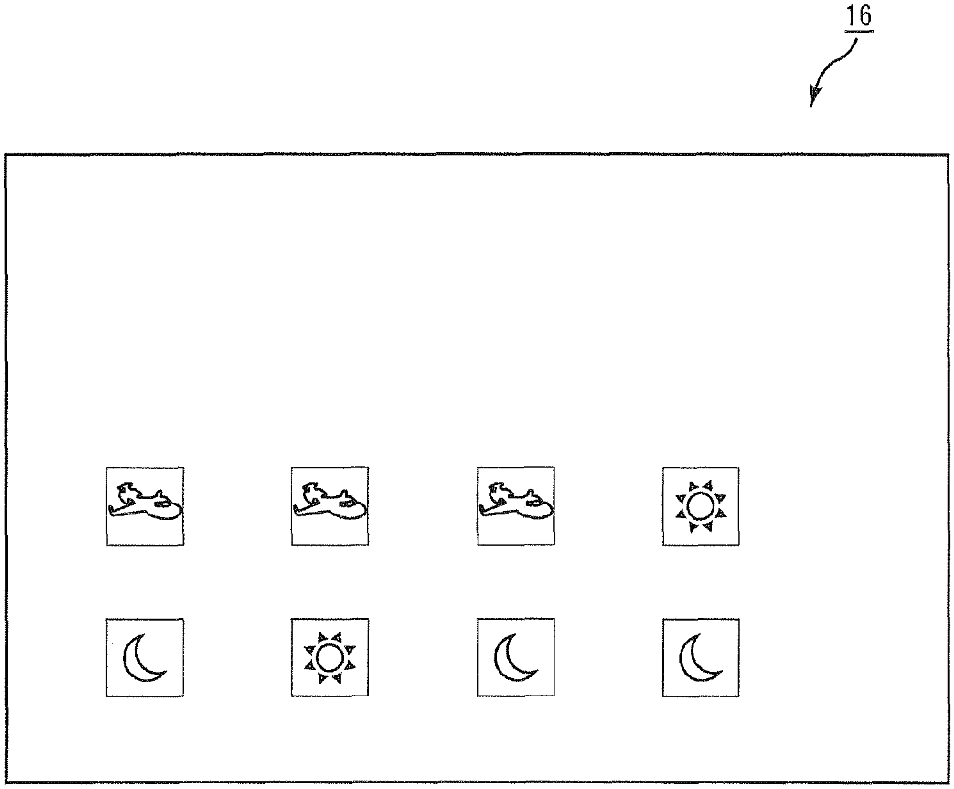
FIG. 21B is a view illustrating an example of symbol images displayed in symbol image display regions.

FIG. 21B is a view illustrating an example of symbol images displayed in symbol image display regions.

Figure 21C:
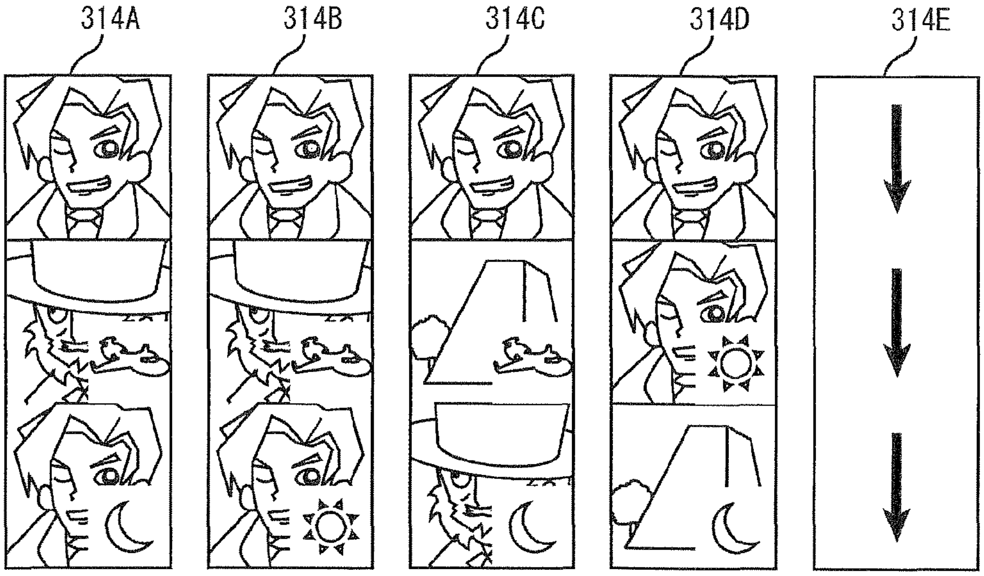
FIG. 21C is a view schematically illustrating a display region seen from the player.

FIG. 21C is a view schematically illustrating a display region seen from the player.

Figure 21D:
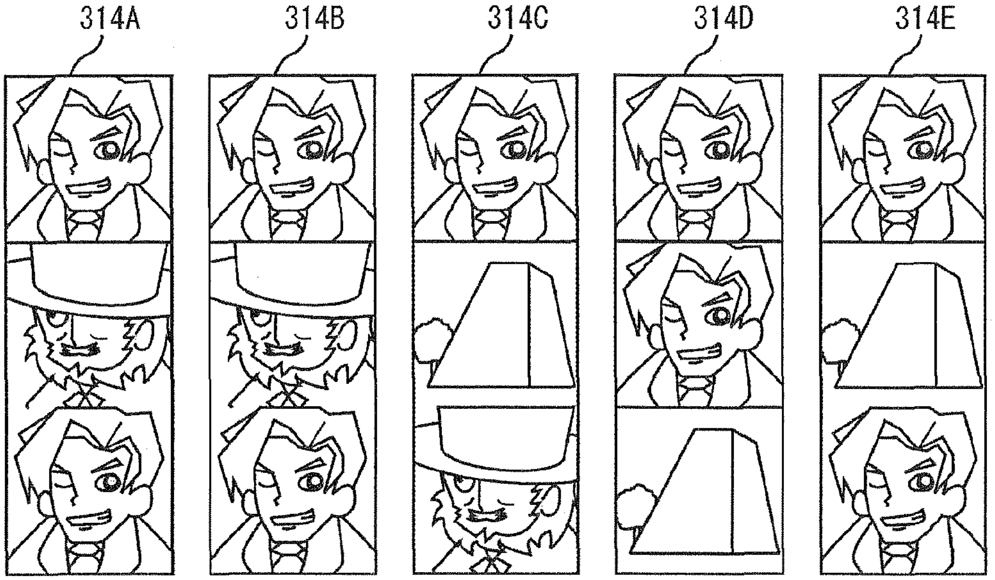
FIG. 21D is a view illustrating synthetic symbols stop-displayed by reels.

FIG. 21D is a view illustrating synthetic symbols stop-displayed by reels.

Figure 21E:
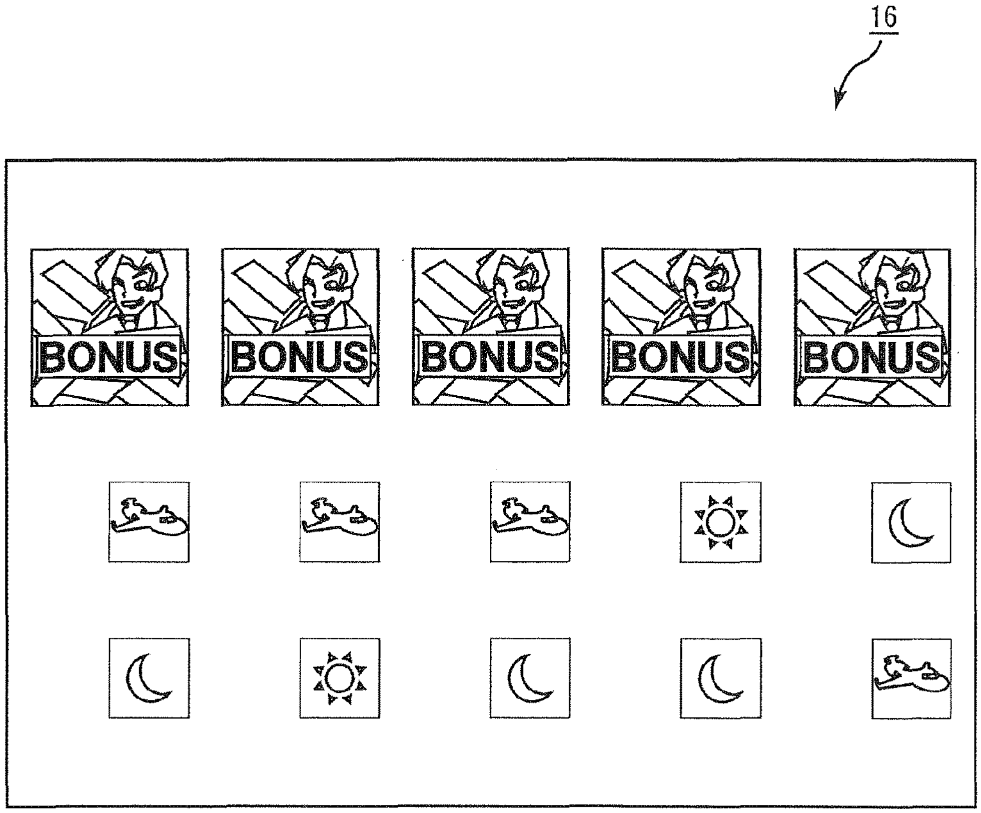
FIG. 21E is a view illustrating an example of symbol images displayed in symbol image display regions.

FIG. 21E is a view illustrating an example of symbol images displayed in symbol image display regions.

Figure 21F:
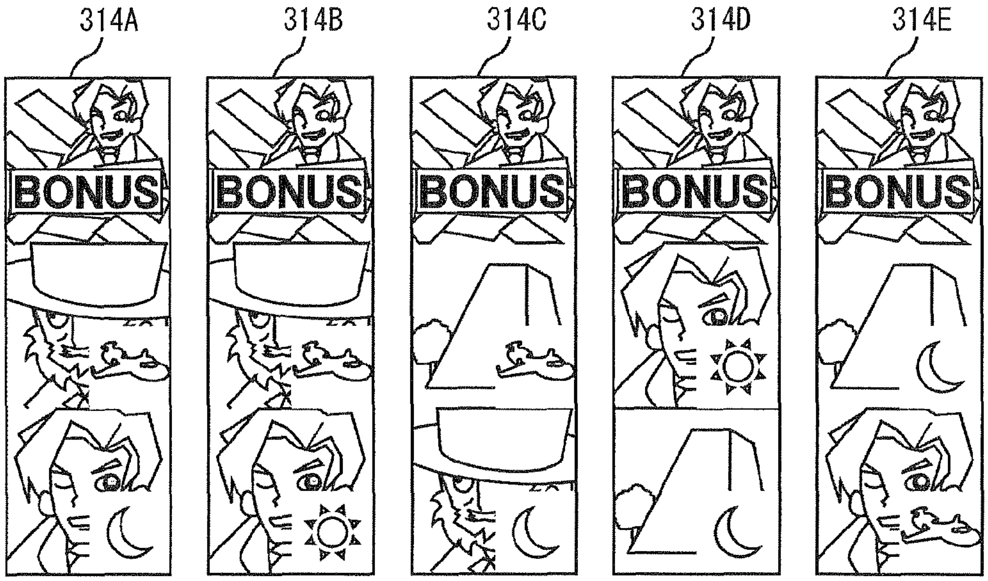
FIG. 21F is a view schematically illustrating a display region seen from the player.

FIG. 21F is a view schematically illustrating a display region seen from the player.

In the slot machine 310 according to the third embodiment, jackpot trigger symbols (large), free game trigger symbols (large) and bonus game trigger symbols (large) (hereinafter also referred to as bonus payout symbols (large)) are drawn on the outer peripheral surface of the reels 314A, 314B, 314C, 314D and 314E. The jackpot trigger symbol (large), the free game trigger symbol (large) and the bonus game trigger symbol (large) respectively correspond to the jackpot trigger symbol image (large), the free game trigger symbol image (large) and the bonus game trigger symbol image (large) in the first embodiment, respectively.

The example of FIG. 19A show a state where the jackpot trigger symbols (large), the free game trigger symbols (large) and the bonus game trigger symbols (large) have been stop-displayed on the reels 314A to 314D.

The display region 328 includes the symbol image display regions 316 (316A, 316B, 316C, 316D and 316E). In the symbol image display regions 316, the normal payout symbol images (small) are rearranged (cf. FIG. 19B).

The symbol image display regions 316A to 316E are provided in the positions corresponding respectively to the reels 314A to 314E.

As shown in FIG. 19A, as a result that the jackpot trigger symbols (large), the free game trigger symbols (large) and the bonus game trigger symbols (large) are stop-displayed, and the normal payout symbol images (small) are rearranged as shown in FIG. 19B, the symbols are seen from the player as shown in FIG. 19C. Namely, it is seen from the player as if synthetic symbols each including the normal payout symbol image (small) and the bonus game trigger symbol (small) are displayed.

An example of FIG. 20A shows a state where, on the reels 314A to 314E, the jackpot trigger symbols (large), the free game trigger symbols (large) and the bonus game trigger symbols (large) have been stop-displayed.

FIG. 20B shows symbol images that are displayed in the symbol image display regions 316A to 316E when "AIR PLANE" symbol image (small) is rearranged on the middle row of the reel 314E after rearrangements of the "AIR PLANE" symbol images (small) on the middle row of the reels 314A to 3140 (cf. FIG. 19B). As shown in FIG. 20B, the "AIR PLANE" symbol images (large) are displayed on the middle row in the symbol image display regions 316A to 316E resulting from establishment of "AIR PLANE×5". At this time, the symbols are seen from the player as shown in FIG. 20C.

The example of FIG. 21A show a state where four bonus game trigger symbols (large) have been stop-displayed, namely the game is in the ready-to-win state for establish of the bonus game trigger on the upper row of the reels 314A to 314D.

At this time, as shown in FIG. 21B, display of the normal payout symbol images (small) on the upper row in the symbol image display regions 316 is completed. Consequently, the symbols are seen from the player as shown in FIG. 21C. Namely, a state where the bonus game trigger symbols (large) are displayed is seen from the player.

The example of FIG. 21D shows a state where five bonus game trigger symbols (large) have been stop-displayed on the upper row of the reels 314A to 314E, that is, the condition where the bonus game trigger has been established.

At this time, as shown in FIG. 21E, the bonus game trigger establishment symbol images are displayed on the upper row in the symbol image display regions 316.

Consequently, when seen from the player, the bonus game trigger symbols (large) are hidden by the bonus game trigger establishment symbol images and seen as shown in FIG. 21F from the player.

There has been described the outline of the third embodiment.

Hereinafter, the third embodiment will be described in more detail.

Figure 22A:
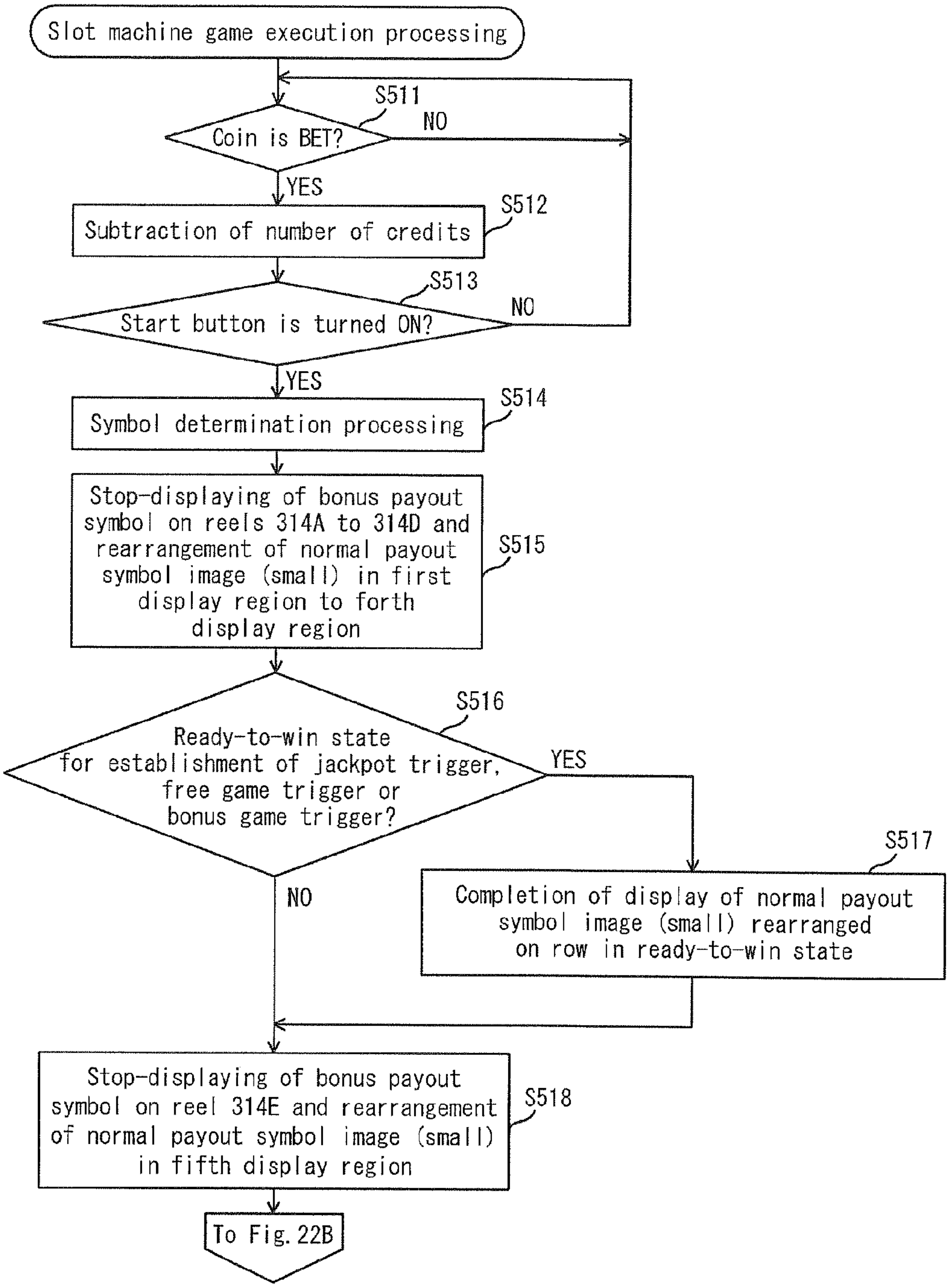
FIG. 22A is a flowchart illustrating a subroutine of slot machine game execution processing according to a third embodiment.
Figure 22B:
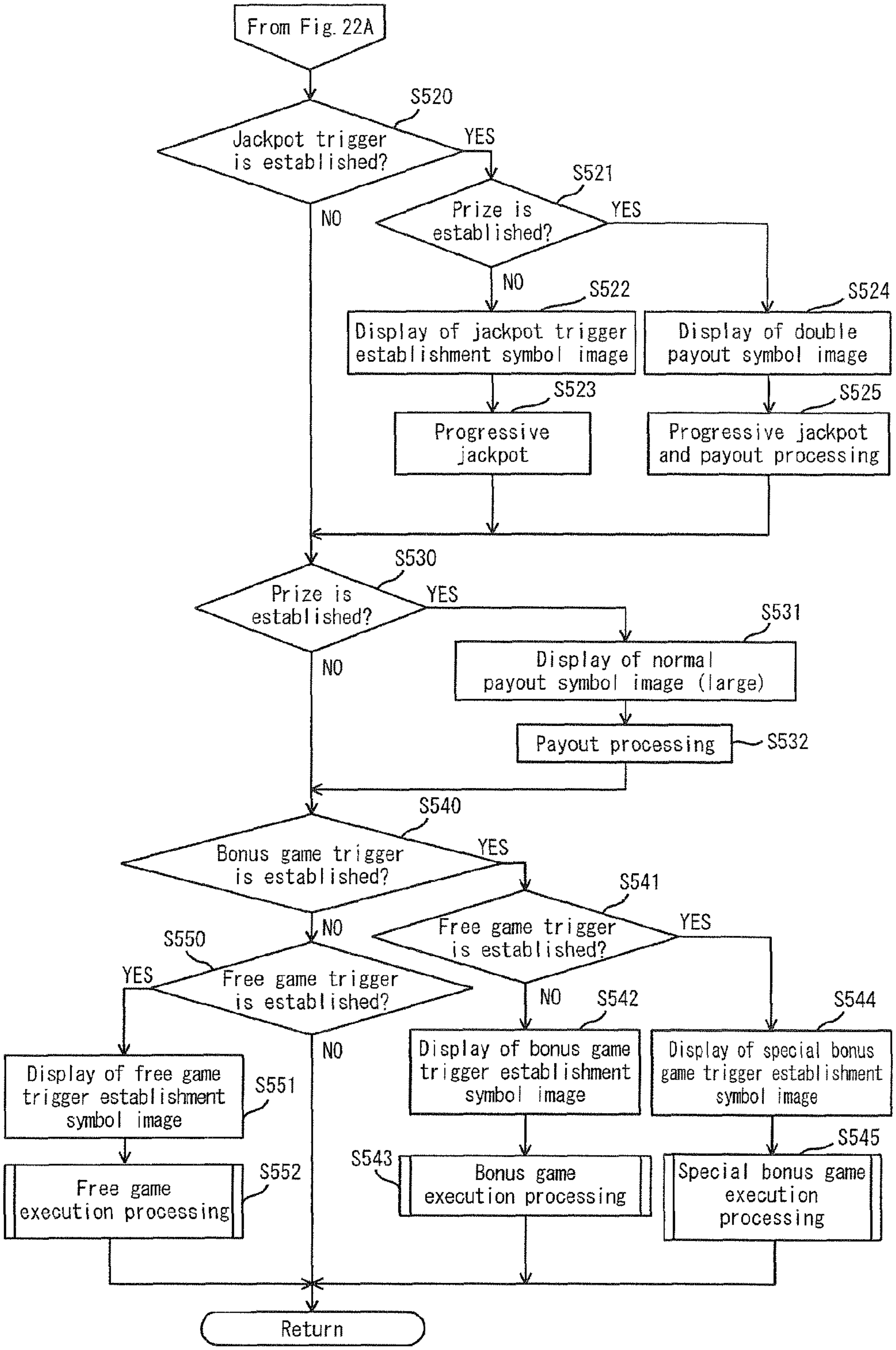
FIG. 22B is a flowchart illustrating a subroutine of slot machine game execution processing according to the third embodiment.

FIGS. 22A and 22B are flowcharts illustrating a subroutine of slot machine game execution processing according to the third embodiment.

First, the main CPU 41 executes processing of steps S511 to S514. However, since the processing are similar to the processing of steps S411 to S414, the descriptions thereof are omitted here.

Next, the main CPU 41 stop-displays the bonus payout symbols (large) on the reels 314A to 314D, and also rearranges the normal payout symbol images (small) in the symbol image display regions 316A to 316D (step S515).

Next, the main CPU 41 determines whether or not the game is in a ready-to-win state for establishment of the jackpot trigger, the free game trigger or the bonus game trigger (step S516). Namely, the main CPU 41 determines whether or not four of at least one kind of bonus game payout symbols (large) out of the jackpot trigger symbols (large), the free game trigger symbols (large) and the bonus game trigger symbols (large) have been stop-displayed on the reels 314A to 314D.

When determining that the game is in the ready-to-win state for establishment of the jackpot trigger, the free game trigger or the bonus game trigger, the main CPU 41 completes display of normal payout symbol images (small) rearranged on the row corresponding to the row where four bonus payout symbols (large) have been stop-displayed out of the normal payout symbol images (small) rearranged in the symbol image display regions 316A to 316D (step S517).

When determining in step S516 that the game is not in the ready-to-win state for establishment of the jackpot trigger, the free game trigger or the bonus game trigger, or after executing the processing of step S517, the main CPU 41 shifts the processing to step S518.

In step S518, the main CPU 41 conducts bonus payout symbols (large) stop-displayed on the reel 314E, and also rearranges normal payout symbol images (small) in the symbol display region 316E.

Next, the main CPU 41 determines whether or not the jackpot trigger has been established (step S520).

When determining that the jackpot trigger has been established, the main CPU 41 determines whether or not the winning combination has been established on the same row as the row where the jackpot trigger has been established. In the processing, the main CPU 41 determines whether or not five normal payout symbol images (small) are rearranged on the row where the five jackpot trigger symbols (large) in accordance with establishment of the jackpot trigger have been stop-displayed.

When determining that the winning combination has not been established on the same row as the row where the jackpot trigger has been established, the main CPU 41 displays jackpot trigger establishment symbol images in the symbol image display regions 316 in such a manner as to cover the five jackpot trigger symbols (large) in accordance with establishment of the jackpot trigger.

Next, the main CPU 41 conducts a payout based upon the progressive jackpot (step S523).

When determining in step S521 that the winning combination has been established on the same row where the jackpot trigger has been established, the main CPU 41 displays double payout symbol images (large) in the symbol image display regions 316 in such a manner as to cover the five jackpot trigger symbols (large) in accordance with establishment of the jackpot trigger (step S524).

Next, the main CPU 41 conducts a payout based upon the progressive jackpot, and also conducts a payout based upon establishment of the winning combination (step S525).

When determining in step S520 that the jackpot trigger has not been established, or after executing the processing of step S523 or S525, the main CPU 41 determines whether or not the winning combination has been established (step S530). In the processing, the main CPU 41 determines whether or not five normal payout symbol images (small) have been rearranged in any row in the symbol image display regions 316.

When determining that the winning combination has been established, the main CPU 41 completes display of the five normal payout symbol image constituting the winning combination, and displays normal payout symbol images (large) in the symbol image display regions 316 in such a manner as to cover substantially the whole of the bonus payout symbols (large) that are partially covered by the normal payout symbol images (small) (step S531).

Consequently, when seen from the player, the five bonus payout symbols (large) are hidden by the normal payout symbol images (large) (cf. FIG. 20C).

Next, the main CPU 41 pays out coins based upon odds (normal odds) (step S532).

When determining in step S530 that the winning combination has not been established, or after executing the processing of step S532, the main CPU 41 determines whether or not the bonus game trigger has been established (step S540).

When determining that the bonus game trigger has been established, the main CPU 41 determines whether or not the free game trigger has been established (step S541).

When determining that the free game trigger has not been established, the main CPU 41 displays bonus game trigger establishment symbol images in the symbol image display regions 316 in such a manner as to cover the five bonus game trigger symbols (large) in accordance with establishment of the bonus game trigger (step S542).

Consequently, when seen from the player, the five bonus game trigger symbols (large) are hidden by the bonus game trigger establishment symbol images (cf. FIG. 21F).

Subsequently, the main CPU 41 executes the bonus game execution processing (step S543), and completes the present subroutine.

When determining in step S541 that the free game trigger has been established, the main CPU 41 displays special bonus game trigger establishment symbol images in the symbol image display regions 316 in such a manner as to cover the five bonus game trigger symbols (large) in accordance with establishment of the bonus game trigger and the five free game trigger symbols (large) in accordance with establishment of the free game trigger (step S544).

Subsequently, the main CPU 41 executes the special bonus game execution processing (step S545), and completes the present subroutine.

When determining in step S540 that the bonus game trigger has not been established, the main CPU 41 determines whether or not the free game trigger has been established (step S550).

When determining that the free game trigger has not been established, the main CPU 41 completes the present subroutine.

On the other hand, when determining that the free game trigger has been established, the main CPU 41 displays free game trigger establishment symbol images in the symbol image display regions 316 in such a manner as to cover the five free game trigger symbols (large) in accordance with establishment of the free game trigger (step S551).

Subsequently, the main CPU 41 executes the free game execution processing (step S552), and completes the present subroutine.

According to the slot machine 310 of the third embodiment, the jackpot trigger symbols (large), the free game trigger symbols (large) or the bonus game trigger symbols (large) are stop-displayed on the reels 314. Further, the normal payout symbol images (small) are rearranged in the symbol image display regions 316 in such a manner as to partially cover the jackpot trigger symbols (large), the free game trigger symbols (large) or the bonus game trigger symbols (large). Therefore, it appears to the player that the synthetic symbols each including the normal symbol image (small) and the partially covered bonus payout symbol image (large) are displayed. Such symbols formed by synthesizing the two kinds of symbols are not usually displayed in slot machines, and a player is unfamiliar with such symbols. Therefore, by showing the player such symbols, it is possible to have the player feel freshness. This can result in provision of a game in which the player is unlikely to become bored.

Further, according to the slot machine of the third embodiment, the normal payout symbol image (small) is associated with the winning combination. When the rearranged normal payout symbol images (small) or a combination thereof constitute the winning combination, the normal payout symbol images (large) are displayed in the symbol image display regions 316 in such a manner as to cover substantially the whole of the bonus payout symbols partially covered by the normal payout symbol images constituting the winning combination.

Thereby, when seen from the player, the whole of the bonus payout symbols (large) partially covered by the normal payout symbol images (small) that constitute the winning combination are hidden by the normal payout symbol images (large). It is therefore possible to give the player an impression as if the normal payout symbol images (small) constituting the predetermined prize have expanded to the normal payout symbol images (large) as triggered by establishment of the winning combination. Hence it becomes possible to have the player feel interested in a view being as if the normal payout symbol images (small) expand to the normal payout symbol images (large), so as to make the player absorbed in the game.

Moreover, since the normal payout symbol images (large) corresponding to the winning combination are displayed with sizes larger than those of the first symbol images in the case of establishment of the winning combination, it is possible to make the player immediately aware of which prize has been established. This enables provision of a game very easy to understand for the player.

Although the present invention has been described with reference to embodiments thereof, these embodiments merely illustrate concrete examples, not restrict the present invention. The concrete structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there have been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processing described in the present specification are to be executed by various types of devices, in principle. Further, other structures required for conducting each step will be apparent from the aforementioned description.

What is claimed as new and desired to be secured by Letters Patent of the United States is:

1. A slot machine comprising:

a display capable of rearranging synthetic symbol images each including a first symbol image associated with a predetermined prize and a second symbol image different from said first symbol images;

a memory capable of storing first symbol image data indicating said first symbol image, second symbol image data indicating said second symbol image, and special first symbol image data indicating a special first symbol image corresponding to said first symbol image; and a controller programmed so as to execute the processing of:

(A) rearranging said synthetic symbol images to said display based upon the first symbol image data and the second symbol image data stored in said memory, and (B) displaying the special first symbol images corresponding to first symbol images which are included in the synthetic symbol images rearranged in said processing (A) and constitute said predetermined prize, to said display based upon the special first symbol image data stored in said memory in place of the synthetic symbol images including said first symbol images out of the synthetic symbol images rearranged in said processing (A) in a case where said first symbol images included in the synthetic symbol images rearranged in said processing (A) or a combination thereof constitute said predetermined prize.

2. The slot machine according to claim 1, wherein said special first symbol image is an image having a substantially same picture as a picture of the corresponding first symbol image.

3. The slot machine according to claim 1, wherein said second symbol image is associated with a special prize different from said predetermined prize, said memory is capable of storing special second symbol image data indicating a special second symbol image corresponding to said second symbol image, and said controller is further programmed so as to execute processing of (C) displaying the special second symbol images corresponding to second symbol images which are included in the synthetic symbol images rearranged in said processing (A) and constitute said special prize, to said display based upon the special second symbol image data stored in said memory in place of the synthetic symbol images including said second symbol images out of the synthetic symbol images rearranged in said processing (A) in a case where said second symbol images included in the synthetic symbol images rearranged in said processing (A) or a combination thereof constitute said special prize.

4. A slot machine comprising:

a symbol display capable of variably displaying synthetic symbols each including a first symbol associated with a predetermined prize and a second symbol different from said first symbols;

a display which is capable of displaying special first symbol images corresponding to said first symbols and arranged at a front face of said symbol display, a memory capable of storing special first symbol image data indicating said special first symbol image; and a controller programmed so as to execute the processing of:

(A) variably displaying and then stop-displaying a plurality of said synthetic symbols to said symbol display, and (B) displaying said special first symbol images corresponding to first symbols which are included in the synthetic symbols stop-displayed in said processing (A) and constitute said predetermined prize, to said display based upon the special first symbol image data stored in said memory in such a manner as to cover the synthetic symbols including said first symbols in a case where said first symbols or a combination thereof constitute said predetermined prize.

5. The slot machine according to claim 4, wherein said second symbol is associated with a special prize different from said predetermined prize, said memory is capable of storing special second symbol image data indicating special second symbol image corresponding to said second symbol image, and said controller is further programmed so as to execute processing of (C) displaying said special second symbol images correspond to second symbols which are included in the synthetic symbol images stop-displayed in said processing (A) and constitute said special prize, to said display based upon the special second symbol image data stored in said memory in such a manner as to cover the synthetic symbols including said second symbols in a case where said second symbols or a combination thereof constitute said special prize.

6. A slot machine comprising:
a symbol display capable of variably displaying a plurality of second symbols;
a display which is arranged at a front face of said symbol display and capable of rearranging first symbol images each associated with a predetermined prize and displayed in such a manner as to partially cover said second symbol;
a memory capable of storing first symbol image data indicating said first symbol image and special first symbol image data indicating special first symbol images corresponding to the first symbol image; and
a controller programmed so as to execute the processing of:
(A) variably displaying and then stop-displaying said plurality of second symbols to said symbol display,
(B) rearranging to said display said first symbol images each displayed in such a manner as to partially cover the second symbol stop-displayed in said processing (A) based upon the first symbol image data stored in said memory, and
(C) displaying said special first symbol images corresponding to the first symbol images which are rearranged in said processing (B) and constitute said predetermined prize, to said display based upon the special first symbol image data stored in said memory in such a manner as to cover substantially the whole of second symbols partially covered by said first symbol images out of the second symbols stop-displayed in said processing (A) in a case where said first symbol images or a combination thereof constitute said predetermined prize.

7. A slot machine comprising:
a symbol display capable of variably displaying a plurality of first symbols associated with a predetermined prize;
a display which is arranged at a front face of said symbol display and capable of rearranging second symbol images in such a manner as to partially cover said respective first symbols;
a memory capable of storing second symbol image data indicating said second symbol image and special first symbol image data indicating special first symbol image corresponding to the first symbol images; and
a controller programmed so as to execute the processing of:
(A) variably displaying and then stop-displaying said plurality of first symbols by said symbol display,
(B) rearranging to said display said second symbol images each displayed in such a manner as to partially cover the first symbol stop-displayed in said processing (A) based upon the second symbol image data stored in said memory, and
(C) displaying said special first symbol images corresponding to first symbol images which are stop-displayed in said processing (A) and constitute said predetermined prize, to said display based upon the special first symbol image data stored in said memory in such a manner as to cover substantially the whole of said first symbols in place of second symbol images displayed in such a manner as to partially cover said first symbols in a case where said first symbols or a combination thereof constitute said predetermined prize.

8. A control method of a slot machine, said control method comprising steps of:
(A) rearranging synthetic symbol images each including a first symbol image associated with a predetermined prize and a second symbol image different from said first symbol image to a display based upon the first symbol image data indicating said first symbol image and the second symbol image data indicating said second symbol image, and
(B) displaying the special first symbol images corresponding to first symbol images which are included in the synthetic symbol images rearranged in said step (A) and constitute said predetermined prize, to said display based upon the special first symbol image data indicating a special first symbol image in place of the synthetic symbol images including said first symbol images out of the synthetic symbol images rearranged in said step (A) in a case where said first symbol images included in the synthetic symbol images rearranged in said step (A) or a combination thereof constitute said predetermined prize.

9. A control method of a slot machine, said control method comprising steps of:
(A) variably displaying and then stop-displaying a plurality of synthetic symbols each including a first symbol image associated with a predetermined prize and a second symbol image different from said first symbol images by a symbol display, and
(B) displaying special first symbol images corresponding to first symbols which are stop-displayed in said step (A) and constitute said predetermined prize, to a display based upon special first symbol image data indicating special first symbol image corresponding to said first symbol images in such a manner as to cover the synthetic symbols including said first symbols in a case where said first symbols or a combination thereof constitute said predetermined prize.

10. A control method of a slot machine, said control method comprising steps of:
(A) variably displaying and then stop-displaying a plurality of second symbols by a symbol display,
(B) rearranging to a display first symbol images each displayed in such a manner as to partially cover the second symbol stop-displayed in said step (A) based upon first symbol image data indicating the first symbol associated with a predetermined prize, and
(C) displaying the special first symbol images corresponding to first symbol images which are stop-displayed in said step (A) and constitute said predetermined prize, to said display based upon the special first symbol image data indicating said special first symbol images corresponding to said first symbol images in such a manner as to cover substantially the whole of second symbols partially covered by said first symbol images in a case where said first symbols or a combination thereof constitute said predetermined prize.

11. A control method of a slot machine, said control method comprising steps of:
(A) variably displaying and then stop-displaying a plurality of first symbols associated with a predetermined prize to a symbol display,
(B) rearranging second symbol images to a display based upon second symbol image data indicating second symbol images in such a manner as to partially cover the first symbols stop-displayed in said step (A), and
(C) displaying special first symbol images corresponding to first symbol images which are stop-displayed in said step (A) and constitute said predetermined prize, to said display based upon special first symbol image data indicating said special first symbol images corresponding to said first symbol images in such a manner as to cover substantially the whole of said first symbols in place of second symbol images displayed in such a manner as to partially cover said first symbols in a case where said first symbols or a combination thereof constitute said predetermined prize.

* * * * *